(12) United States Patent
Kitoh et al.

(10) Patent No.: US 8,737,779 B2
(45) Date of Patent: May 27, 2014

(54) OPTICAL WAVELENGTH MULTI/DEMULTIPLEXER

(75) Inventors: Tsutomu Kitoh, Atsugi (JP); Shin Kamei, Atsugi (JP); Toshikazu Hashimoto, Atsugi (JP); Yohei Sakamaki, Atsugi (JP); Hiroshi Takahashi, Atsugi (JP); Manabu Oguma, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 191 days.

(21) Appl. No.: 13/395,095

(22) PCT Filed: Aug. 25, 2010

(86) PCT No.: PCT/JP2010/005226
§ 371 (c)(1),
(2), (4) Date: Mar. 8, 2012

(87) PCT Pub. No.: WO2011/033725
PCT Pub. Date: Mar. 24, 2011

(65) Prior Publication Data
US 2012/0170891 A1   Jul. 5, 2012

(30) Foreign Application Priority Data

Sep. 18, 2009 (JP) ................ 2009-217386

(51) Int. Cl.
| | | |
|---|---|---|
| *G02B 6/34* | (2006.01) | |
| *G02B 6/293* | (2006.01) | |
| *G02B 6/12* | (2006.01) | |
| *G02B 6/26* | (2006.01) | |
| *G02B 6/42* | (2006.01) | |

(52) U.S. Cl.
CPC .......... *G02B 6/29391* (2013.01); *G02B 6/2938* (2013.01); *G02B 6/12019* (2013.01); *G02B 6/12009* (2013.01)
USPC ............................................. 385/37; 385/31

(58) Field of Classification Search
CPC ........................ G02B 6/12009; G02B 6/12016; G02B 6/12019; G02B 6/12021; G02B 6/12033;G02B 6/2938; G02B 6/29391; G02B 6/29392; H04J 14/00; H04J 14/02
USPC ............................................................ 385/37
See application file for complete search history.

(56) References Cited

U.S. PATENT DOCUMENTS

| | | | |
|---|---|---|---|
| 6,728,446 B2 * | 4/2004 | Doerr | 385/37 |
| 6,912,362 B1 | 6/2005 | Takiguchi et al. | |

(Continued)

FOREIGN PATENT DOCUMENTS

| | | |
|---|---|---|
| JP | 08-069021 | 3/1996 |
| JP | 09-297228 | 11/1997 |

(Continued)

OTHER PUBLICATIONS

Chinese Office Action dated Mar. 14, 2013 in related Chinese Application No. 201080040176.X to Nippon Telegraph and Telephone Corporation.

(Continued)

*Primary Examiner* — Rhonda Peace
(74) *Attorney, Agent, or Firm* — Workman Nydegger

(57) ABSTRACT

An optical wavelength multi/demultiplexer having transmission characteristics with a higher rectangular degree than a conventional one includes an AWG and two-stage lattice circuit. An example of a two-stage lattice circuit according to the present invention includes an input waveguide, a third optical coupler, a third and fourth arm waveguides, a second optical coupler, a first and second arm waveguides, a first optical coupler, and output waveguides. The optical path length differences between the third and fourth arm waveguides and between the first and second arm waveguides are designed to be $\Delta L$. The path passing the third and first arm waveguides differs by $2 \cdot \Delta L$ in optical length from that the fourth and second arm waveguides. The paths passing the third and second arm waveguides and passing the fourth and first arm waveguides differ by $\Delta L$ from that passing the fourth and second arm waveguides.

22 Claims, 47 Drawing Sheets

(56) References Cited

U.S. PATENT DOCUMENTS

| | | | | |
|---|---|---|---|---|
| 7,085,438 | B2* | 8/2006 | Mizuno et al. | 385/3 |
| 7,706,648 | B2* | 4/2010 | Doerr | 385/37 |
| 8,483,525 | B2* | 7/2013 | Kitoh et al. | 385/14 |
| 2003/0035609 | A1 | 2/2003 | Hatanaka | |
| 2003/0128926 | A1* | 7/2003 | Doerr | 385/37 |
| 2004/0136647 | A1* | 7/2004 | Mizuno et al. | 385/24 |
| 2007/0086699 | A1* | 4/2007 | Doerr | 385/24 |
| 2008/0044122 | A1* | 2/2008 | Fondeur et al. | 385/1 |
| 2009/0116789 | A1 | 5/2009 | Doerr | |
| 2011/0268447 | A1* | 11/2011 | Kitoh et al. | 398/82 |
| 2012/0170891 | A1* | 7/2012 | Kitoh et al. | 385/37 |

FOREIGN PATENT DOCUMENTS

| | | |
|---|---|---|
| JP | 10-003012 | 1/1998 |
| JP | 11-109147 | 4/1999 |
| JP | 2002-082241 | 3/2002 |
| JP | 2003-131051 | 5/2003 |
| JP | 2004-037778 | 2/2004 |
| JP | 2004-126475 | 4/2004 |
| JP | 2007-310387 | 11/2007 |
| JP | 2008-058562 | 3/2008 |
| WO | 2004/001470 A1 | 12/2003 |
| WO | 2008/118270 A1 | 10/2008 |

OTHER PUBLICATIONS

Corrected version of International Search Report dated May 1, 2012, issued in PCT/JP2010/005226, filed Aug. 25, 2010.

English Translation of International Preliminary Report dated Apr. 19, 2012, issued in International Application No. PCT/JP2010/005226, filed Aug. 25, 2010.

B. Fondeur et al., "Ultrawide AWG with Hyper-Gaussian Profile", IEEE Photonics Technology Letters, vol. 16, No. 12, pp. 2628-2630, Dec. 2004.

Koichi Maru et al., "Flat-passband multi/demultiplexer using multi-input arrayed waveguide grating and cascaded Mach-Zehnder interferometers", IEICE Technical Report, Nov. 8, 2006, vol. 106, No. 348, pp. 41 to 46 (OPE2006-121).

Maru, K. et al., "Modeling of Multi-Input Arrayed Waveguide Grating and Its Application to Design of Flat-Passband Response Using Cascaded Mach-Zehnder Interferometers, Journal of Lightwave Technology," Feb. 2007, vol. 25, No. 2, p. 544-555.

Maru, K. et al., "Demonstration of Flat-Passband Multi/Demultiplexer Using Multi-Input Arrayed Waveguide Grating Combined With Cascaded Mach-Zehnder Interferometers," Journal of Lightwave Technology, Aug. 2007, vol. 25, No. 8, p. 2187-2197.

Takashi Go et al., "Low-loss Wide and Low—Ripple Passband AWG with Tandem MZI-synchronized Configuration", 2010 Nen The Institute of Electronics, Information and Communication Engineers Sogo Taikai Koen Ronbunshu, Electronics Koen Ronbunshu 1, Mar. 2, 2010, p. 218 (lecture No. C-3-45).

Manabu Oguma et al., "Wide passband tandem MZI-synchronized AWG Employing $1^{st}$ mode converter", 2010 Nen The Institute of Electronics, Information and Communication Engineers Sogo Taikai Koen Ronbunshu, Electronics Koen Ronbunshu 1, Mar. 2, 2010, p. 217 (lecture No. C-3-44).

Kamei, S. et al., "Low-loss, wide and low-ripple passband arrayed-waveguide grating with tandem MZI-synchronized configuration," 35th European Conference on Optical Communication, ECOC 2009, Proceedings, Sep. 20-24, 2009, paper PD 1.6.

Oguma, M. et al., "Wide passband tandem MZI-synchronized AWG employing mode converter and multimode waveguide," IEICE Electronics Express, Jun. 10, 2010, vol. 7, No. 11, p. 823-826.

Kamei, S. et al., "50-GHz-Spacing Athermal Mach-Zehnder Interferometer-Synchronized Arrayed-Waveguide Grating With Improved Temperature Insensitivity," IEEE Photonics Technology Letters, Sep. 1, 2009, vol. 21, No. 17, p. 1205-1207.

Oguma, M. et al., "Passband-Width Broadening Design for WDM Filter With Lattice-Form Interleave Filter and Arrayed-Waveguide Gratings," IEEE Photonics Technology Letters, Mar. 2002, vol. 14, No. 3, p. 328-330.

International Search Report in PCT/JP2010/005226 filed Aug. 25, 2010, issued Sep. 9, 2010.

Supplementary European Search Report dated Feb. 26, 2013, issued in Application No. EP10816840 to Nippon Telegraph and Telephone Corporation.

* cited by examiner

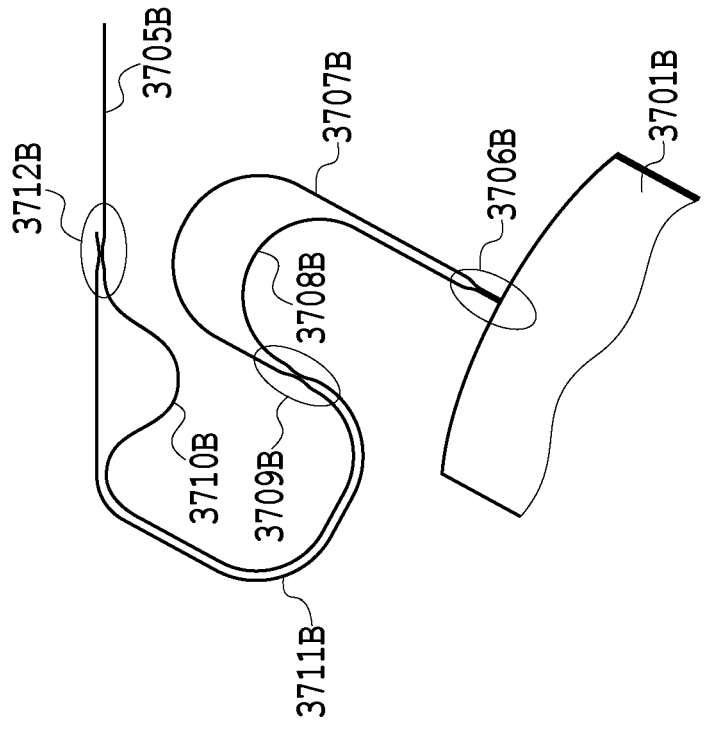
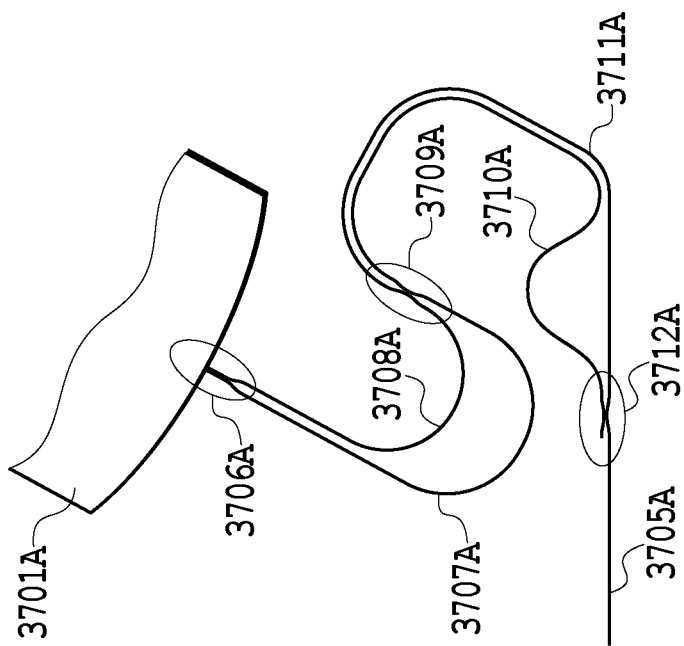
FIG.40B
FIG.40A

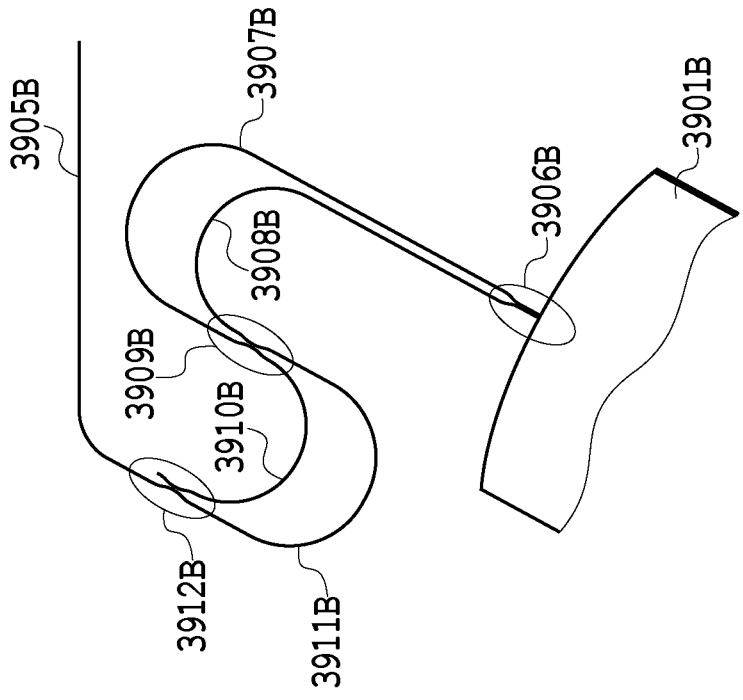
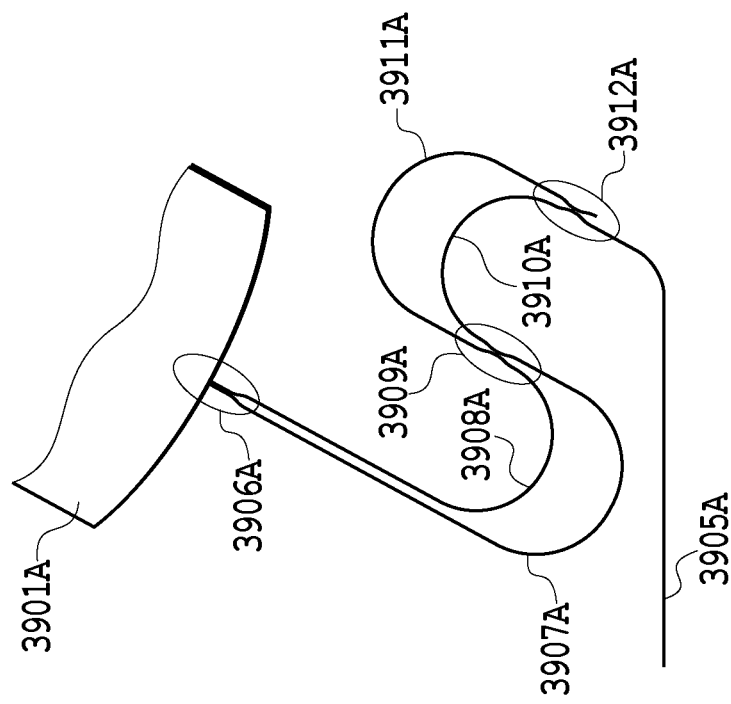

OPTICAL WAVELENGTH MULTI/DEMULTIPLEXER

TECHNICAL FIELD

The present invention relates to an optical wavelength multi/demultiplexer and, more specifically to an optical wavelength multi/demultiplexer including an arrayed waveguide grating.

BACKGROUND ART

Many researches and developments are actively made on planar lightwave circuits (PLCs) each including silica glass waveguides formed on a silicon substrate. Arrayed waveguide gratings (AWGs) using such PLC techniques play an important role in optical communication systems as optical wavelength multi/demultiplexers having a function of demultiplexing a multiplexed light signal having plural optical frequencies (a wavelength division multiplexed signal) into light signals with a predetermined optical frequency channel spacing or a function of multiplexing light signals into a single wavelength division multiplexed signal.

On the other hand, with the progress in optical communication systems, systems connecting plural points and flexibly switching communication paths, such as ring and mesh networks, are being constructed. In such an advanced network, light signals are required to pass through a number of points without being demodulated into electrical signals, and the optical wavelength multi/demultiplexer used in such a system is required to have a broad and flat passband. Such optical wavelength multi/demultiplexers of flat transmission characteristics which have been proposed are a parabola AWG-type optical wavelength multi/demultiplexer including a parabola waveguide at an input end of a slab waveguide and an MZI-synchronized AWG optical wavelength multi/demultiplexer including a combination of a Mach-Zehnder Interferometer (MZI) and an AWG. These related arts are disclosed in PTLs 1 and 2 in detail.

FIG. 1 illustrates an example of the configuration of a parabola AWG type wavelength multi/demultiplexer. A parabola AWG-type wavelength multi/demultiplexer 100 includes a first slab waveguide 101, an arrayed-waveguide 102, a second slab waveguide 103, output waveguides 104, an input waveguide 105, and a parabola waveguide 106. Light incoming through the input waveguide 105 passes through the parabola waveguide 106 and then has a bimodal electric field distribution as shown in FIG. 2. The light having the thus-obtained electric field distribution diffracts and passes through the first slab waveguide 101, and is then excited and propagates through each waveguide of the arrayed-waveguide 102. The light is focused at positions of the output waveguides 104 according to the optical frequencies in the second slab waveguide 103. Herein, the electric field distribution of the light focused at the interface between the slab waveguide 103 and the output waveguides 104 is also bimodal due to the reciprocity theorem. On the other hand, the electric field distribution of the output waveguides 104 receiving the light is a Gaussian distribution as shown in FIG. 2 and has a small width. Accordingly, even if the optical frequency of the incoming light change to shift the light-focusing positions, the overlap integral of both the electric field distributions is kept constant, and thus flat transmission characteristics are obtained as shown in FIG. 3A. Herein, FIG. 3A shows a case of a channel spacing of 100 GHz (0.8 nm). FIG. 3B is an enlarged view of FIG. 3A.

FIG. 4 illustrates an example of the configuration of an MZI-synchronized AWG type wavelength multi/demultiplexer. An MZI-synchronized AWG type wavelength multi/demultiplexer 400 includes a first slab waveguide 401, an arrayed-waveguide 402, a second slab waveguide 403, output waveguides 404, an input waveguide 405, a first optical coupler 406, a first arm waveguide 407, a second arm waveguide 408, and a second optical coupler 409. Light incoming through the input waveguide 405 is distributed to the first and second arm waveguides 407 and 408 by the second optical coupler 409, and thus the light beams have a phase difference according to the optical frequencies due to the optical path difference between the waveguides 407 and 408. The light beams traveling the arm waveguides are combined by the first optical coupler 406 to interfere with each other. The light focusing positions at the interface between the first optical coupler 406 and first slab waveguide 401 periodically changes according to the phase differences (or optical frequencies) between the light beams as shown in FIGS. 5A and 5B. The light entering the first slab waveguide 401 from the first optical coupler 406 diffracts and is excited to propagate through each waveguide of the arrayed-waveguide 402. The light focusing positions in the second slab waveguide 403 vary according to the optical frequencies, and the light beams having desired optical frequencies are distributed to the respective output waveguides 404.

Next, a description is given of the principle to obtain the flat transmission characteristics. When the optical frequency changes from a lower frequency than the central frequency to a higher one, the coordinate of the incident position of the optical field distribution output from the MZI circuit changes from a negative value to a positive value at the interface between the first optical coupler 406 and the first slab waveguide 401. If the change in optical frequency is neglected, the coordinate of the position at which the light beams are focused at the interface between the second slab waveguide 403 and output waveguide 404 changes from a positive value to a negative value due to the optical path differences in the arrayed-waveguide 402. Moreover, when the optical frequency changes from a lower frequency than the central frequency to a higher one, the coordinate of the position at which the light beams are focused at the interface between the second slab waveguide 403 and the output waveguide 404 change from a negative value to a positive value due to the path length difference. The effects of both the cases are thus cancelled out with each other, and the light focusing position remains unchanged even if the optical frequency changes. The flat transmission characteristics shown in FIGS. 6A and 6B can be obtained. Herein, the channel spacing in the drawings is 100 GHz (0.8 nm).

CITATION LIST

Patent Literature

PTL 1: Japanese Patent Laid-Open No. 9-297228 (1997)
PTL 2: Japanese Patent Laid-Open No. 8-69021 (1996)

Non Patent Literature

NPL 1: B. Fondeur et al., "Ultrawide AWG with Hyper-Gaussian Profile", IEE Photonics Technology Letters, vol. 16, pp. 2628-2630, 2004

SUMMARY OF INVENTION

Technical Problems

In order to define the flatness of the aforementioned parabola AWG-type wavelength multi/demultiplexer and MZI-synchronized AWG-type light wavelength multi/demultiplexer, transmission characteristics T(λ) are approximated by a Hyper-Gaussian (HG) function as disclosed in NPL 1.

$$T(\lambda) = 0.5^{\left|\frac{\lambda-\lambda_c}{BW_{3dB}/2}\right|^n} \qquad \text{Equation 1}$$

Herein, $BW_{3\,dB}$ is 3 dB bandwidth; $\lambda_c$, central wavelength; and n, the degree of the HG function.

FIGS. 7A and 7B show the dependency of the light transmission characteristics on the degree of the HG function. In the case of n=2, the transmission characteristics are expressed by a parabola function, and the larger the value of n, the more rectangular the light transmission characteristics.

If the transmission characteristics of the aforementioned parabola AWG type wavelength multi/demultiplexer are approximated by the HG function, the degree thereof is n=3.6 as shown in FIGS. 3A and 3B. On the other hand, if the transmission characteristics of the aforementioned MZI-synchronized AWG type wavelength multi/demultiplexer are approximated by the HG function, the degree thereof is n=4.0. According to the related art, it is difficult to implement transmission characteristics with a rectangular degree of n>4.

The present invention was made in the light of the above-described problem, and an object of the present invention is to provide an optical wavelength multi/demultiplexer having transmission characteristics with a higher rectangular degree than the conventional one.

Solution to Problems

To achieve such an object, a first aspect of the invention is an optical wavelength multi/demultiplexer including: an AWG multi/demultiplexer and a two-stage lattice circuit connected to the AWG multi/demultiplexer, in which the AWG multi/demultiplexer includes: an arrayed waveguide grating; first and second slab waveguides connected to both ends of the arrayed waveguide grating; an input waveguide connected to the first slab waveguide; and an output waveguide connected to the second slab waveguide. The two-stage lattice circuit includes: a first optical coupler connected to another end of the first slab waveguide which is not connected to the arrayed-waveguide; first and second arm waveguides connected to the first optical coupler; a second optical coupler connected to other ends of the first and second arm waveguides which are not connected to the first optical coupler; third and fourth optical arm waveguides connected to the second optical coupler; a third optical coupler connected to other ends of the third and fourth arm waveguides which are not connected to the second optical coupler; and an input waveguide connected to the third optical coupler. In such an optical wavelength multi/demultiplexer, an optical frequency period of the two-stage lattice circuit includes an optical frequency channel spacing of the arrayed waveguide grating and a period half the optical frequency channel spacing.

A second aspect of the invention is characterized in the first aspect in that the first optical coupler has a coupling efficiency of 50%.

A third aspect of the invention is characterized in the second aspect in that the second optical coupler has a coupling efficiency of 50%.

A fourth aspect of the invention is characterized in the third aspect in that the third optical coupler has a coupling efficiency of not more than 20%.

A fifth aspect of the invention is characterized in any one of the first to fourth aspects in that the optical frequency period defined by an optical path length difference between the first and second arm waveguides and an optical path length difference between the third and fourth arm waveguides is equal to the optical frequency channel spacing of the arrayed waveguide grating.

A sixth aspect of the invention is characterized in any one of the first to fourth aspects in that: the optical frequency period defined by an optical path length difference between the first and second arm waveguides is equal to the optical frequency channel spacing of the arrayed waveguide grating; and the optical frequency period defined by an optical path length difference between the third and fourth arm waveguides is half the optical frequency period of the arrayed waveguide grating.

A seventh aspect of the invention is an optical module including first optical multi/demultiplexer each being the optical wavelength multi/demultiplexer according to any one of the first to sixth aspects; and second optical multi/demultiplexer each being the optical wavelength multi/demultiplexer according to any one of first to sixth aspects. The second optical wavelength multi/demultiplexer having a same transmission waveform as that of the first optical multi/demultiplexer and having chromatic dispersion opposite to that of the first optical multi/demultiplexer by changing, to the opposite signs, both the plus or minus sign of a value of the optical path length difference between the first and second arm waveguides and the plus or minus sign of a value of the optical path length difference between the third and fourth arm waveguides; and by providing a cross waveguide between the first optical coupler and the first and second arm waveguides. The number of the first optical multi/demultiplexer is equal to the number of the second optical multi/demultiplexer in the same optical module.

An eighth aspect of the invention an optical communication system including: first optical multi/demultiplexer each being the optical wavelength multi/demultiplexer according to any one of the first to sixth aspects; and second optical multi/demultiplexer each being the optical wavelength multi/demultiplexer according to anyone of first to sixth aspects. The second optical wavelength multi/demultiplexer having a same transmission waveform as that of the first optical multi/demultiplexer and having chromatic dispersion opposite to that of the first optical multi/demultiplexer by changing, to the opposite signs, both the plus or minus sign of a value of the optical path length difference between the first and second arm waveguides and the plus or minus sign of a value of the optical path length difference between the third and fourth arm waveguides; and by providing a cross waveguide between the first optical coupler and the first and second arm waveguides. The number of the first optical multi/demultiplexer is equal to the number of the second optical multi/demultiplexer in a same transmission section.

A ninth aspect of the invention is an optical module including first optical multi/demultiplexer each being the optical wavelength multi/demultiplexer according to anyone of the first to sixth aspects; and second optical multi/demultiplexer each being the optical wavelength multi/demultiplexer according to any one of the first to sixth aspects. The second optical wavelength multi/demultiplexer having a same transmission waveform as that of the first optical multi/demultiplexer and having chromatic dispersion opposite to that of the first optical multi/demultiplexer by connecting the input waveguide to the other one of two input ports of the third optical coupler which are located at positions axisymmetric with respect to an axis of incidence, and by setting the phase difference between the first and second arm waveguides to 180 degrees to make the optical frequency channel spacing of the arrayed waveguide grating equal to the optical frequency period of the two-stage lattice circuit. The number of the first optical multi/demultiplexer is equal to the number of the second optical multi/demultiplexer in the same optical module.

A tenth aspect of the invention is an optical communication system including: first optical multi/demultiplexer each being the optical wavelength multi/demultiplexer according to any one of the first to sixth aspects; and second optical multi/demultiplexer each being the optical wavelength multi/demultiplexer according to anyone of the first to sixth aspects. The second optical wavelength multi/demultiplexer having a same transmission waveform as that of the first optical multi/demultiplexer and having chromatic dispersion opposite to that of the first optical multi/demultiplexer by connecting the input waveguide to the other one of two input ports of the third optical coupler which are located at positions axisymmetric with respect to an axis of incidence, and by setting the phase difference between the first and second arm waveguides to 180 degrees to make the optical frequency channel spacing of the arrayed waveguide grating equal to the optical frequency period of the two-stage lattice circuit. The number of the first optical multi/demultiplexer is equal to the number of the second optical multi/demultiplexer in a same transmission section.

An eleventh aspect of the invention is characterized in the optical wavelength multi/demultiplexer according to any one of the first to sixth aspects in that each of a first delay circuit composed of the first and second arm waveguides and a second delay circuit composed of the third and fourth arm waveguides includes a folding portion in which the two-stage lattice circuit is arranged in a folded manner.

Advantageous Effects of Invention

According to the present invention, the optical wavelength multi/demultiplexer including the arrayed waveguide grating and two-stage lattice circuit is designed so that the optical frequency period of the two-stage lattice circuit includes the optical frequency channel spacing of the arrayed waveguide grating and the period half the optical frequency channel spacing. This can increase the rectangular degree of the transmission characteristics compared to the conventional art and implement an optical multi/demultiplexer which is applicable to an advanced network in which optical signals pass through a number of points.

BRIEF DESCRIPTION OF DRAWINGS

FIG. 40A is an enlarged view of a part from an input waveguide 3705A to a first slab waveguide 3701A in a first optical wavelength multi/demultiplexer 3700A of FIG. 39;

FIG. 40B is an enlarged view of a part from an input waveguide 3700B to a first slab waveguide 3701B in a second optical wavelength multi/demultiplexer 3700B of FIG. 39;

FIG. 42A is an enlarged view of a part from an input waveguide 3905A to a first slab waveguide 3901A in a first optical wavelength multi/demultiplexer 3900A of FIG. 41;

FIG. 42B is an enlarged view of a part from an input waveguide 3905B to a first slab waveguide 3901B in a second optical wavelength multi/demultiplexer 3900B of FIG. 41.

DESCRIPTION OF EMBODIMENTS

Hereinafter, a description is given of embodiments of the present invention in detail with reference to the drawings.

As described in the Background Art, if an MZI-synchronized AWG-type optical wavelength multi/demultiplexer can be designed so that the effect of changes in light focusing position at the optical coupler end due to the phase differences in arm waveguides of the MZI is canceled with the effect of changes in light focusing position at the slab waveguide end due to the optical path length differences of arrayed-waveguides to keep the light focusing position in place in a wider optical frequency range, it is possible to provide flatter transmission characteristics with the rectangular degree improved.

Figure 1:
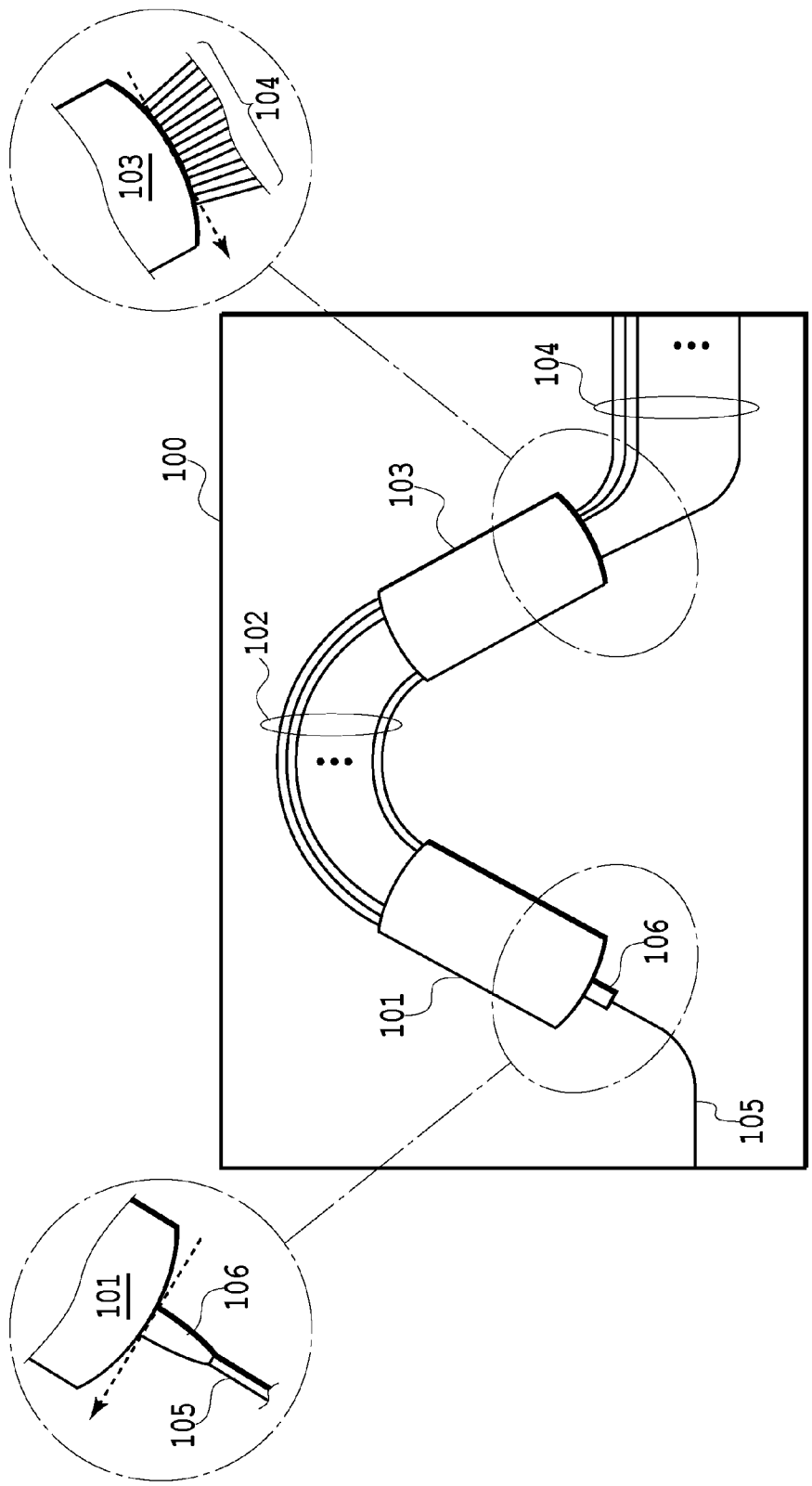
FIG. 1 is a configuration view of a conventional parabola AWG-type optical wavelength multi/demultiplexer.
Figure 2:
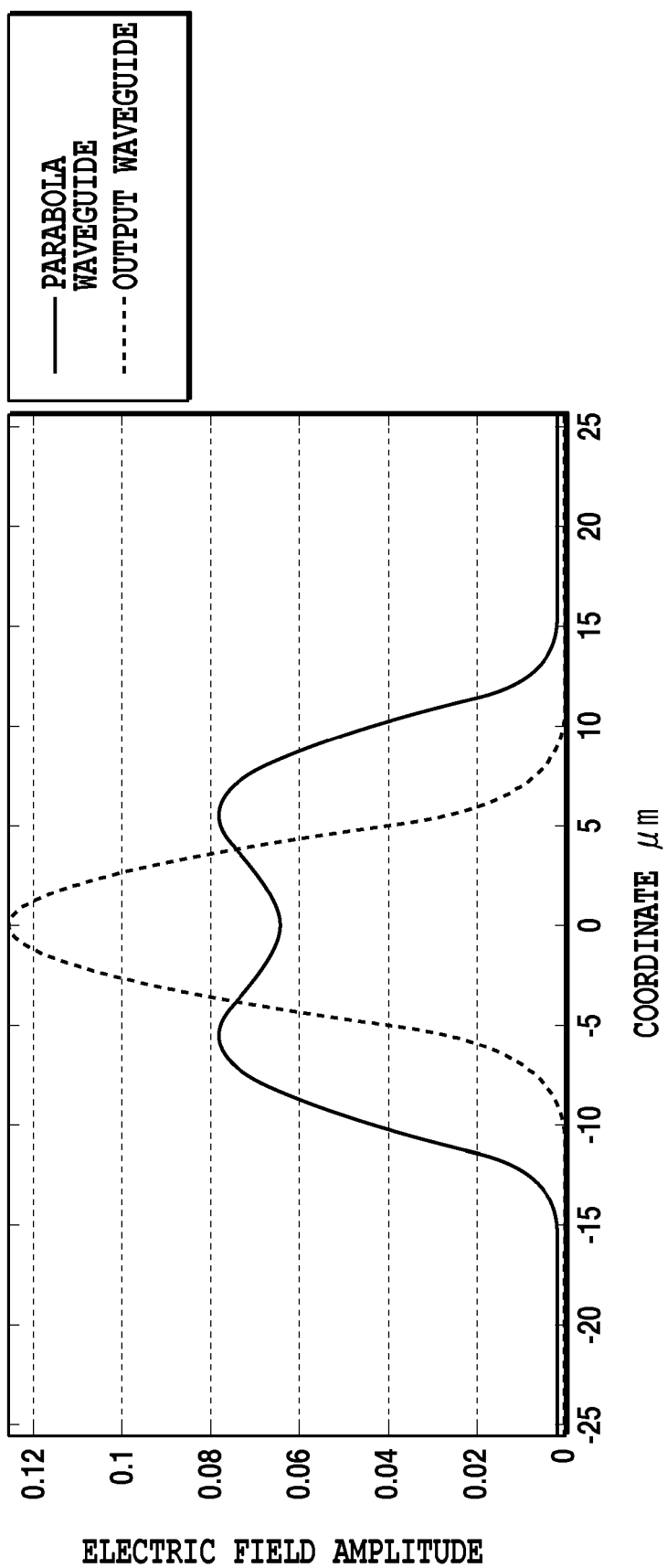
FIG. 2 is a view showing an electric field of a parabola waveguide 106 and an output waveguide 104 in FIG. 1.
Figure 3B:
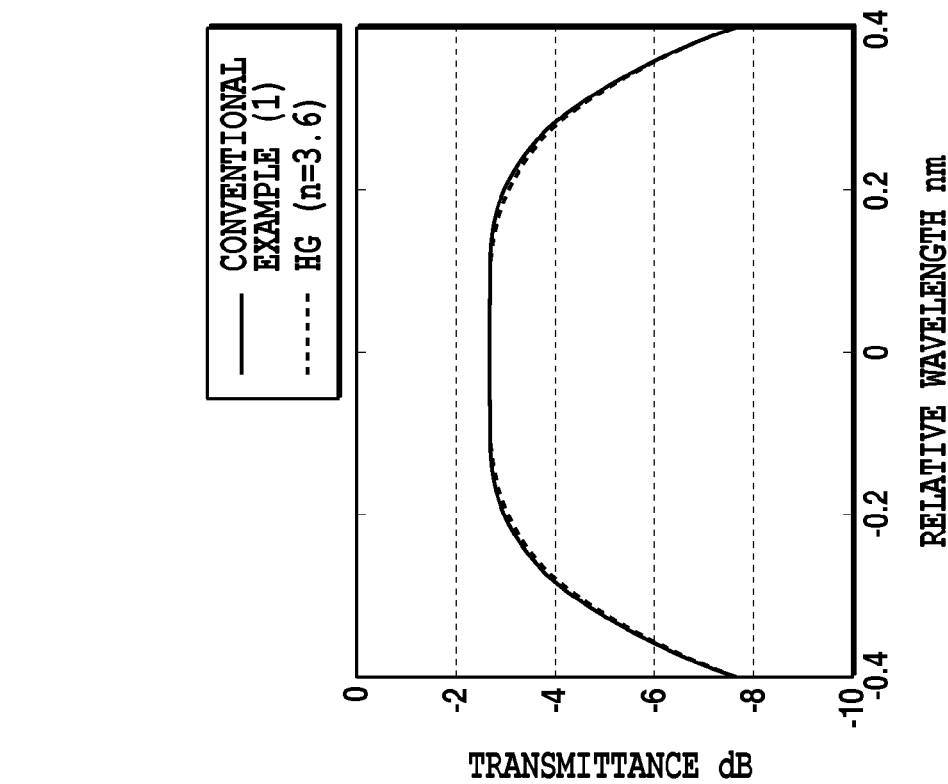
FIG. 3B is a chart showing the transmission characteristics of the parabola AWG-type optical wavelength multi/demultiplexer of FIG. 1.
Figure 3A:
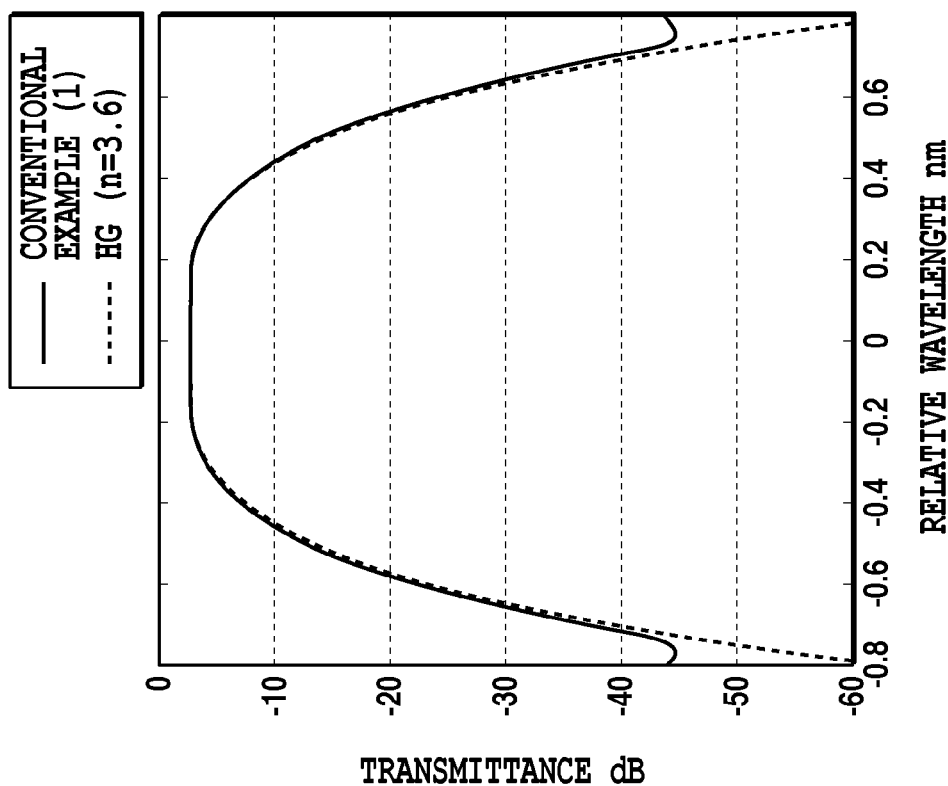
FIG. 3A is a chart showing the transmission characteristics of the parabola AWG-type optical wavelength multi/demultiplexer of FIG. 1.
Figure 4:
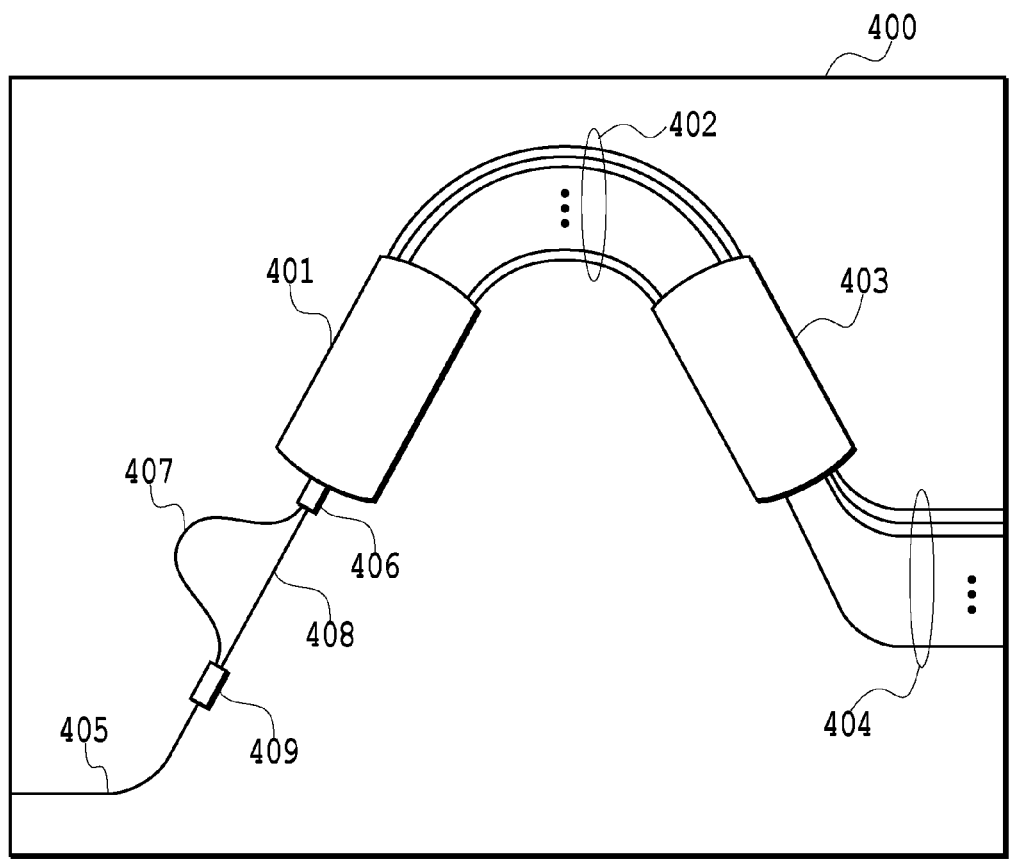
FIG. 4 is a configuration view of a conventional MZI-synchronized AWG-type optical wavelength multi/demultiplexer.
Figure 5A:
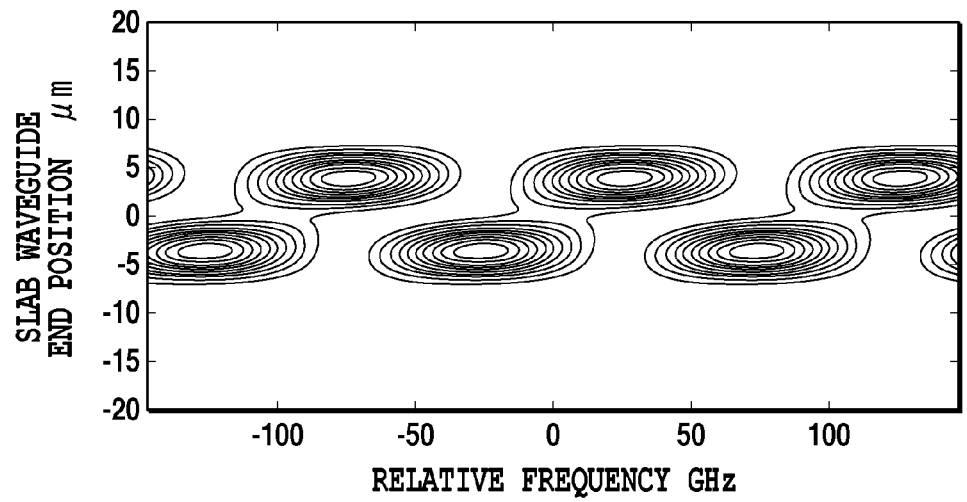
FIG. 5A is a chart showing distributions of light focused at an optical coupler 406 and a first slab waveguide 401 in FIG. 4.
Figure 5B:
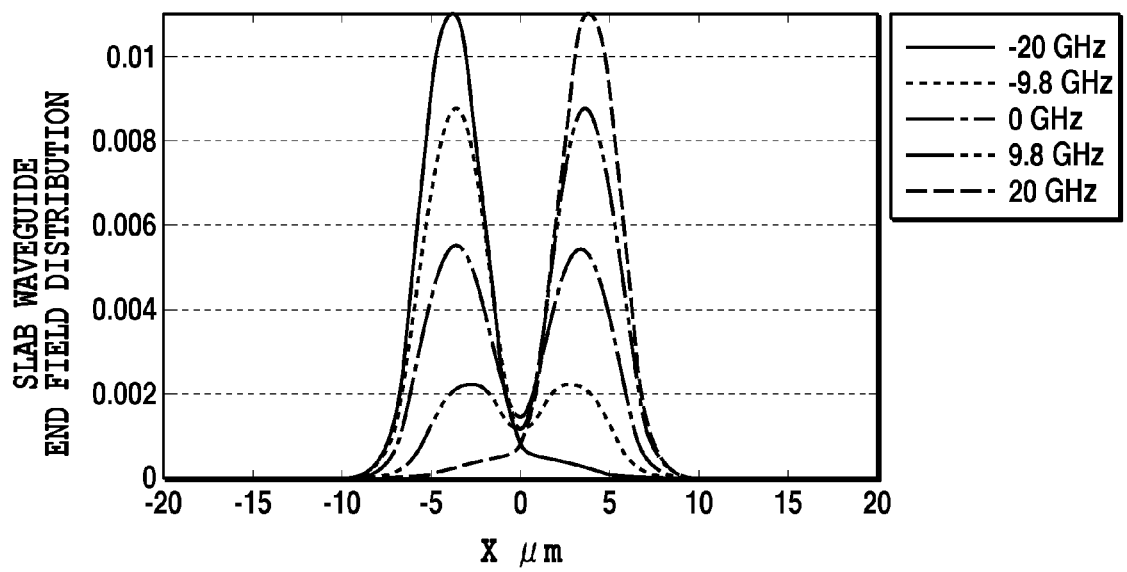
FIG. 5B is a chart showing distributions of light focused at the optical coupler 406 and first slab waveguide 401 in FIG. 4.
Figure 6B:
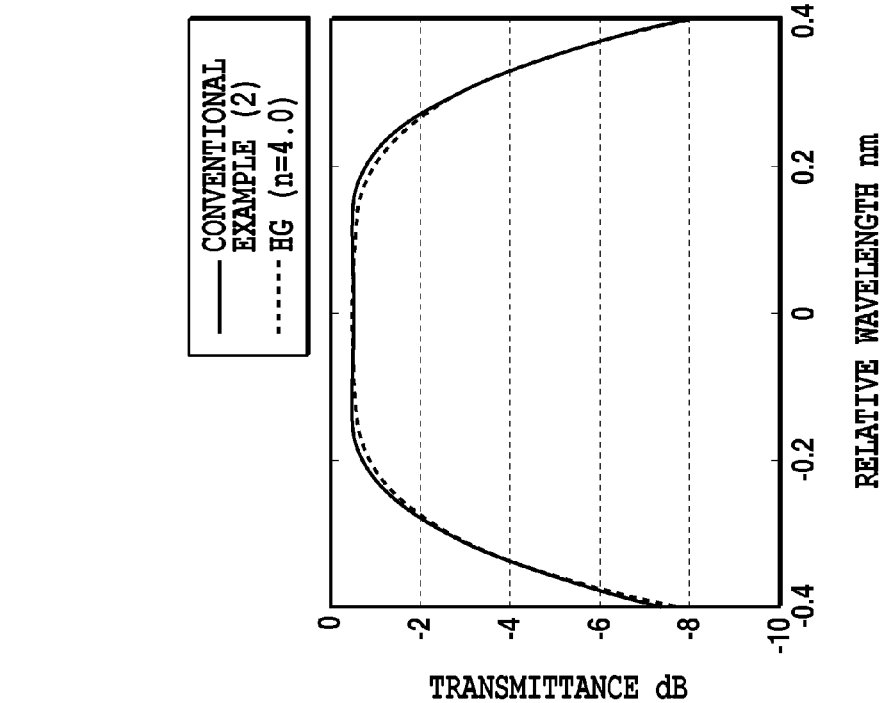
FIG. 6B is a chart showing the transmission characteristics of the MZI-synchronized AWG-type optical wavelength multi/demultiplexer of FIG. 4.
Figure 6A:
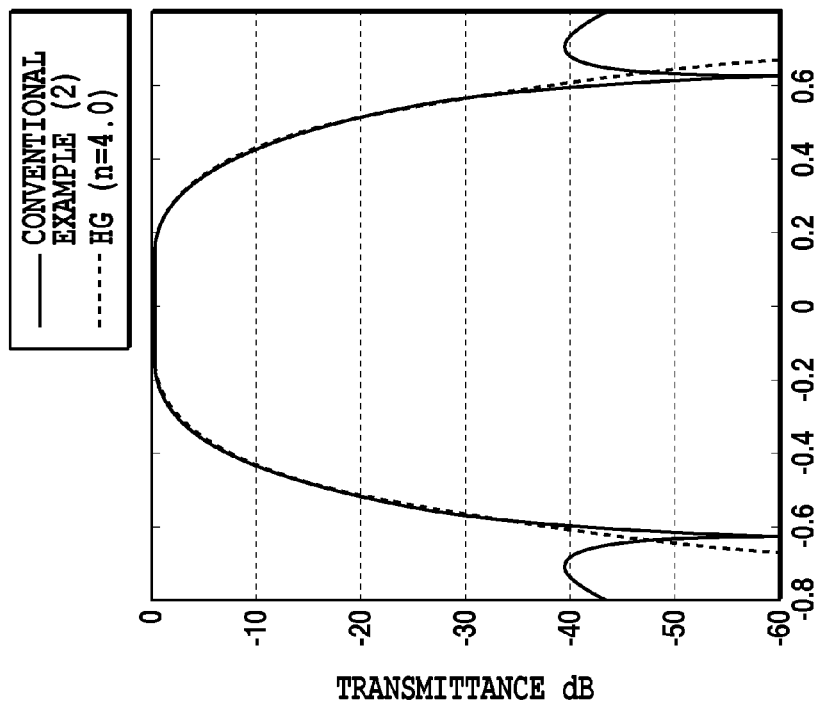
FIG. 6A is a chart showing the transmission characteristics of the MZI-synchronized AWG-type optical wavelength multi/demultiplexer of FIG. 4.
Figure 7B:
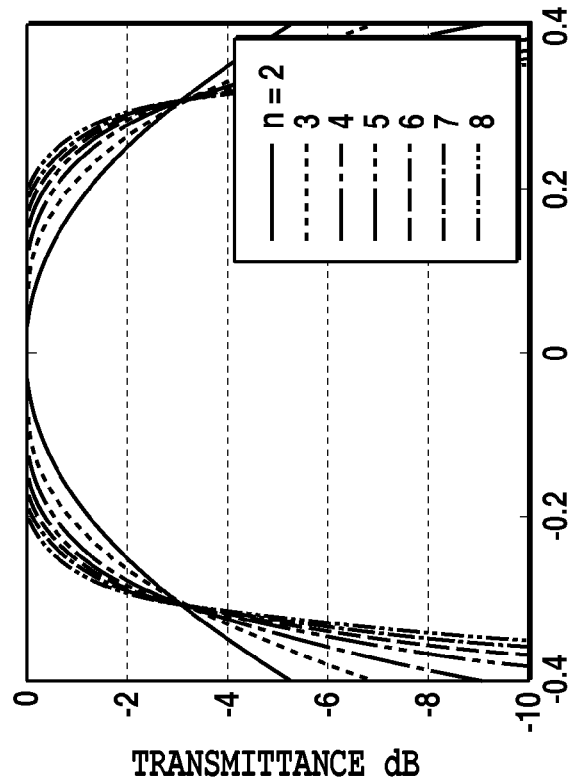
FIG. 7B is a chart showing the dependency of the transmission characteristics on the degree of the HG function.
Figure 7A:
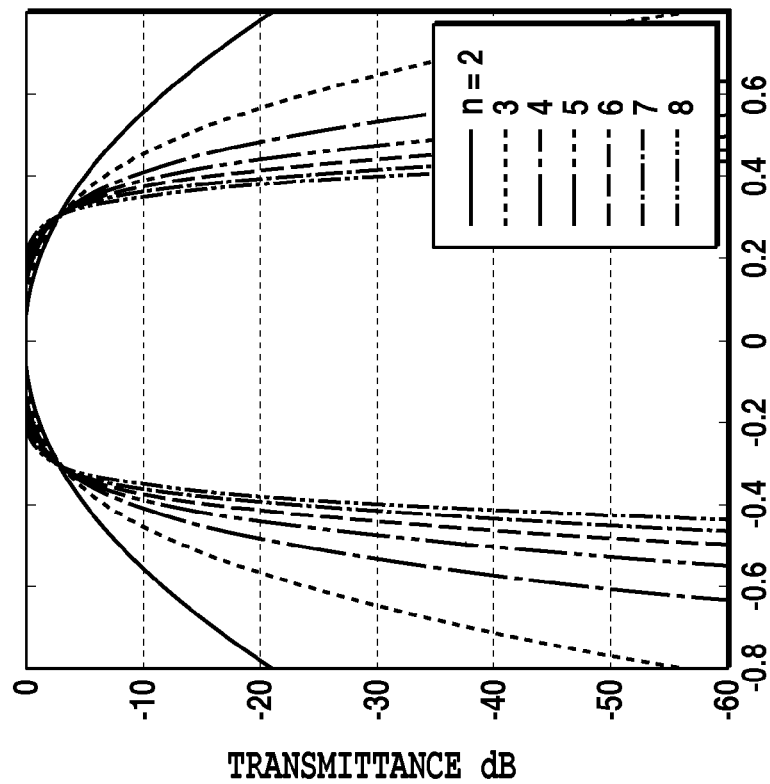
FIG. 7A is a chart showing the dependency of the transmission characteristics on the degree of the HG function.
Figure 8:
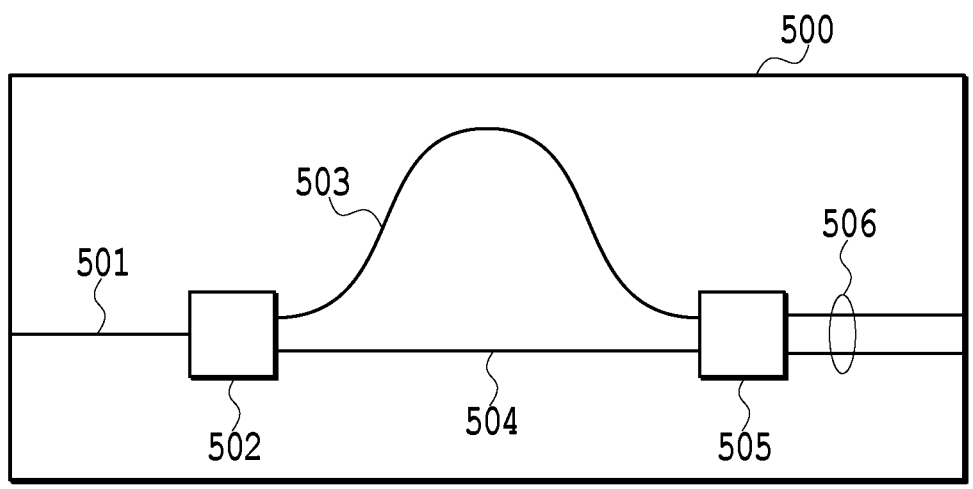
FIG. 8 is a view showing a general MZI circuit.

FIG. 8 shows a general MZI circuit. An MZI circuit 500 includes an input waveguide 501, a first optical coupler 502, a first arm waveguide 503, a second arm waveguide 504, a second optical coupler 505, and an output waveguide 506.

Figure 9A:
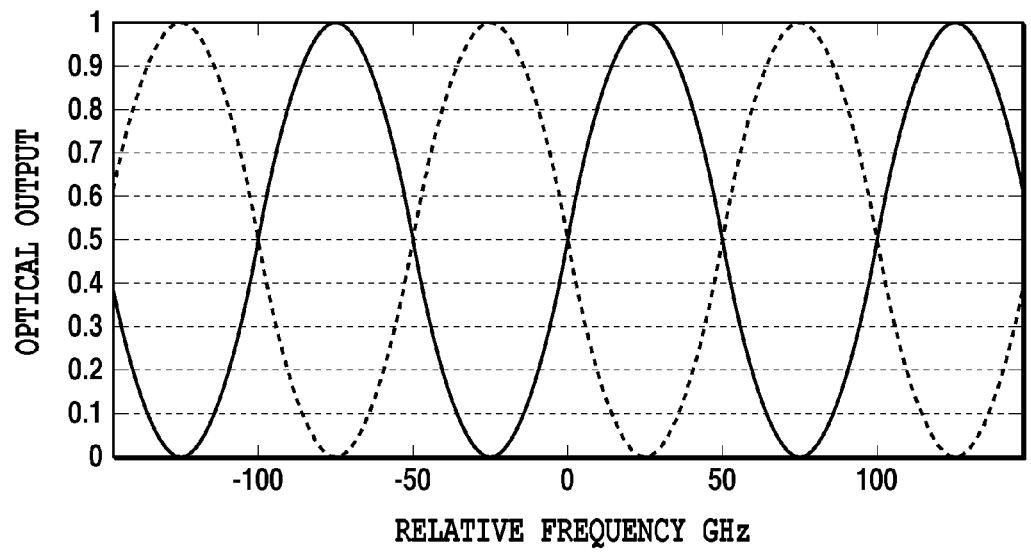
FIG. 9A is a chart showing an optical output of the MZI circuit of FIG. 8.
Figure 9B:
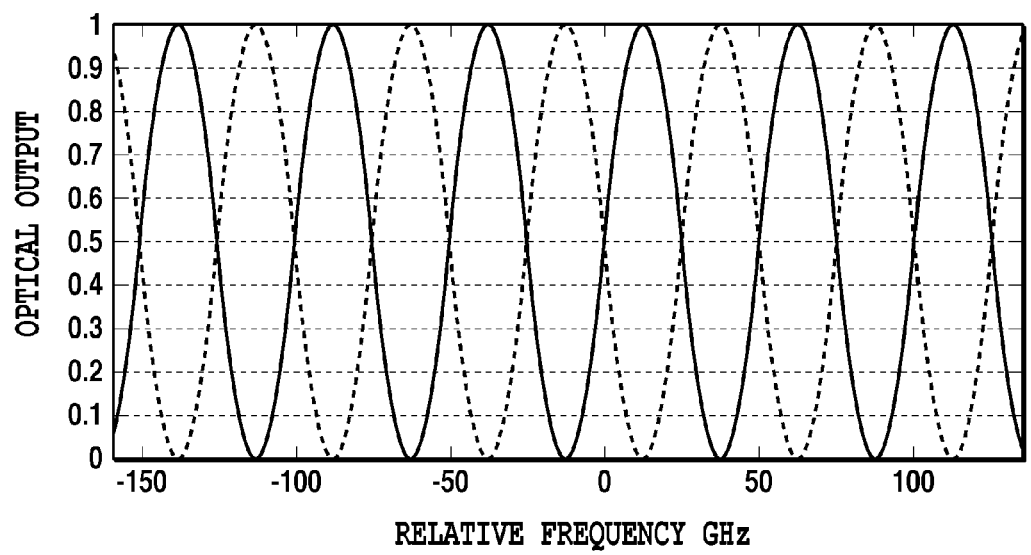
FIG. 9B is a chart showing the optical output of the MZI circuit of FIG. 8.

Herein, the channel spacing is 100 GHz, and the optical path length difference $\Delta L$ between the first and the second arm waveguides 503 and 504 is 2023 μm. The optical path length difference $\Delta L$ between the first and second arm waveguides 503 and 504 produces a phase difference between light beams incoming through the input waveguide 501 according to the optical frequencies. Accordingly, as shown in FIG. 9A, the optical output changes with an optical frequency period of 100 GHz. Herein, if the optical path length difference is doubled, namely, set to $2 \cdot \Delta L = 4046$ μm, the optical output changes with a half optical frequency period of 50 GHz as shown in FIG. 9B. Accordingly, if the MZI circuit placed before the AWG includes an interference circuit provided with an optical path length difference including both components of $\Delta L$ and $2 \cdot \Delta L$, the above-described changes in light focusing position at the optical coupler end can be controlled more precisely. In Fourier series expansion of an arbitrary waveform, the waveform can be reproduced more accurately by expansion using higher-order frequency components. On the analogy of this fact, in the interference circuit in which the optical path length difference in the MZI circuit placed before the AWG includes components of not only ΔL but also 2·ΔL, the changes in light focusing position at the optical coupler end can be controlled more accurately. To be specific, it is necessary to apply the circuit configuration of a two-stage lattice circuit shown in FIGS. 10A and 10B (the channel spacing is set to 100 GHz).

Figure 10A:
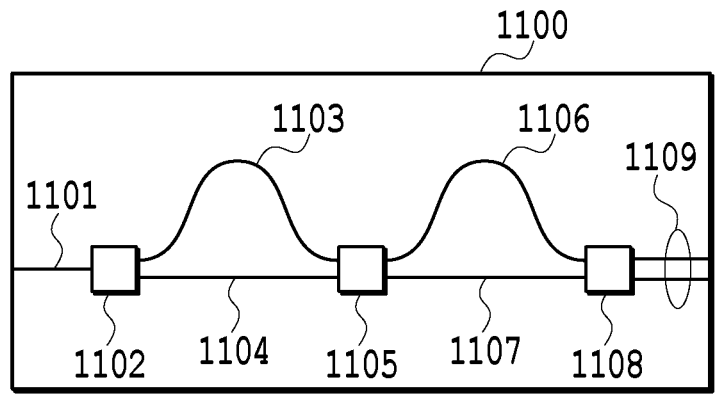
FIG. 10A is a configuration view of a two-stage lattice circuit according to the present invention.

A two-stage lattice circuit 1100 of FIG. 10A includes an input waveguide 1101, a third optical coupler 1102, a third arm waveguide 1103, a fourth arm waveguide 1104, a second optical coupler 1105, a first arm waveguide 1106, a second arm waveguide 1107, a first optical coupler 1108, and output waveguides 1109. The optical path length difference between the third and fourth arm waveguides 1103 and 1104 is designed to be ΔL, and the optical path length difference between the first and second arm waveguides 1106 and 1107 is designed to be ΔL. Accordingly, the path passing through the arm waveguides 1103 and 1106 has an optical path length difference of 2·ΔL from the path passing through the arm waveguides 1104 and 1107. Each path passing through the arm waveguides 1103 and 1107 and through the arm waveguides 1104 and 1106 has an optical path length difference of ΔL from the path passing through the arm waveguides 1104 and 1107.

Figure 10B:
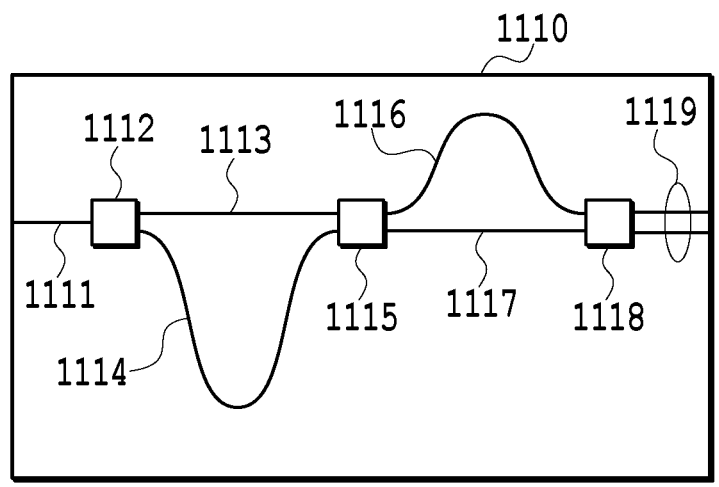
FIG. 10B is a configuration view of the two-stage lattice circuit according to the present invention.

A two-stage lattice circuit 1110 of FIG. 10B includes an input waveguide 1111, a third optical coupler 1112, a third arm waveguide 1113, a fourth arm waveguide 1114, a second optical coupler 1115, a first arm waveguide 1116, a second arm waveguide 1117, a first optical coupler 1118, and output waveguides 1119. The optical path length difference between the third and fourth arm waveguides 1113 and 1114 is designed to be 2·ΔL, and the optical path length difference between the first and second arm waveguides 1116 and 1117 is designed to be ΔL. Accordingly, the path passing through the arm waveguides 1114 and 1117 has an optical path length difference of 2·ΔL from the path passing through the arm waveguides 1113 and 1117. The path passing through the arm waveguides 1113 and 1106 has an optical path length difference of ΔL from the path passing through the arm waveguides 1113 and 1117.

Figure 11A:
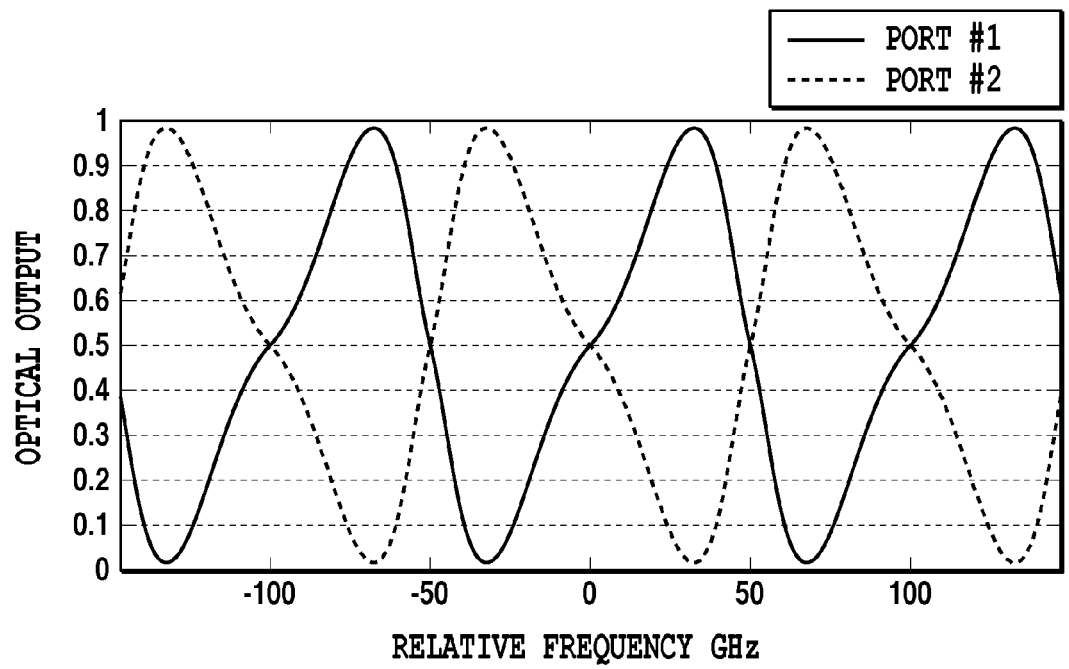
FIG. 11A is a chart showing the optical output of the two-stage lattice circuit of FIG. 10A.
Figure 11B:
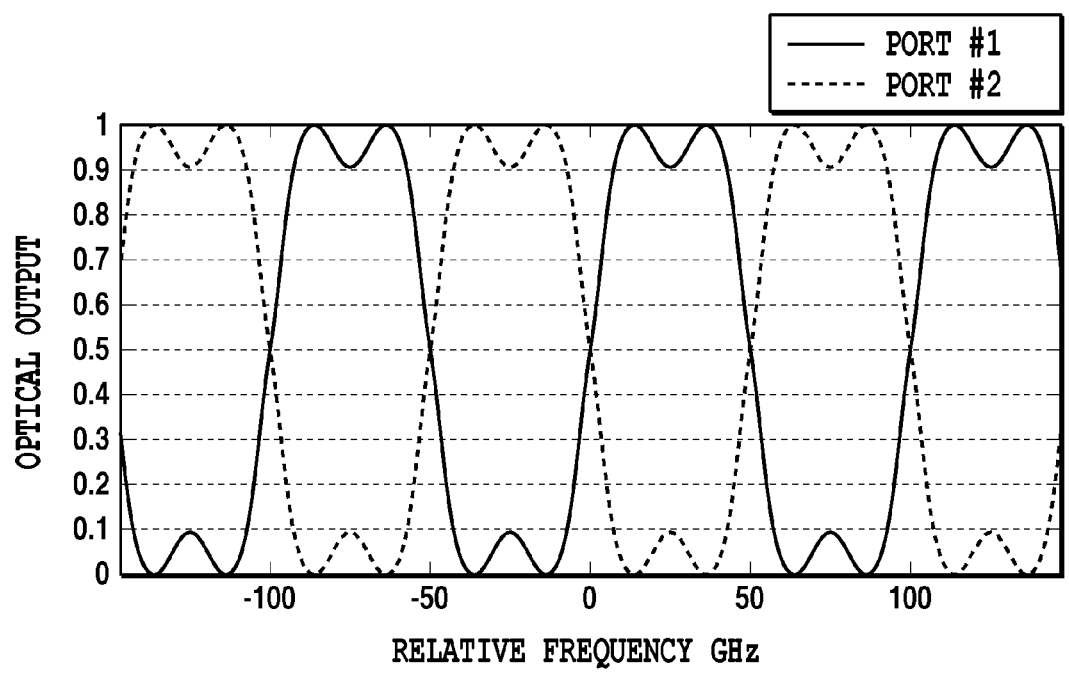
FIG. 11B is a chart showing the optical output of the two-stage lattice circuit of FIG. 10B.

FIGS. 11A and 11B are charts showing optical outputs of the two-stage lattice circuits of FIGS. 10A and 10B, respectively. Since the optical path differences include the components of not only ΔL but also 2·ΔL, the outputs thereof can be changed more steeply than the results of FIG. 9A. The rectangular degree of the transmission characteristics of the AWG can be therefore increased.

A description is given of some embodiments below. It should be noted that the present invention is not limited by particular numerals and the like shown in these embodiments. Moreover, the description is made mainly using directional couplers as a means of implementing optical couplers. However, the scope of the invention is not limited to this implementation means. The invention may include any splitter or coupler capable of achieving a predetermined coupling efficiency. It should be noted that an asymmetric Y branch, a multi-mode interference coupler (MMI), or the like may be applied, for example.

First Embodiment

Figure 12:
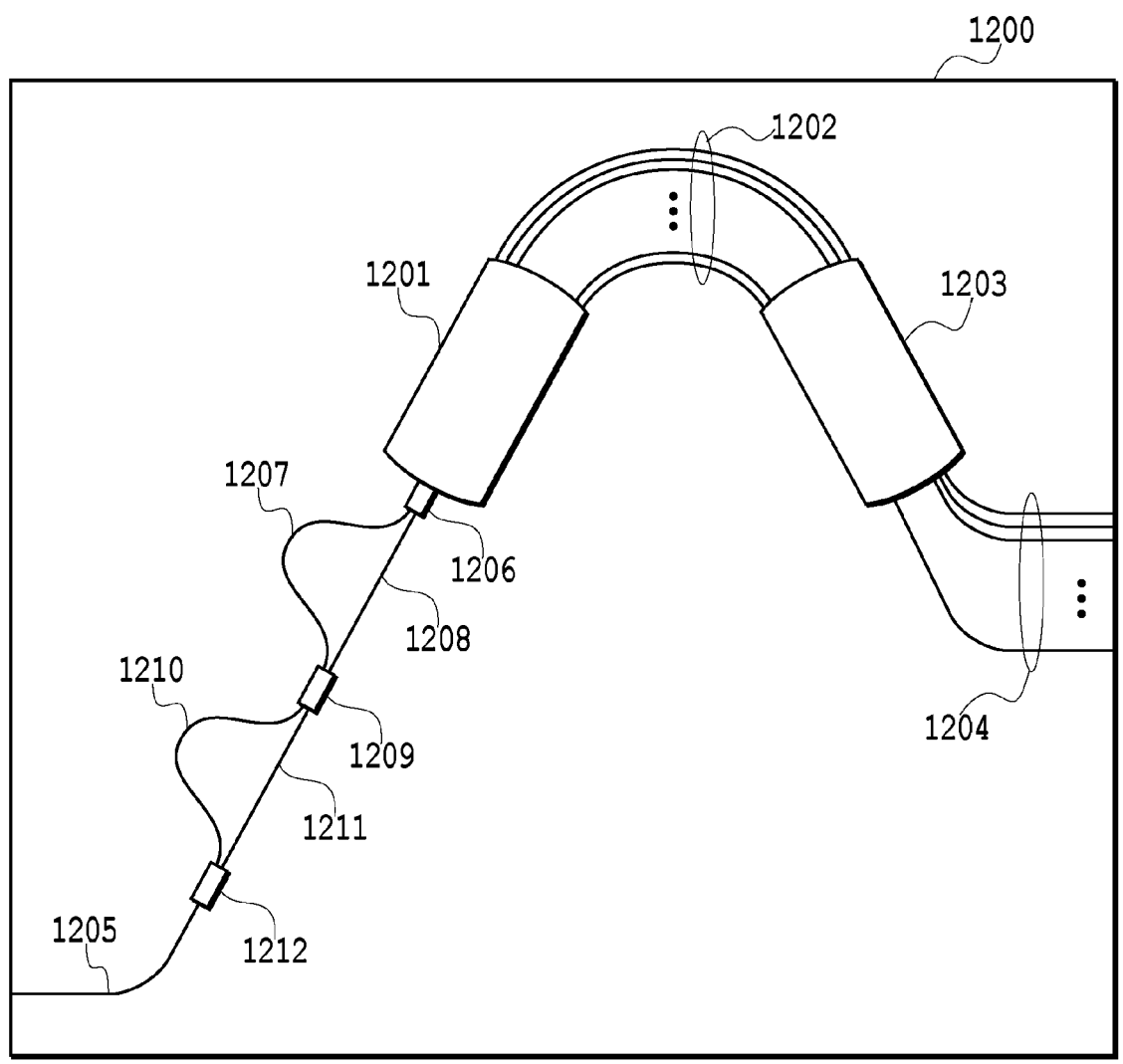
FIG. 12 is a configuration view of an optical wavelength multi/demultiplexer according to a first embodiment of the present invention.

FIG. 12 is a plan view illustrating an optical wavelength multi/demultiplexer according to a first embodiment of the invention. The first embodiment is a specific example including a two-stage lattice circuit of the type shown in FIG. 10A. A synchronized AWG-type optical multi/demultiplexer 1200 includes a first slab waveguide 1201, arrayed-waveguides 1202, a second slab waveguide 1203, output waveguides 1204, a first optical coupler 1206, a first arm waveguide 1207, a second arm waveguide 1208, and a second optical coupler 1209, a third arm waveguide 1210, a fourth arm waveguide 1211, a third optical coupler 1212, and an input waveguide 1205.

The optical wavelength multi/demultiplexer 1200 has a relative refractive index difference Δ of 1.5% and a core thickness of 4.5 μm. The core widths of the input waveguide 1205, output waveguides 1204, arrayed-waveguides 1202, first arm waveguide 1207, second arm waveguide 1208, third arm waveguide 1210, and fourth arm waveguide 1211 are 4.5 μm. The portions of the arrayed-waveguides 1202 which are connected to the first and second slab waveguides 1201 and 1203 are positioned with a pitch of 10 μm. The number of the output waveguides 1204 are the same as the number of wavelength channels, and the portions of the output waveguides 1204 which are connected to the second slab waveguide 1203 are arranged with a pitch of 17 μm. At the terminal end of each output waveguide 1204, a linear tapered waveguide is provided so as to have an opening width of 12.5 μm. Moreover, the optical multi/demultiplexer 1200 is designed so that: the number of wavelength channels is 40; the optical frequency channel spacing, 100 GHz; the length of the first and second slab waveguides 1201 and 1203, 9566.85 μm; the number of arrayed-waveguides 1202, 187; and the optical path length difference between the arrayed-waveguides adjacent to each other, 33.98 μm.

Figure 13:
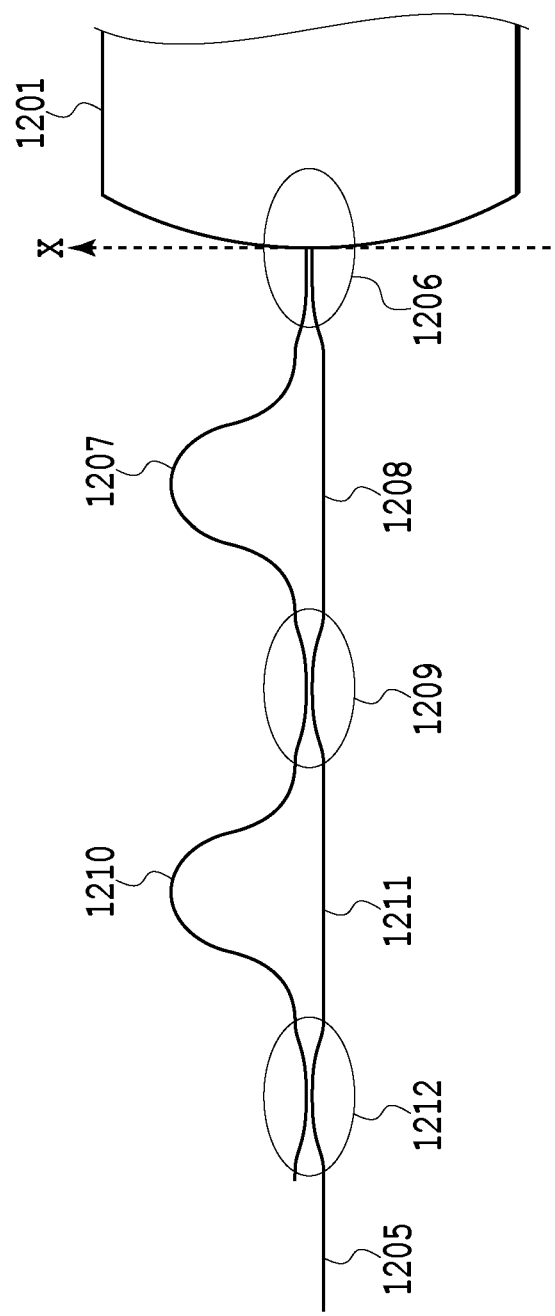
FIG. 13 is an enlarged view of a part from an input waveguide 1205 to a first slab waveguide 1201 of FIG. 12.

FIG. 13 is an enlarged view of a part from the input waveguide 1205 to the first slab waveguide 1201 in FIG. 12. The first to third optical couplers 1206, 1209, and 1212 include directional couplers. The waveguide width and waveguide pitch of the directional couplers are 4.5 μm and 6.5 μm, respectively. The coupling efficiencies of the first to third optical couplers 1206, 1209, and 1212 are designed to be 50%, 50%, and 8%, respectively. The optical path length differences between the first and second arm waveguides 1207 and 1208 and between the third and fourth arm waveguides 1210 and 1211 are both designed to be 2023 μm.

Figure 14:
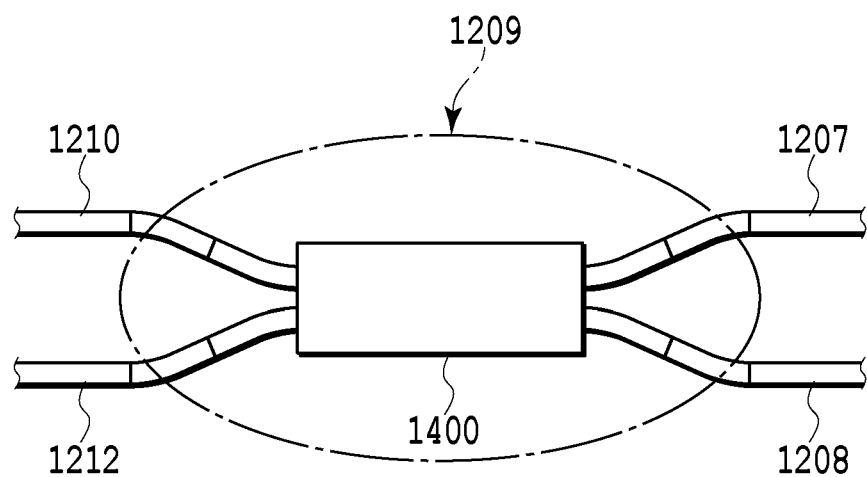
FIG. 14 is a view showing another configuration of a second optical coupler provided for the optical wavelength multi/demultiplexer according to the first embodiment.

The second optical coupler 1209 includes the directional coupler, but the invention is not limited to this configuration. FIG. 14 is an enlarged view around the second optical coupler in another configuration. The configuration of FIG. 14 employs a two-input two-output multi-mode interference coupler (MMI) 1400. Herein, the coupler 1400 has a width of 18 μm, a length of 740 μm, an input/output waveguide pitch of 12 μm, and a coupling efficiency of 50%. The coupling efficiency of the MMI is less affected by manufacturing errors than that of the directional couplers. Accordingly, the application of the MMI allows for implementation of an optical wavelength multi/demultiplexer having more excellent manufacturing tolerance.

Figure 15A:
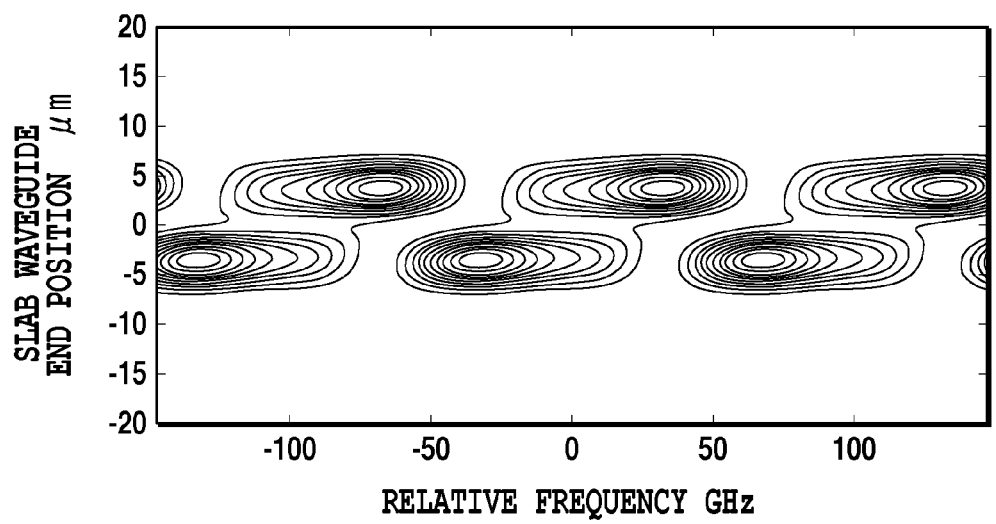
FIG. 15A is a chart showing the distribution of light focused in a joint interface between a first optical coupler 1206 and the first slab waveguide 1201 of FIG. 13.
Figure 15B:
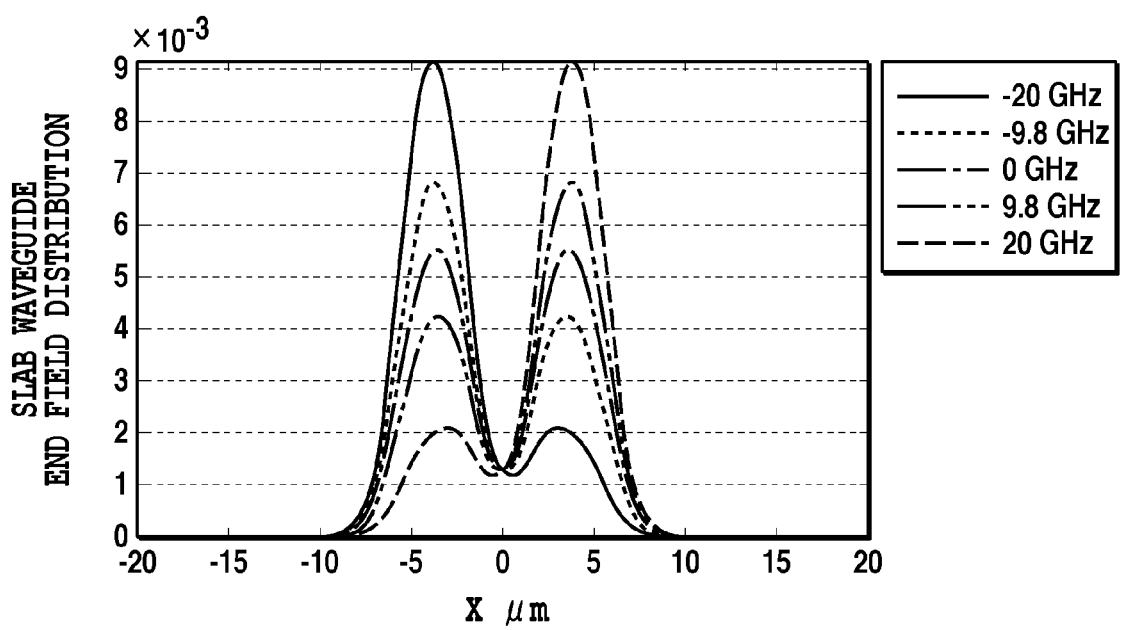
FIG. 15B is a chart showing the distribution of light focused in the joint interface between the first optical coupler 1206 and first slab waveguide 1201 of FIG. 13.

From FIGS. 15A and 15B, it can be confirmed that the light focusing position at the interface where the first optical coupler 1206 is joined to the first slab waveguide 1201 periodically changes according to the optical frequencies.

Figure 16B:
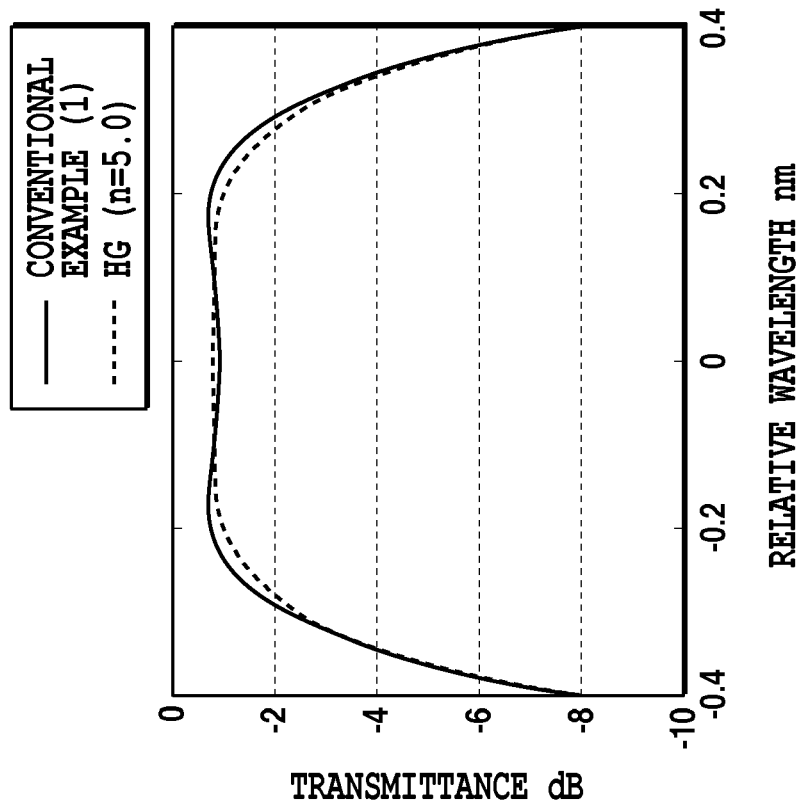
FIG. 16B is a chart showing the transmission characteristics of the optical wavelength multi/demultiplexer according to the first embodiment.
Figure 16A:
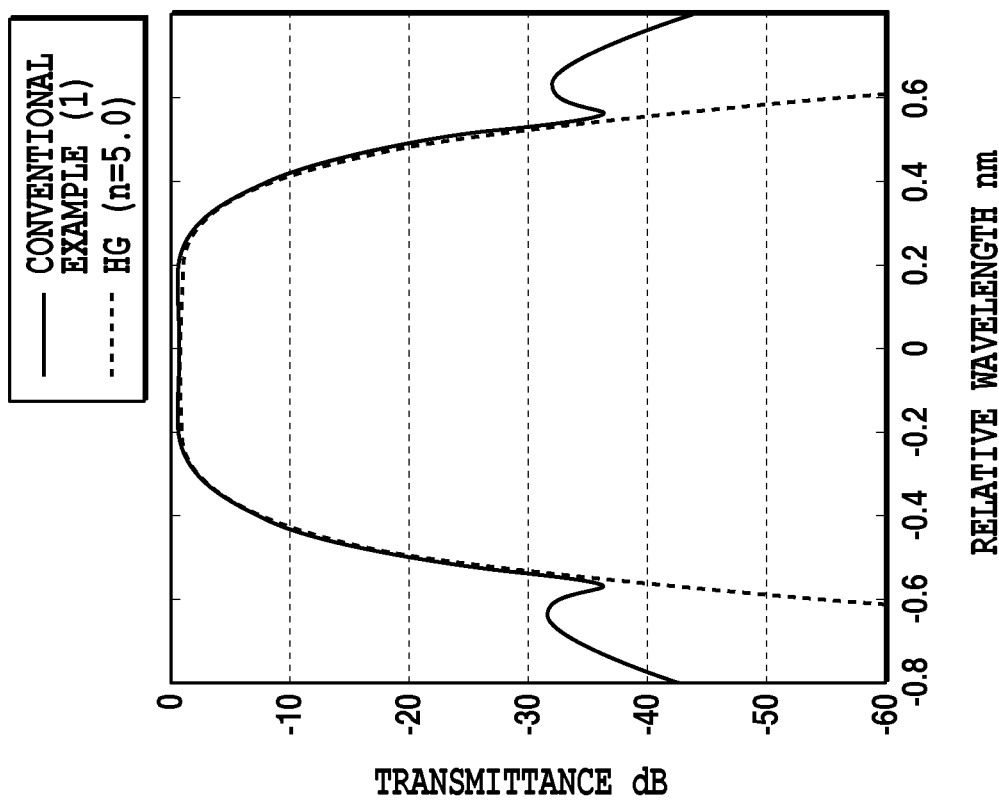
FIG. 16A is a chart showing the transmission characteristics of the optical wavelength multi/demultiplexer according to the first embodiment.

FIGS. 16A and 16B are charts showing a transmission spectrum waveform of the optical wavelength multi/demultiplexer of this embodiment. The charts reveal that the obtained transmission spectrum is flat. If the waveform is approximated by an HG function, the degree thereof is n=5.0. Compared with the MZI-synchronized AWG-type of the conventional art, whose degree of the HG function is n=4.0, this embodiment can achieve a 125% improvement in rectangular degree.

Figure 17:
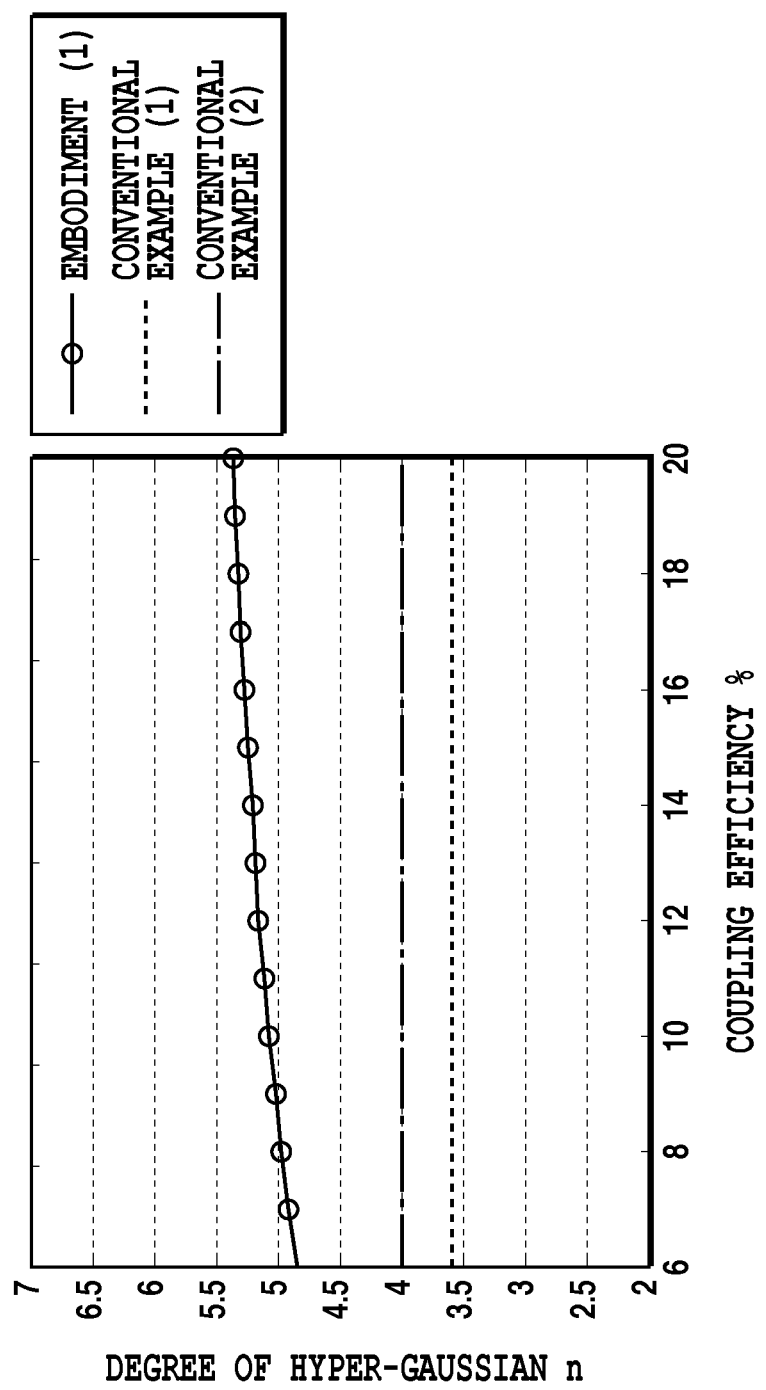
FIG. 17 is a chart showing the relationship between the coupling efficiency of a third optical coupler 1212 of FIG. 13 and the degree of the HG function of the transmission spectrum together with results of the conventional example.

FIG. 17 shows a relationship between the coupling efficiency of the third optical coupler 1212 and the degree of the HG function of the transmission spectrum. Conventional example (1) shows the results of the parabola AWG-type, and Conventional example (2) shows the results of the synchronized MZI AWG-type. The degree of the HG function of this embodiment has a tendency to monotonically increase from a coupling efficiency of 6% and be saturated around a coupling efficiency of 20%. At this time, the rectangular degree achieves n=4.8 to 5.4. The results confirm that the rectangular degree of the transmission characteristics can be easily adjusted by changing the design of the coupling efficiency of the third optical coupler and a simple design can be provided. Moreover, since the rectangular degree is saturated around the coupling efficiency of 20% as described above, it is desirable that the third optical coupler have a coupling efficiency of 20% or less.

Second Embodiment

Figure 18:
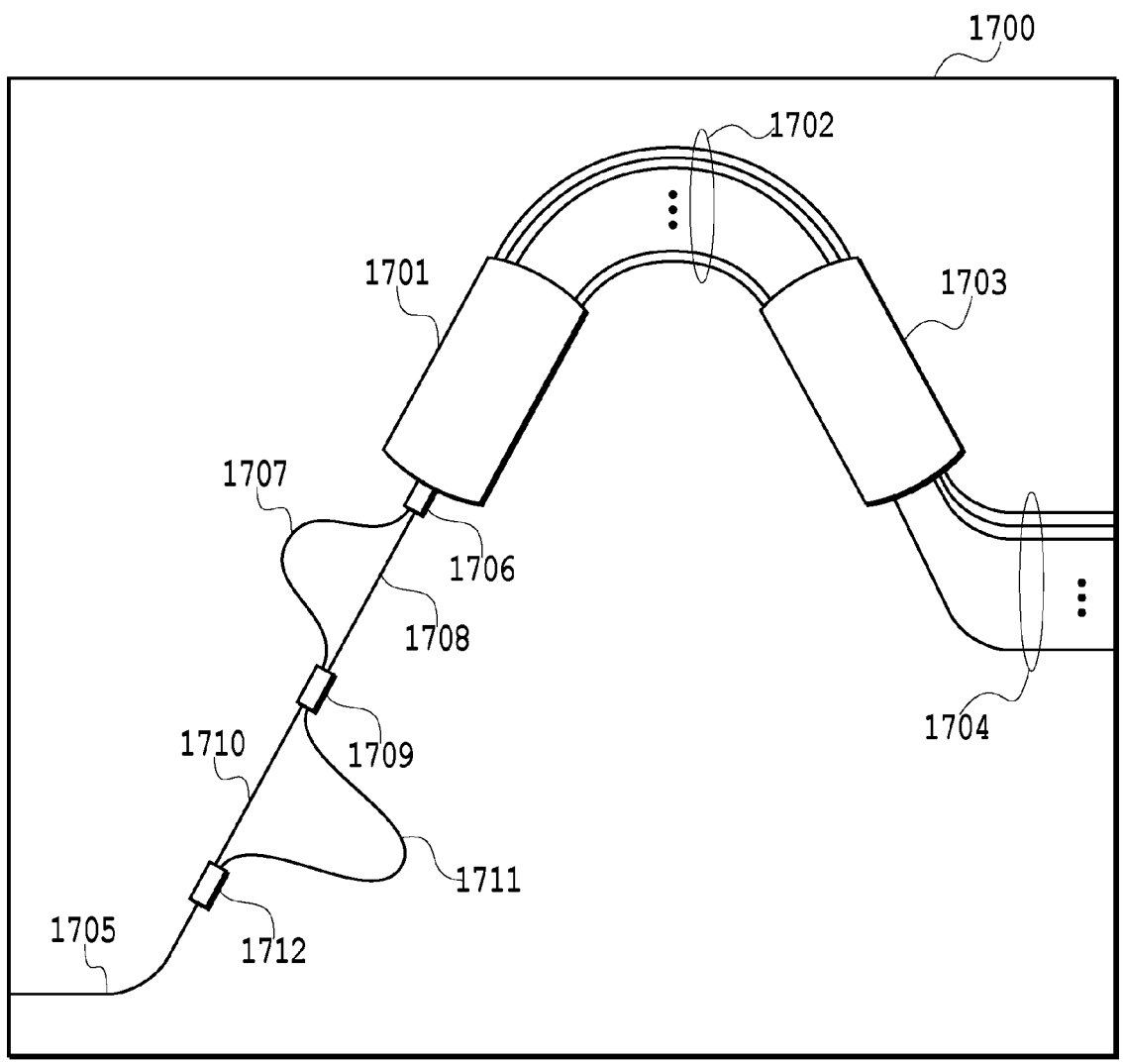
FIG. 18 is a configuration view of an optical wavelength multi/demultiplexer according to a second embodiment of the present invention.

FIG. 18 is a plan view illustrating an optical wavelength multi/demultiplexer according to a second embodiment of the invention. The second embodiment is a specific example including a two-stage lattice circuit of the type shown in FIG. 10B. A synchronized AWG-type optical multi/demultiplexer 1700 includes a first slab waveguide 1701, arrayed-waveguides 1702, a second slab waveguide 1703, output waveguides 1704, a first optical coupler 1706, a first arm waveguide 1707, a second arm waveguide 1708, a second optical coupler 1709, a third arm waveguide 1710, a fourth arm waveguide 1711, a third optical coupler 1712, and an input waveguide 1705.

The optical wavelength multi/demultiplexer 1700 has a relative refractive index difference Δ of 1.5% and a core thickness of 4.5 μm. The core widths of the input waveguide 1705, output waveguides 1704, arrayed-waveguides 1702, first arm waveguide 1707, second arm waveguide 1708, third arm waveguide 1710, and fourth arm waveguide 1711 are 4.5 μm. The portions of the arrayed-waveguides 1702 which are connected to the first and second slab waveguides 1701 and 1703 are positioned with a pitch of 10 μm. The number of output waveguides 1704 is the same as the number of wavelength channels, and the portions of the output waveguides 1704 which are connected to the second slab waveguide 1703 are arranged with a pitch of 17 μm. At the terminal end of each output waveguide 1704, a linear tapered waveguide is provided so as to have an opening width of 12.5 μm. Moreover, the optical multi/demultiplexer 1700 is designed so that: the number of wavelength channels is 40; the optical frequency channel spacing, 100 GHz; the length of the first and second slab waveguides 1701 and 1703, 9566.85 μm; the number of arrayed-waveguides 1702, 187; and the optical path length difference between the arrayed-waveguides adjacent to each other, 33.98 μm.

Figure 19:
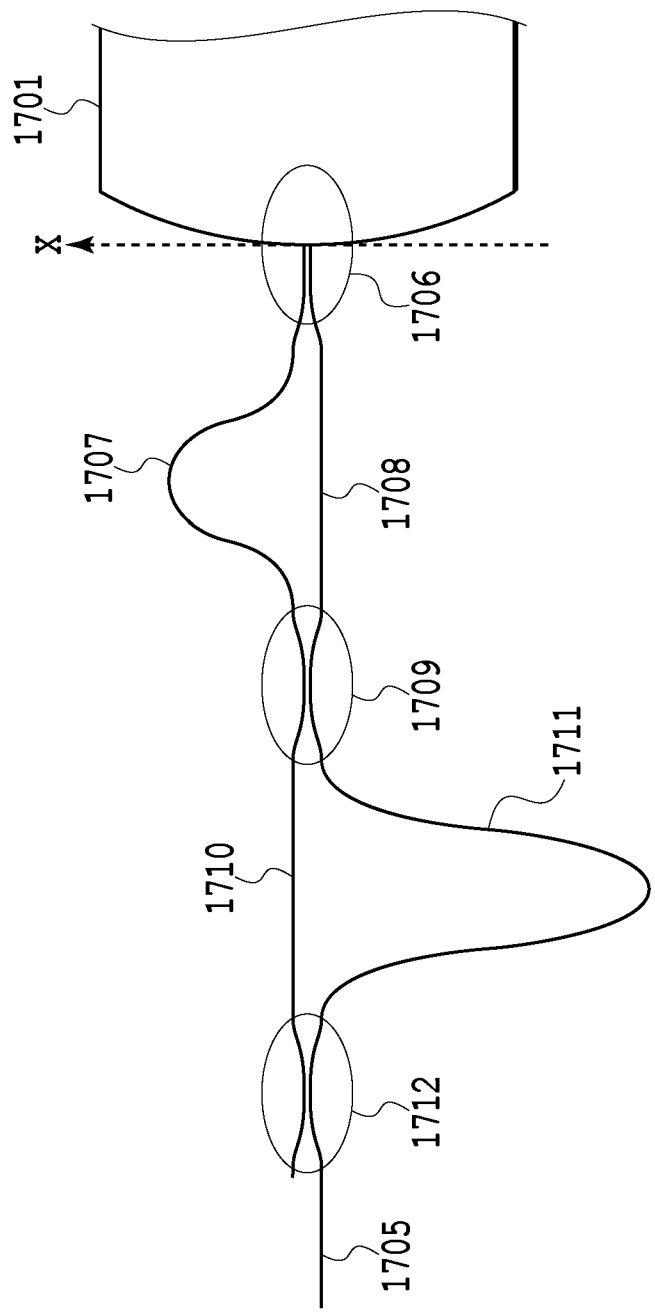
FIG. 19 is an enlarged view of a part from an input waveguide 1705 to a first slab waveguide 1701 of FIG. 18.

FIG. 19 is an enlarged view of a part from the input waveguide 1705 to the first slab waveguide 1701. The first to third optical couplers 1706, 1709, and 1712 include directional couplers. The waveguide width and waveguide pitch of the directional couplers are 4.5 μm and 6.5 μm, respectively. The coupling efficiencies of the first to third optical couplers 1706, 1709, and 1712 are designed to be 50%, 50%, and 8%, respectively. The optical path length differences between the first and second arm waveguides 1707 and 1708 and between the third and fourth arm waveguides 1710 and 1711 are designed to be 2023 and 4046 μm, respectively.

Figure 20A:
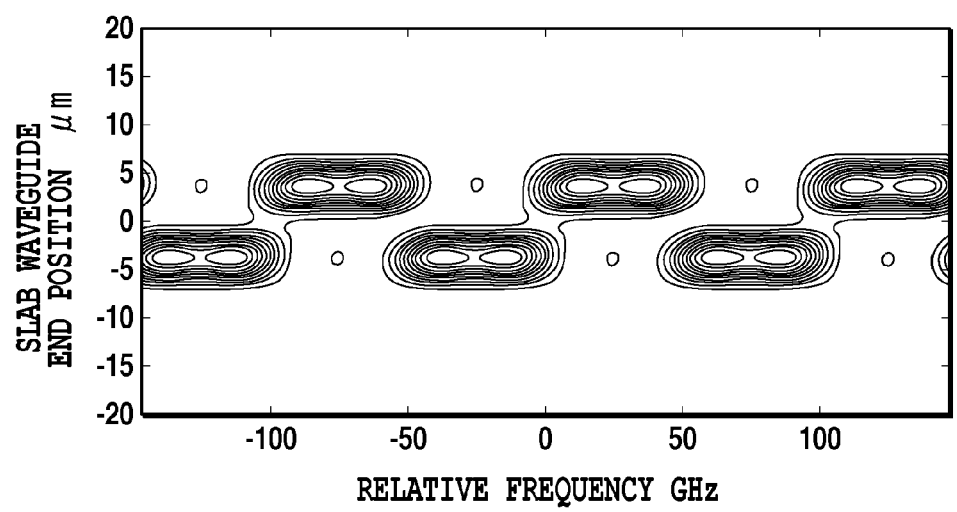
FIG. 20A is a chart showing a distribution of light focused in the joint interface between a first optical coupler 1706 and the first slab waveguide 1701 of FIG. 19.
Figure 20B:
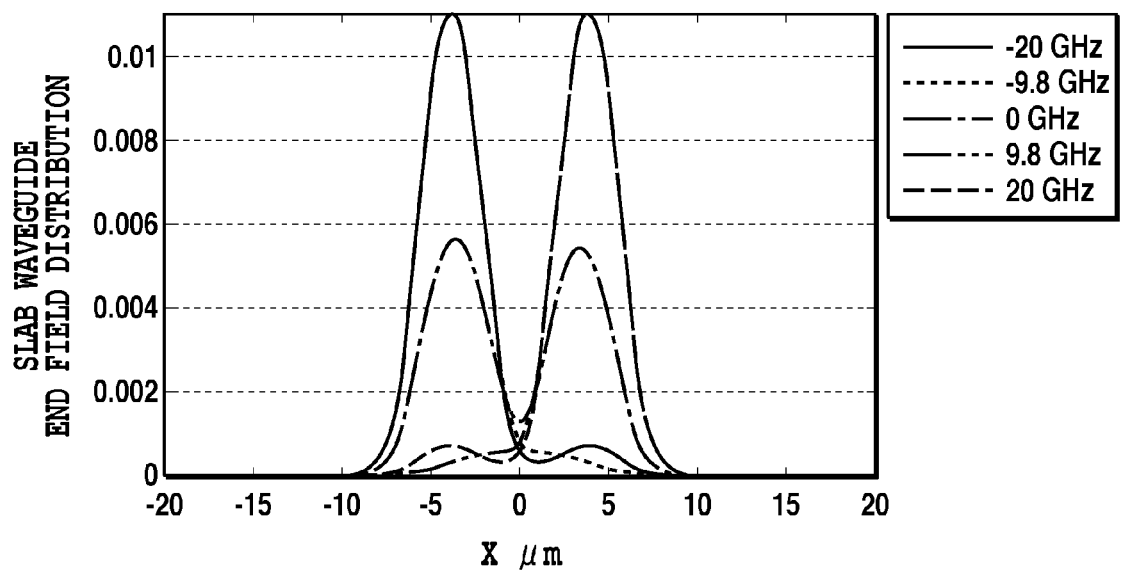
FIG. 20B is a chart showing the distribution of light focused in the connecting interface between the first optical coupler 1706 and the first slab waveguide 1701 of FIG. 19.

From FIGS. 20A and 20B, it can be confirmed that the light focusing position at the interface where the first optical coupler 1706 is joined to the first slab waveguide 1701 periodically changes according to the optical frequencies.

Figure 21B:
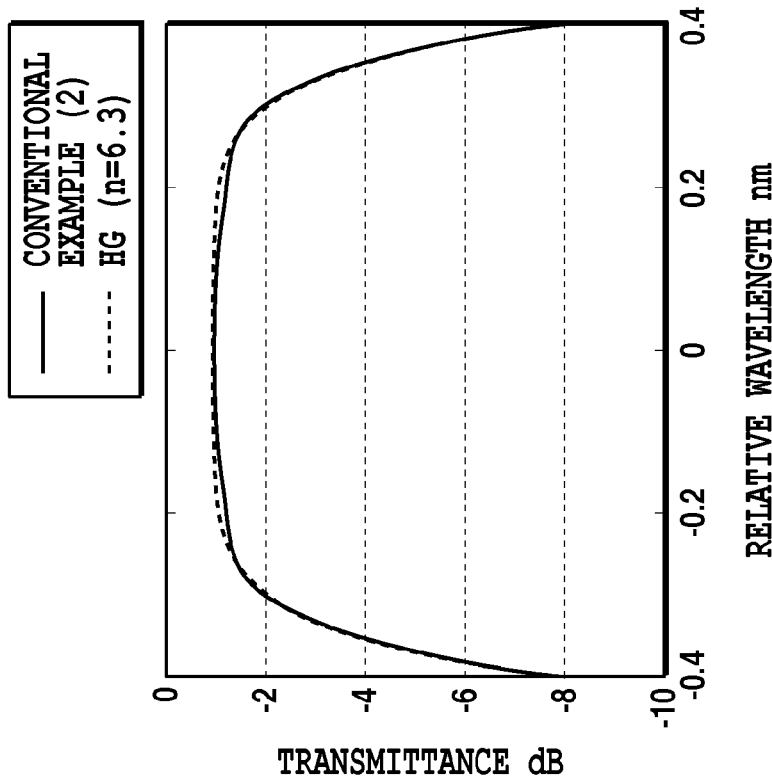
FIG. 21B is a chart showing the transmission characteristics of the optical wavelength multi/demultiplexer according to the second embodiment.
Figure 21A:
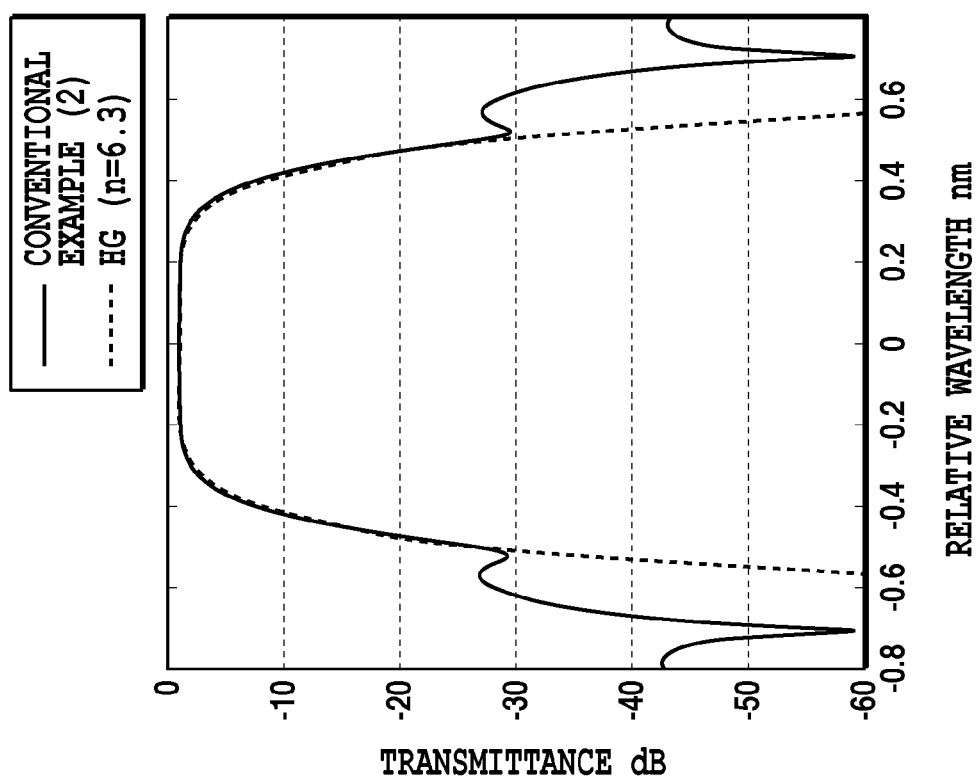
FIG. 21A is a chart showing the transmission characteristics of the optical wavelength multi/demultiplexer according to the second embodiment.

FIGS. 21A and 21B are charts showing a transmission spectrum waveform of the optical wavelength multi/demultiplexer of this embodiment. The charts reveal that the obtained transmission spectrum is flat. If the waveform is approximated by an HG function, the degree thereof is n=6.3. Compared with the MZI-synchronized AWG-type of the conventional art, whose degree of the HG function n is 4.0, this embodiment can achieve a 158% improvement in rectangular degree.

Figure 22:
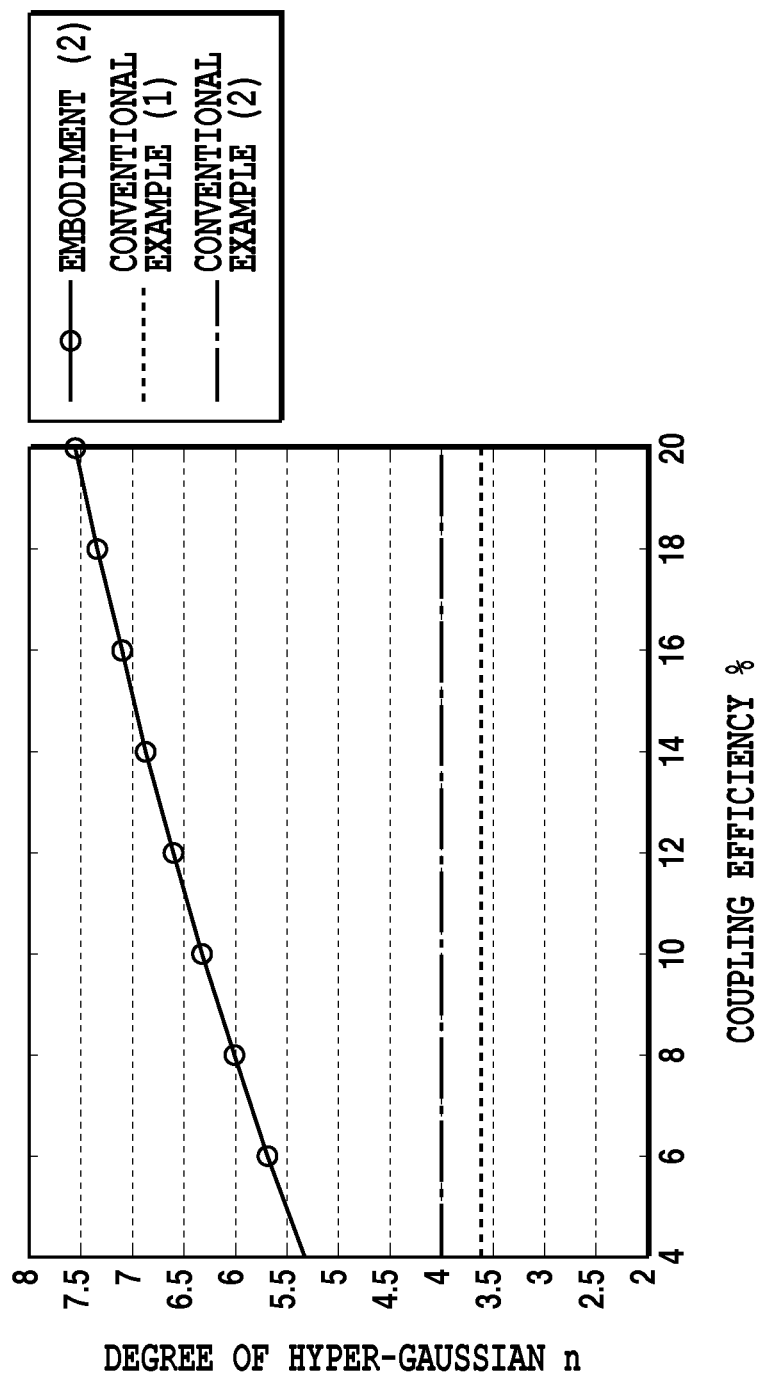
FIG. 22 is a chart showing the relationship between the coupling efficiency of a third optical coupler 1712 of FIG. 18 and the degree of the HG function of the transmission spectrum together with the results of the conventional example.

FIG. 22 shows a relationship between the coupling efficiency of the third optical coupler 1712 and the degree of the HG function of the transmission spectrum. Conventional example (1) shows the results of the parabola AWG-type, and Conventional example (2) shows the results of the synchronized MZI AWG-type. The degree of the HG function of this embodiment monotonically increases in a range of the coupling efficiency from 6% to 20%, and the rectangular degree reaches n=4.9 to 7.6. Accordingly, by changing the design of the coupling efficiency of the third optical coupler 1712, the rectangular degree of the transmission characteristics can be easily adjusted, and a simple design can be provided.

Third Embodiment

Figure 23:
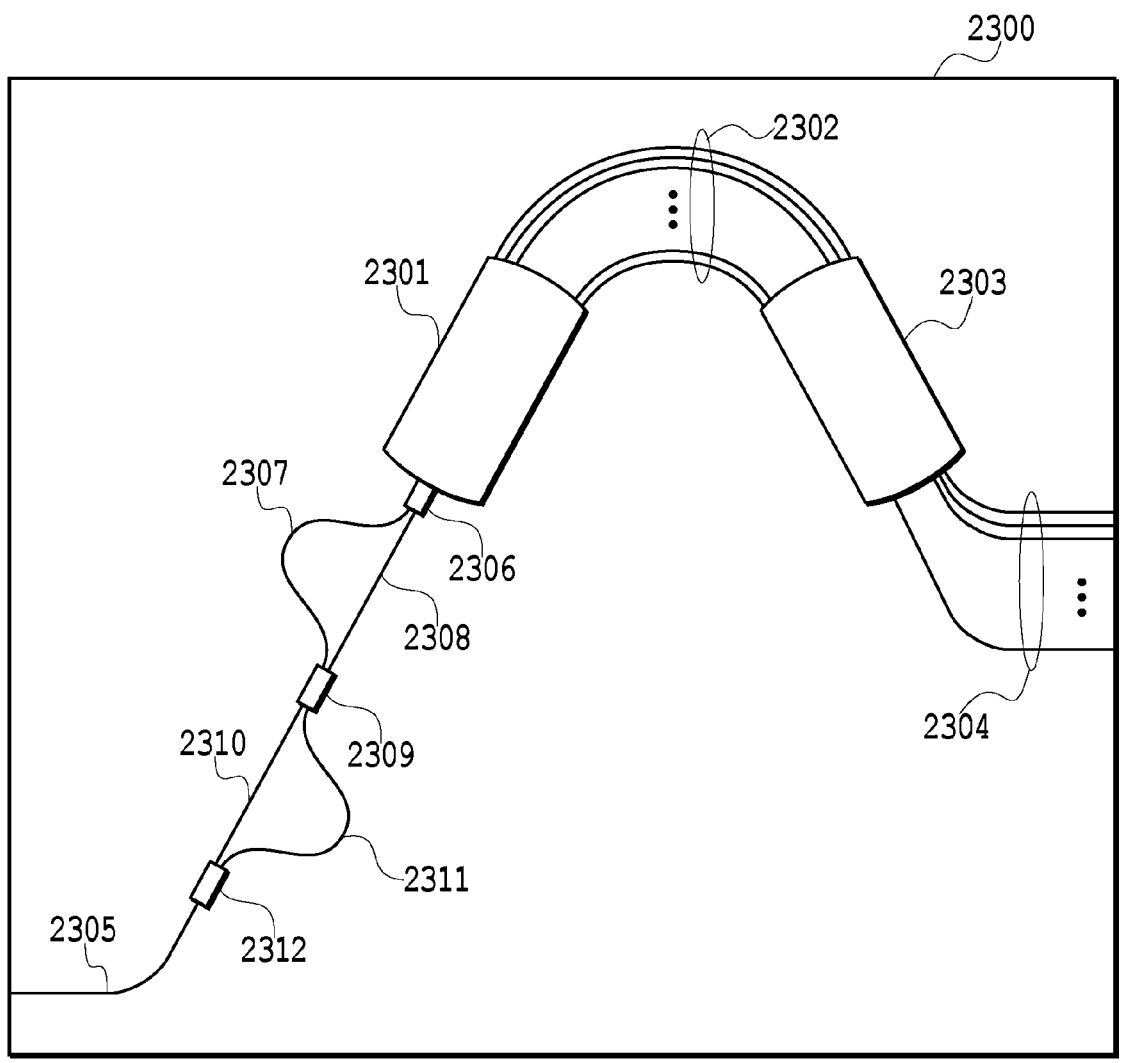
FIG. 23 is a configuration view of an optical wavelength multi/demultiplexer according to a third embodiment of a third embodiment.

FIG. 23 is a plan view illustrating an optical wavelength multi/demultiplexer according to a third embodiment of the invention. The third embodiment is a specific example including a two-stage lattice circuit of the type shown in FIG. 10B. A synchronized AWG-type optical multi/demultiplexer 2300 includes a first slab waveguide 2301, arrayed-waveguides 2302, a second slab waveguide 2303, output waveguides 2304, a first optical coupler 2306, a first arm waveguide 2307, a second arm waveguide 2308, a second optical coupler 2309, a third arm waveguide 2310, a fourth arm waveguide 2311, a third optical coupler 2312, and an input waveguide 2305.

The optical wavelength multi/demultiplexer 2300 has a relative refractive index difference Δ of 1.5% and a core thickness of 4.5 μm. The core widths of the input waveguide 2305, output waveguides 2304, arrayed-waveguides 2302, first arm waveguide 2307, second arm waveguide 2308, third arm waveguide 2310, and fourth arm waveguide 2311 are 4.5 μm. The portions of the arrayed-waveguides 2302 which are connected to the first and second slab waveguides 2301 and 2303 are positioned with a pitch of 10 μm. The number of output waveguides 2304 is the same as the number of wavelength channels, and the portions of the output waveguides 2304 which are connected to the second slab waveguide 2303 are arranged with a pitch of 17 μm. At the terminal end of each output waveguide 2304, a linear tapered waveguide is provided so as to have an opening width of 12.5 μm. Moreover, the optical multi/demultiplexer 2300 is designed so that: the number of wavelength channels is 40; the optical frequency channel spacing, 100 GHz; the lengths of the first and second slab waveguides 2301 and 2303, 9566.85 μm; the number of arrayed-waveguides 2302, 187; and the optical path length difference between the arrayed-waveguides adjacent to each other, 33.98 μm.

Figure 24:
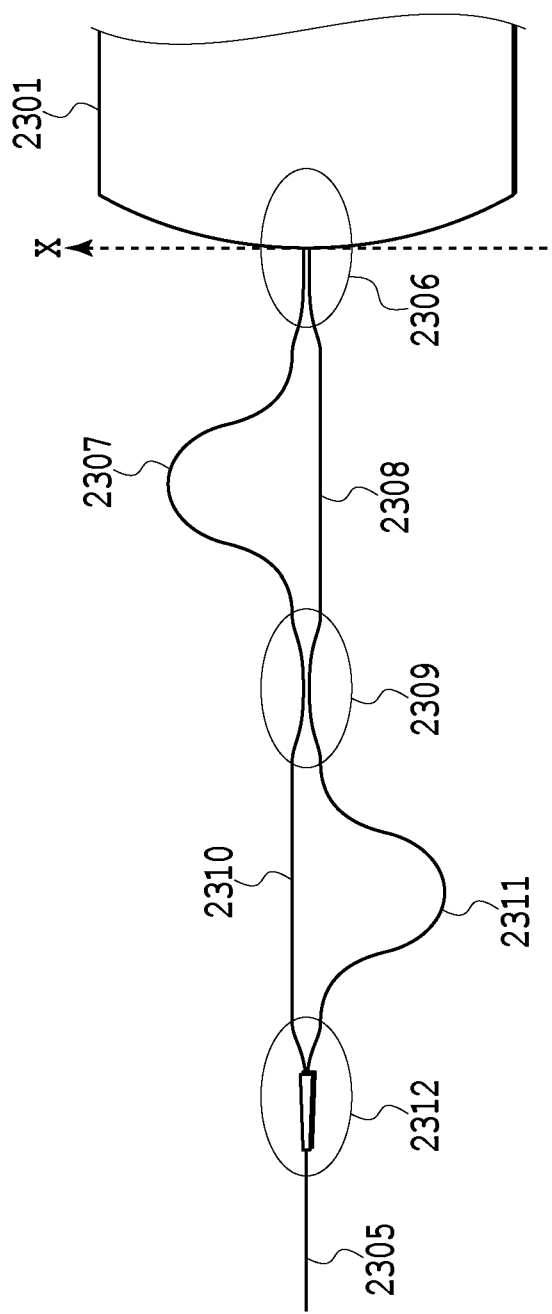
FIG. 24 is an enlarged view of a part from an input waveguide 2305 to a first slab waveguide 2301 of FIG. 23.
Figure 25B:
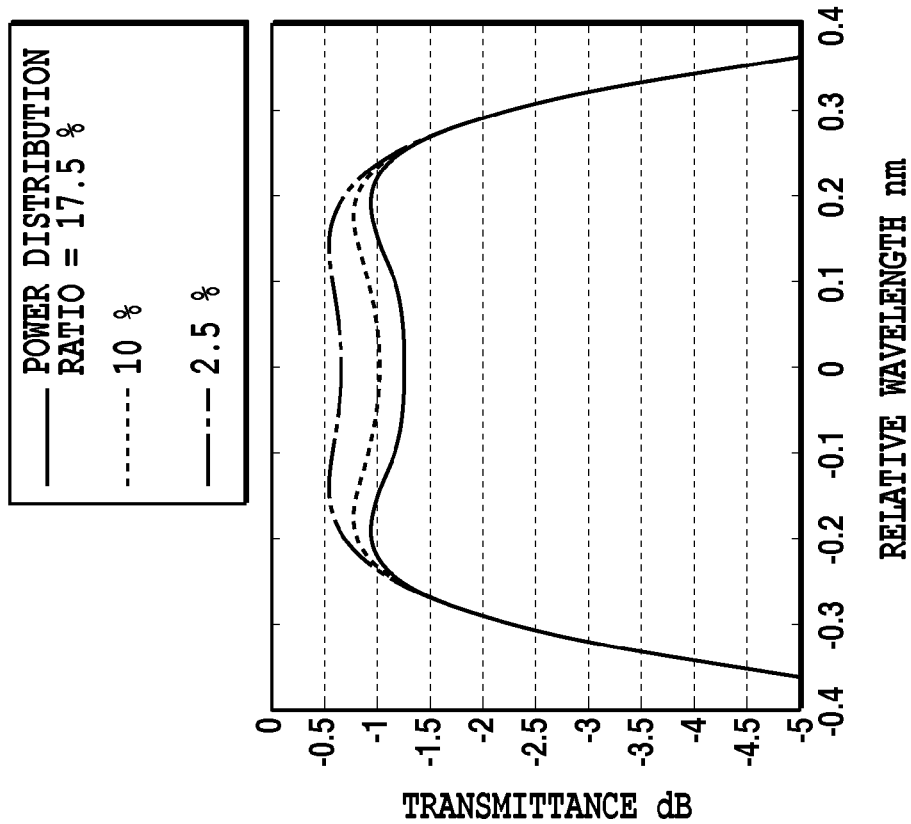
FIG. 25B is a chart showing the relationship between the power distribution ratio of the Y branching waveguide and the transmission characteristics.
Figure 25A:
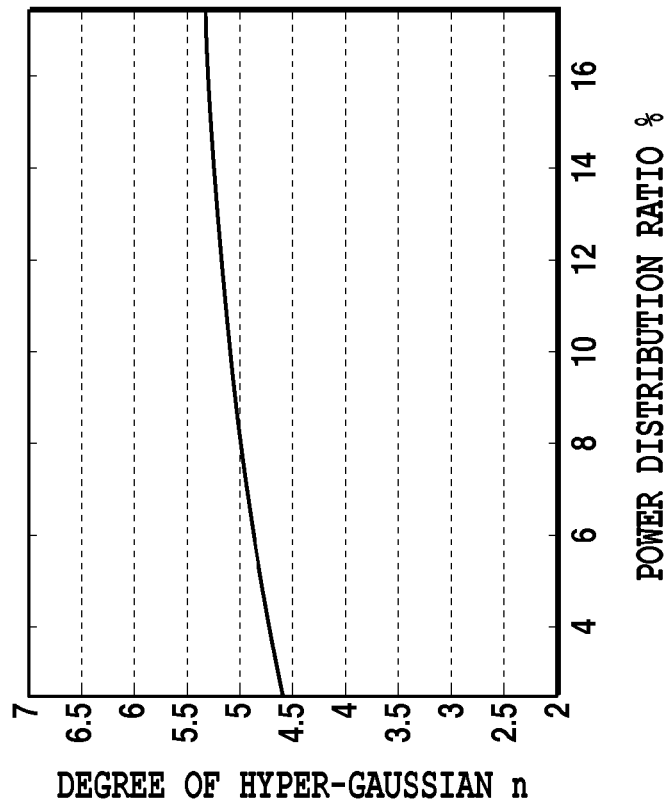
FIG. 25A is a chart showing the relationship between a power distribution ratio of a Y branching waveguide and the transmission characteristics.

FIG. 24 is an enlarged view of a part from the input waveguide 2305 to the first slab waveguide 2301. The first and second optical couplers 2306 and 2309 include directional couplers. The third optical coupler 2312 includes an asymmetric Y branch waveguide. The coupling efficiencies of the first and second optical couplers 2306 and 2309 are designed to be 50% and 62%, respectively. The asymmetric Y branch waveguide is designed to distribute optical power to the arm waveguides 2310 and 2311 at a branching ratio of 10% to 90%. If the optical power distributed to the arm waveguide 2310 is increased, the rectangular degree of the transmission waveform increases, but the excessive loss increases. Herein, the asymmetric Y branch waveguide is designed to distribute optical power to the arm waveguides 2310 and 2311 at a branching ratio of 10% to 90% so that the excessive loss is within 1 dB (see FIGS. 25A and 25B). The optical path length differences between the first and second arm waveguides 2307 and 2308 and between the third and fourth arm waveguides 2310 and 2311 are both designed to be 2023 μm.

Figure 26B:
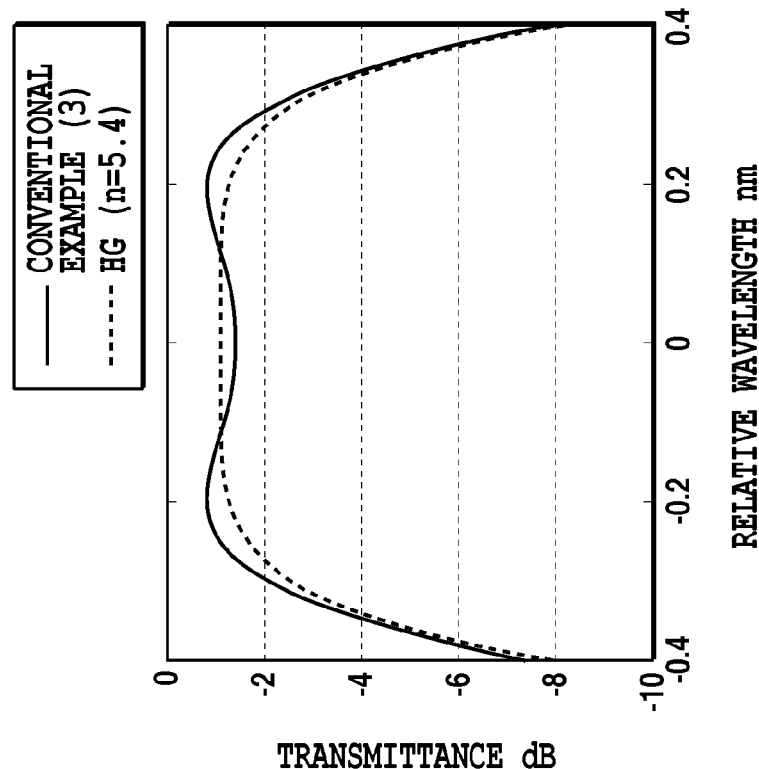
FIG. 26B is a chart showing the transmission characteristics of the optical wavelength multi/demultiplexer according to the third embodiment.
Figure 26A:
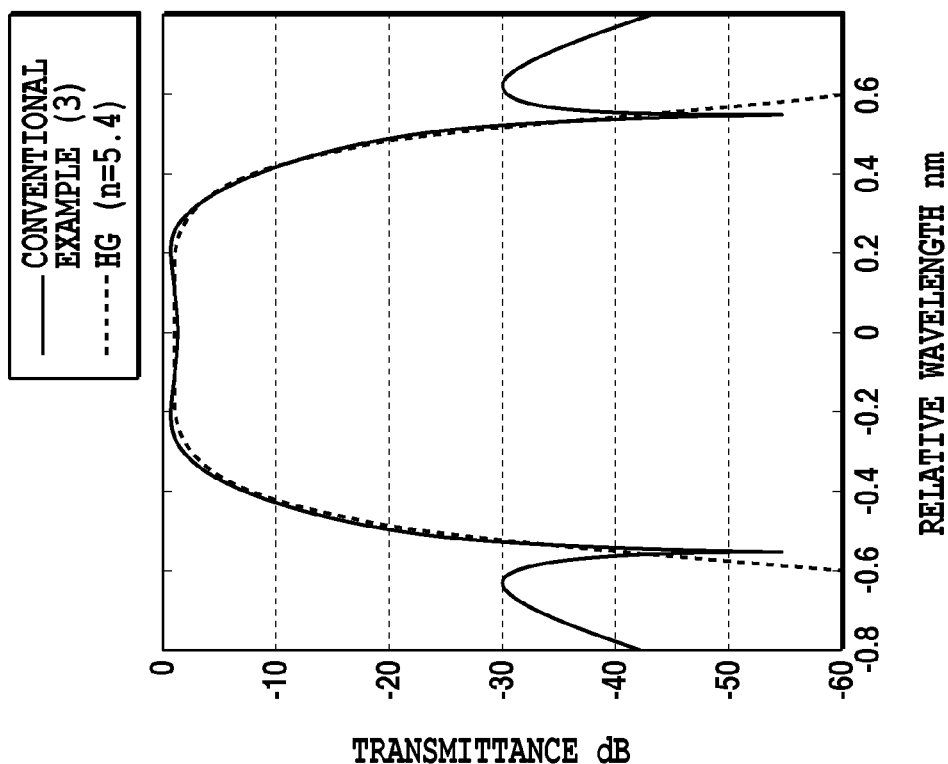
FIG. 26A is a chart showing the transmission characteristics of the optical wavelength multi/demultiplexer according to the third embodiment.
Figure 27B:
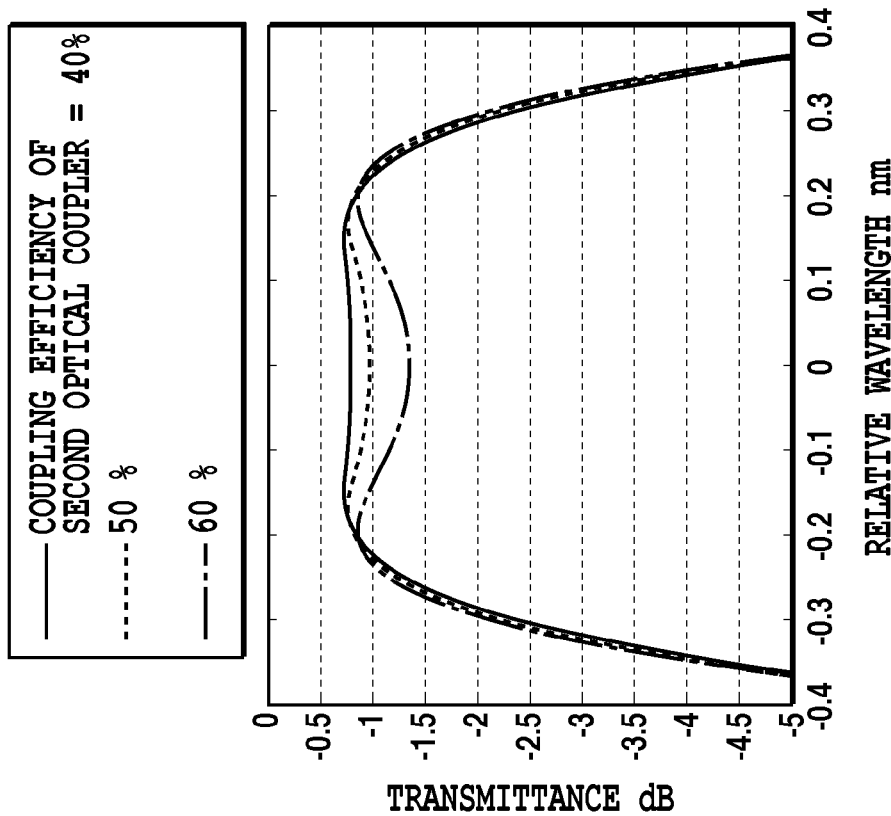
FIG. 27B is a chart showing the relationship between the deviation of the coupling efficiency of the second optical coupler and the transmission characteristics.
Figure 27A:
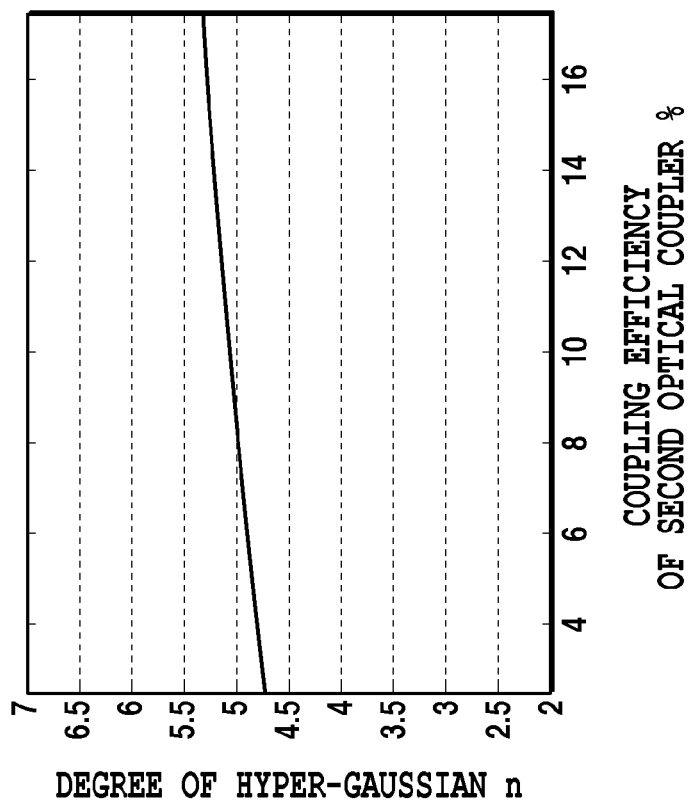
FIG. 27A is a chart showing the relationship between the deviation in coupling efficiency of a second optical coupler and the transmission characteristics.

FIGS. 26A and 26B are charts showing a transmission spectrum waveform of the optical wavelength multi/demultiplexer of this embodiment. The obtained transmission spectrum is flat, and if the waveform is approximated by an HG function, the degree thereof is n=5.4. Compared with the MZI-synchronized AWG-type of the conventional art, whose degree of the HG function n is 4.0, this embodiment can achieve a 135% improvement of the rectangular degree. To be specific, in the first and second embodiments, the first and second optical couplers are designed to have coupling efficiencies of 50%. However, as shown in this embodiment, the coupling efficiency of the second optical coupler is unnecessarily limited to 50%. By changing the coupling efficiency of the second optical coupler to a range from 40% to 60% instead of 50%, the flat transmission characteristics can be changed to bimodal transmission characteristics including ripples to increase the rectangular degree. On the other hand, if a large ripple exists in the passband of the optical multi/demultiplexer, the loss variation will degrade communication signals. Herein, the allowable deviation of the coupling efficiency is thought to be about +/−10% around 50% (see FIGS. 27A and 27B).

Fourth Embodiment

Figure 28:
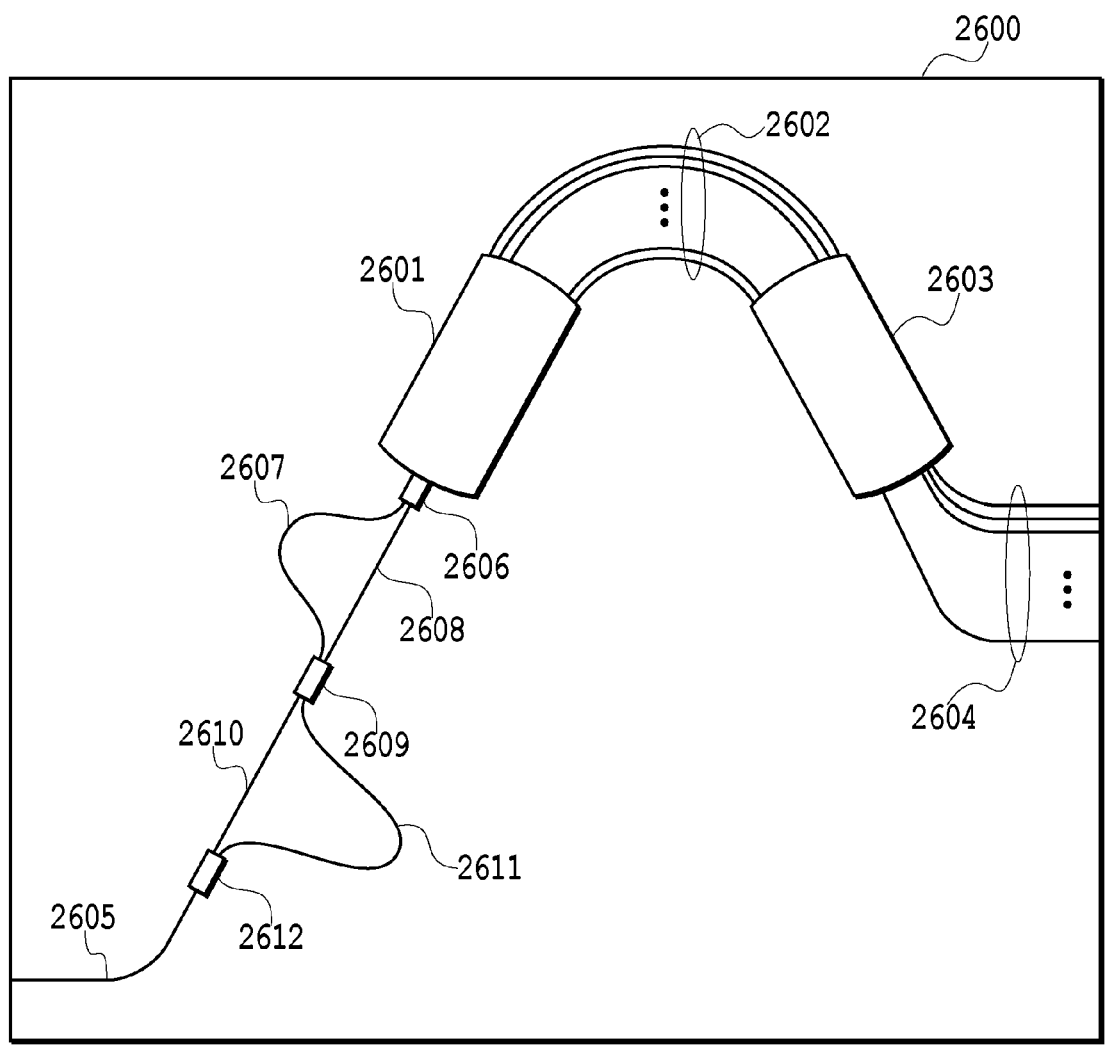
FIG. 28 is a configuration view of an optical wavelength multi/demultiplexer according to a fourth embodiment of the present invention.

FIG. 28 is a plan view illustrating an optical wavelength multi/demultiplexer according to a fourth embodiment of the invention. The fourth embodiment is a specific example including a two-stage lattice circuit of the type shown in FIG. 10B. A synchronized AWG-type optical multi/demultiplexer 2600 includes a first slab waveguide 2601, arrayed-waveguides 2602, a second slab waveguide 2603, output waveguides 2604, a first optical coupler 2606, a first arm waveguide 2607, a second arm waveguide 2608, a second optical coupler 2609, a third arm waveguide 2610, a fourth arm waveguide 2611, a third optical coupler 2612, and an input waveguide 2605.

The optical wavelength multi/demultiplexer 2600 has a relative refractive index difference Δ of 1.5% and a core thickness of 4.5 μm. The core widths of the input waveguide 2605, output waveguide 2604, arrayed-waveguides 2602, first arm waveguide 2607, second arm waveguide 2608, third arm waveguide 2610, and fourth arm waveguide 2611 are 4.5 μm. The portions of the array waveguides 2602 which are connected to the first and second slab waveguides 2601 and 2603 are positioned with a pitch of 10 μm. The number of output waveguides 2604 is the same as the number of wavelength channels, and the portions of the output waveguides 2604 which are connected to the second slab waveguide 2603 are arranged with a pitch or 17 μm. At the terminal end of each output waveguide 2604, a linear tapered waveguide is provided so as to have an opening width of 12.5 μm. Moreover, the optical multi/demultiplexer 2600 is designed so that: the number of wavelength channels is 40; the optical frequency channel spacing, 100 GHz; the lengths of the first and second slab waveguides 2601 and 2603, 9566.85 μm; the number of arrayed-waveguides 2602, 187; and the optical path length difference between the arrayed-waveguides adjacent to each other, 33.98 μm.

Figure 29:
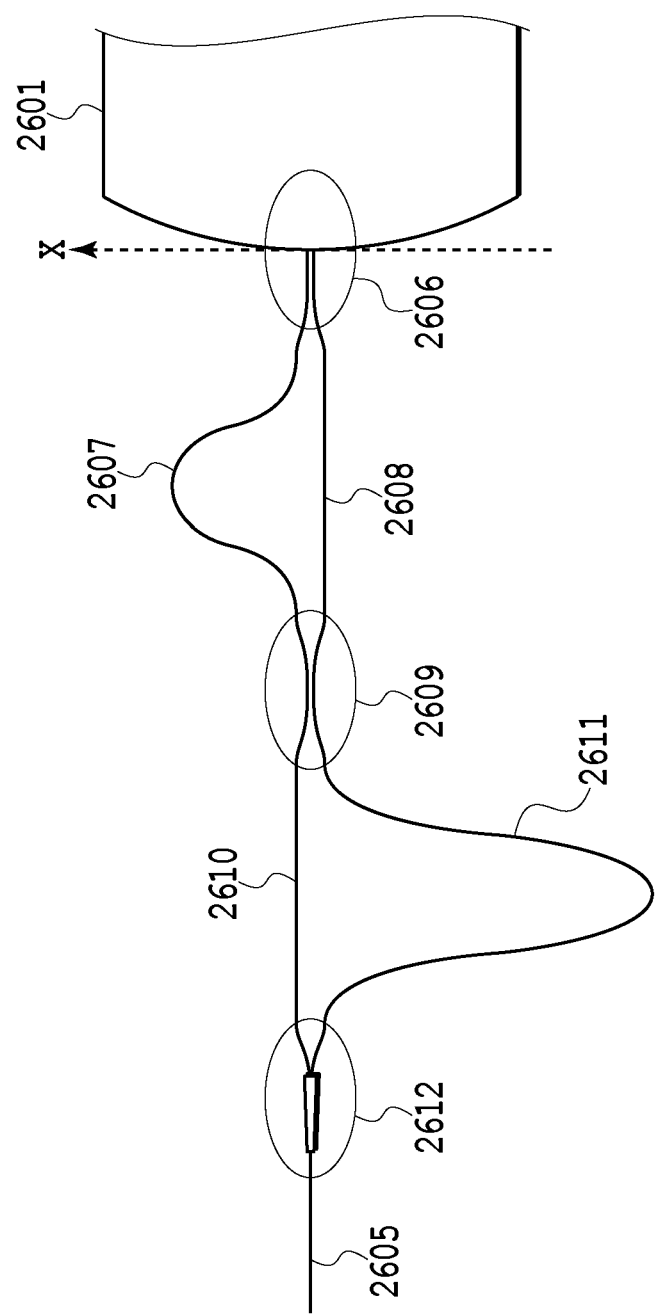
FIG. 29 is an enlarged view of a part from an input waveguide 2605 to a first slab waveguide 2601 of FIG. 26.

FIG. 29 is an enlarged view of a part from the input waveguide 2605 to the first slab waveguide 2601. The first and second optical couplers 2306 and 2609 include directional couplers. The third optical coupler 2612 includes an asymmetric Y branch waveguide. The coupling efficiencies of the first and second optical couplers 2606 and 2609 are designed to be 50% and 40%, respectively. The asymmetric Y branch waveguide 2612 is designed to distribute optical power to the third and fourth arm waveguides 2610 and 2611 at a branching ratio of 10% to 90%. The optical path length differences between the first and second arm waveguides 2607 and 2608 and between the third and fourth arm waveguides 2610 and 2611 are designed to be 2023 and 4046 μm, respectively.

Figure 30B:
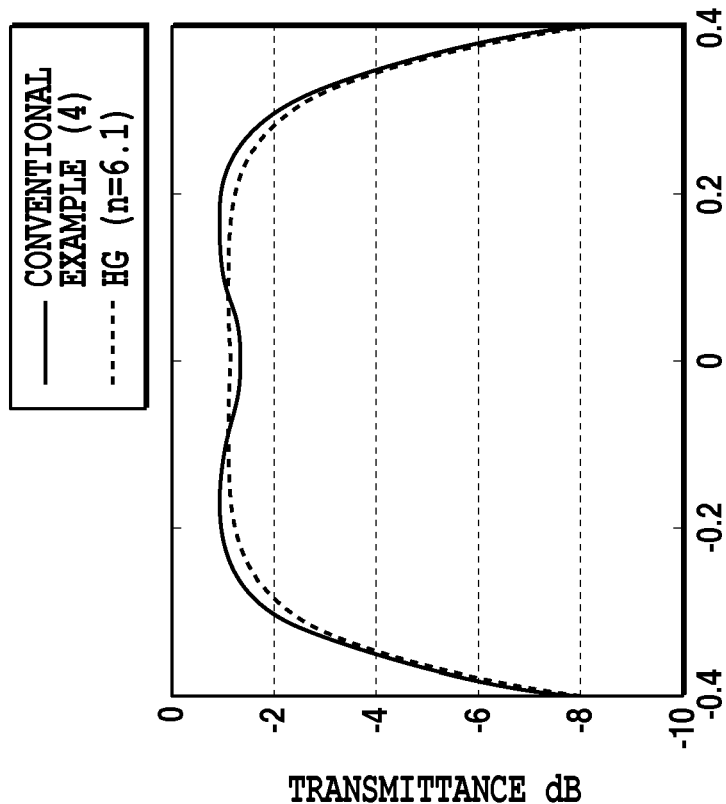
FIG. 30B is a chart showing the transmission characteristics of the optical wavelength multi/demultiplexer according to the fourth embodiment.
Figure 30A:
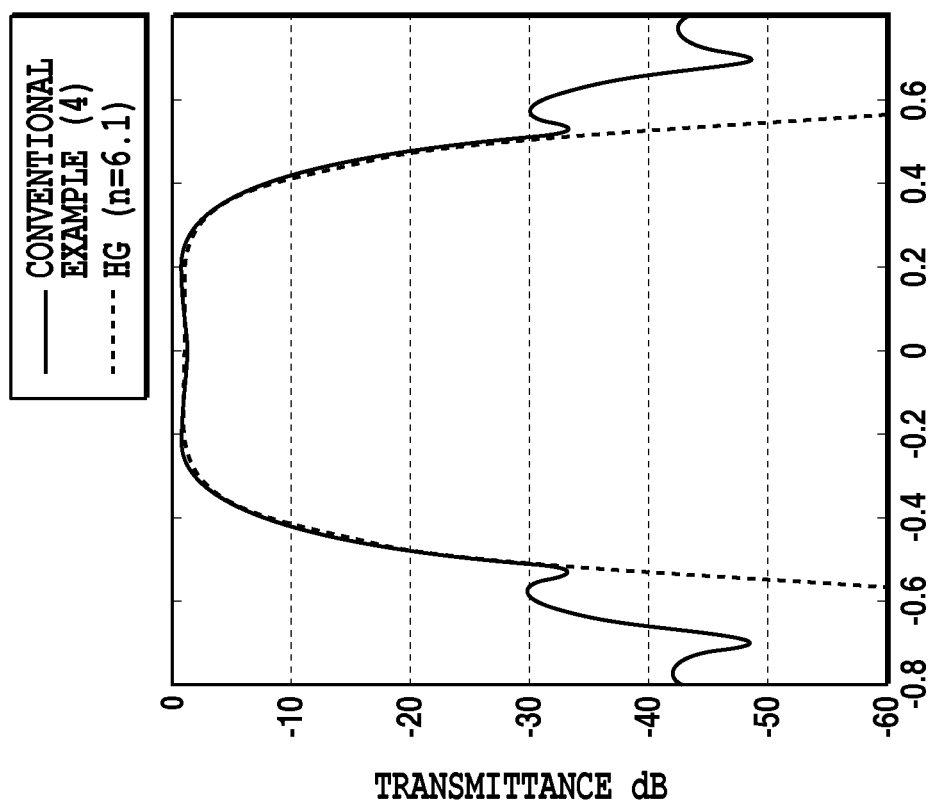
FIG. 30A is a chart showing the transmission characteristics of the optical wavelength multi/demultiplexer according to the fourth embodiment.

FIGS. 30A and 30B are charts showing a transmission spectrum waveform of the optical wavelength multi/demultiplexer of this embodiment. The obtained transmission spectrum is flat, and if the waveform is approximated by an HG function, the degree thereof is n=6.1. Compared with the MZI-synchronized AWG-type of the conventional art, whose degree of the HG function n is 4.0, this embodiment can achieve a 153% improvement in rectangular degree. To be specific, in the first and second embodiments, the first and second optical couplers are designed to have coupling efficiencies of 50%. However, as shown in this embodiment, the coupling efficiency of the second optical coupler is unnecessarily limited to 50%. It is only necessary to implement a predetermined branching ratio, and the third coupler may include an asymmetric Y branch waveguide as shown in this embodiment.

Fifth Embodiment

A description is given of an optical wavelength multi/demultiplexer according to a fifth embodiment of the invention. This embodiment is an optical multi/demultiplexer which has chromatic dispersion characteristics opposite to those of the first embodiment while keeping the broad transmission spectrum similar to the optical wavelength multi/demultiplexer of the first embodiment.

In an optical module including equal numbers of optical wavelength multi/demultiplexers of the first embodiment and optical wavelength multi/demultiplexers of the fifth embodiment having opposite chromatic dispersion characteristics, the chromatic dispersion characteristics thereof can be canceled with each other, thus reducing the degradation in transmission quality due to the chromatic dispersion characteristics of the optical wavelength multi/demultiplexers.

Figure 31:
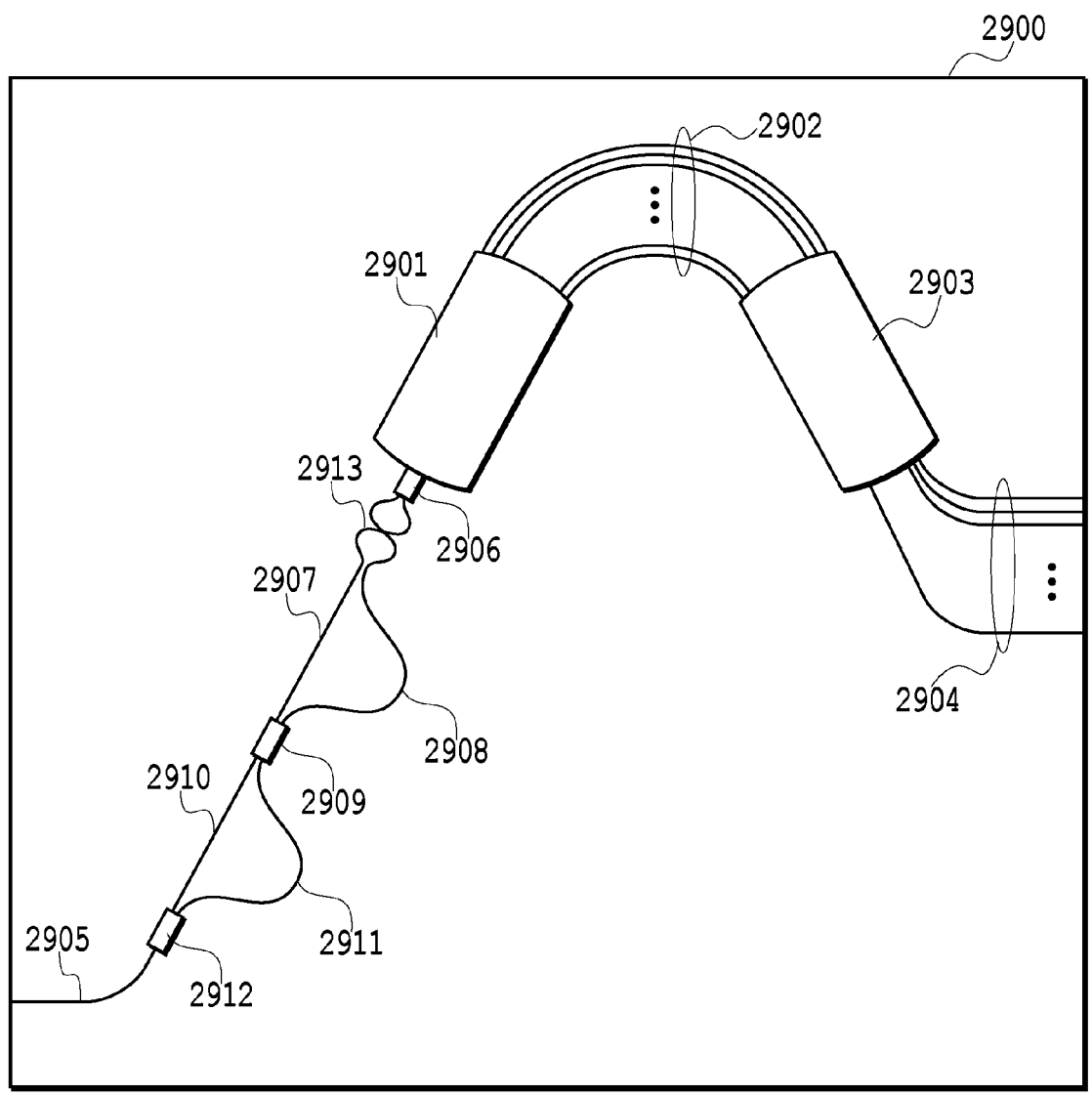
FIG. 31 is a plan view illustrating the configuration of a synchronized AWG-type optical wavelength multi/demultiplexer according to a fifth embodiment.

FIG. 31 is a plan view illustrating a synchronized AWG-type optical wavelength multi/demultiplexer according to the fifth embodiment of the invention. The synchronized AWG-type optical multi/demultiplexer 2900 includes a first slab waveguide 2901, arrayed-waveguides 2902, a second slab waveguide 2903, output waveguides 2904, a first optical coupler 2906, a cross waveguide 2913, a first arm waveguide 2907, a second arm waveguide 2908, a second optical coupler 2909, a third arm waveguide 2910, a fourth arm waveguide 2911, a third optical coupler 2912, and an input waveguide 2905.

The optical wavelength multi/demultiplexer 2900 has a relative refractive index difference Δ of 1.5% and a core thickness of 4.5 μm. The core widths of the input waveguide 2905, output waveguides 2904, arrayed-waveguides 2902, first arm waveguide 2907, second arm waveguide 2908, third arm waveguide 2910, and fourth arm waveguide 2911 are 4.5

µm. The portions of the arrayed-waveguides 2902 which are connected to the first and second slab waveguides 2901 and 2903 are positioned with a pitch of 10 µm. The number of output waveguides 2904 is the same as the number of wavelength channels, and the portions of the output waveguides which are connected to the second slab waveguide are arranged with a pitch of 17 µm. At the terminal end of each output waveguide 2904, a linear tapered waveguide is provided so as to have an opening width of 12.5 µm. Moreover, the optical multi/demultiplexer 2900 is designed so that: the number of wavelength channels is 40; the optical frequency channel spacing, 100 GHz; the lengths of the first and second slab waveguides 2901 and 2903, 9566.85 µm; the number of arrayed-waveguides 2902, 187; and the optical path length difference between the arrayed-waveguides adjacent to each other, 33.98 µm.

Figure 32:
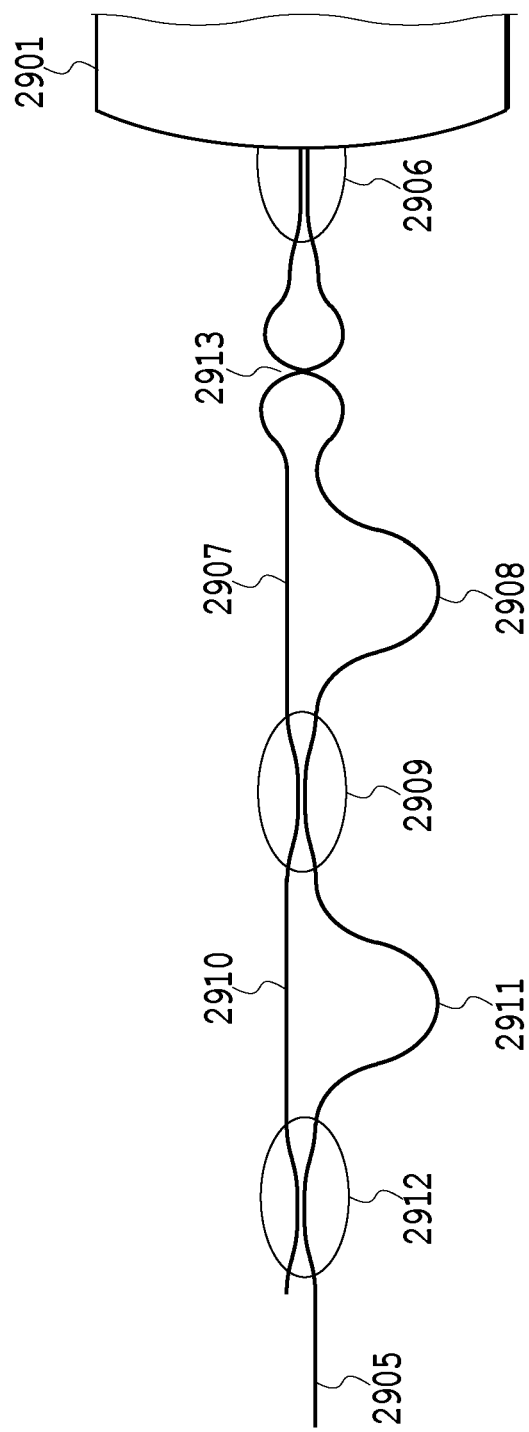
FIG. 32 is an enlarged view of a part from an input waveguide 2905 to a first slab waveguide 2901 of FIG. 28.

FIG. 32 is an enlarged view of a part from the input waveguide 2905 to the first slab waveguide 2901. The first to third optical couplers 2906, 2909, and 2912 include directional couplers. The waveguide width and pitch of the directional couplers are 4.5 µm and 6.5 µm, respectively. The coupling efficiencies of the first and second optical couplers 2906, 2909, and 2912 are designed to be 50%, 50%, and 8%, respectively. The optical path length differences between the first and second arm waveguides 2907 and 2908 and between the third and fourth arm waveguides 2910 and 2911 are designed to be 2023 µm, respectively.

Figure 33A:
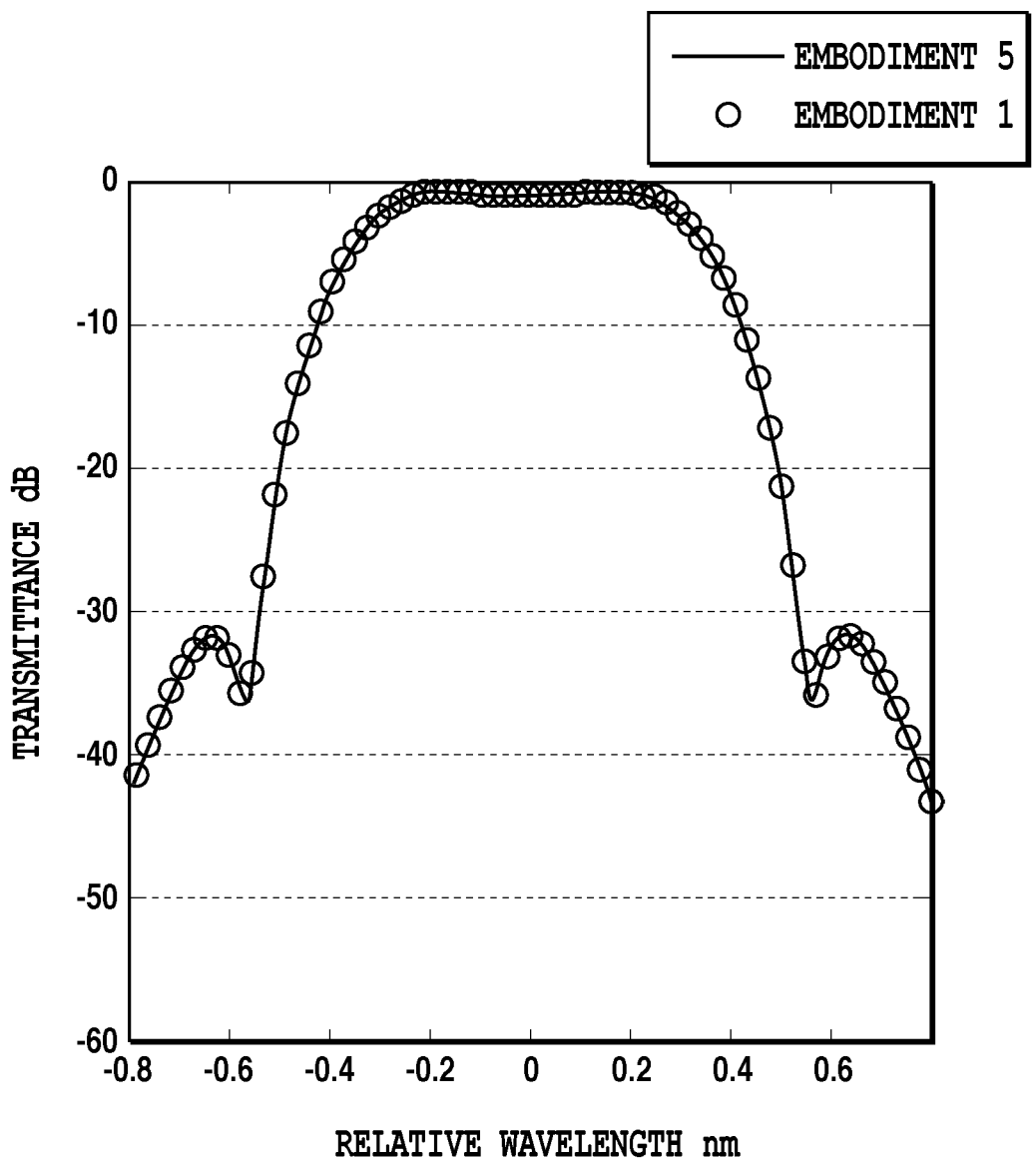
FIG. 33A is a chart showing transmission spectra of the optical multi/demultiplexers of the fifth and first embodiments.
Figure 33B:
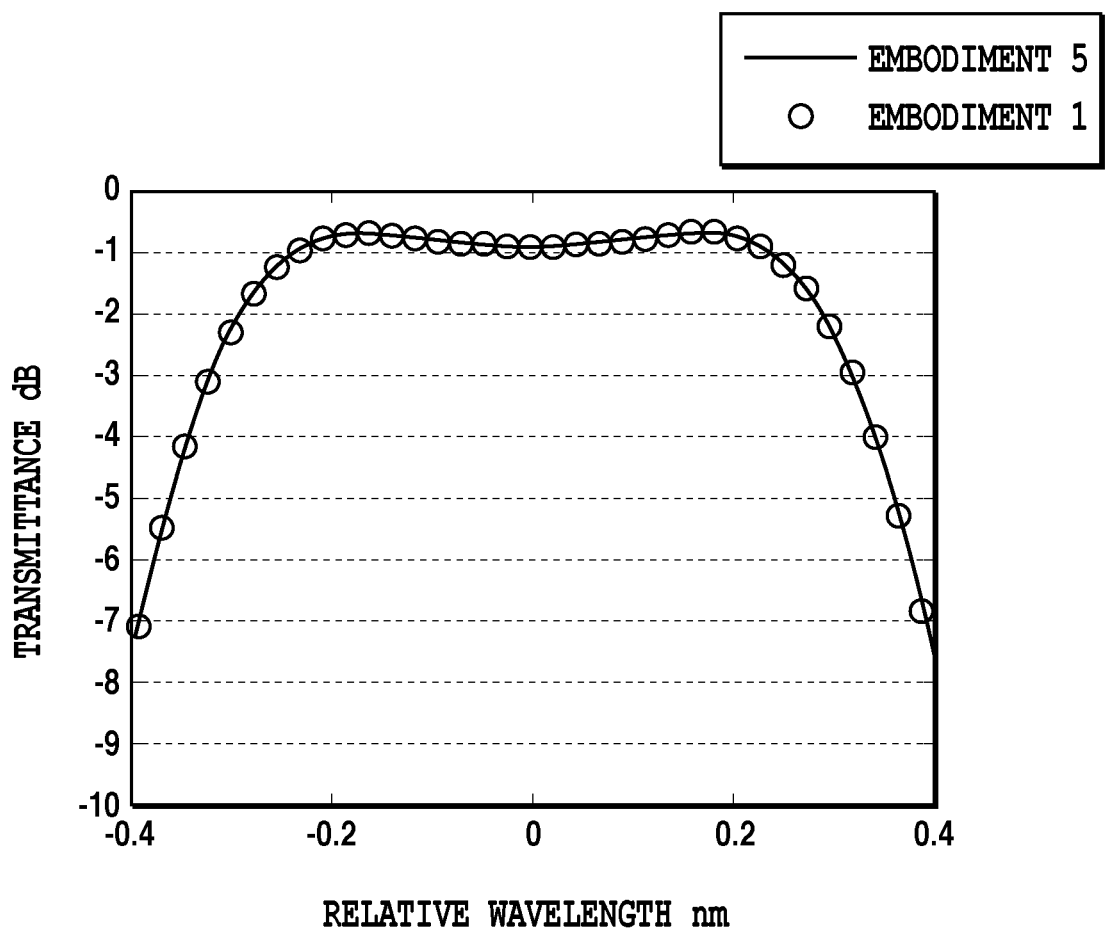
FIG. 33B is a chart showing transmission spectra of the optical multi/demultiplexers of the fifth and first embodiments.
Figure 33C:
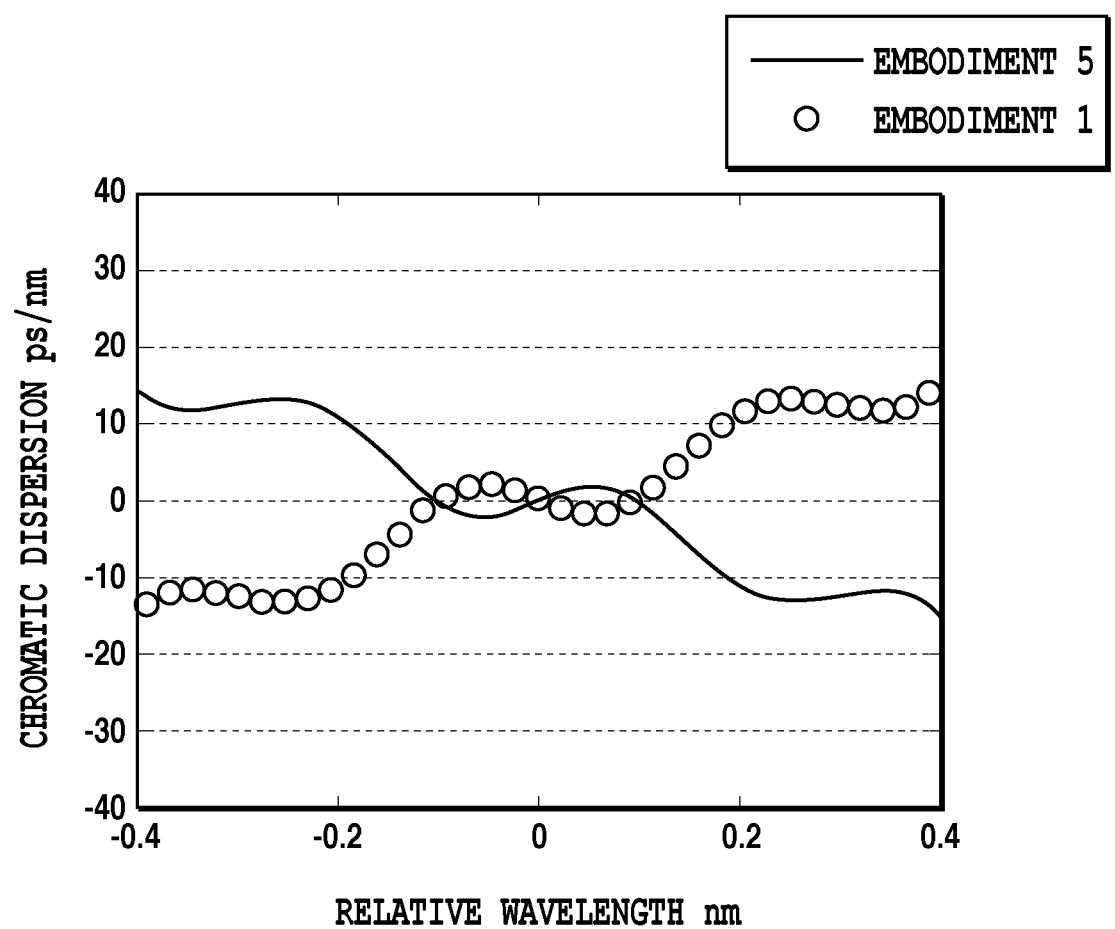
FIG. 33C is a chart showing chromatic dispersion characteristics of the optical multi/demultiplexers of the fifth and first embodiment.

FIGS. 33A and 33B are charts showing transmission spectra of the optical multi/demultiplexer of this embodiment and the optical wavelength multi/demultiplexer of the first embodiment. FIG. 33C is a chart showing chromatic dispersion characteristics of the optical multi/demultiplexer of this embodiment and the optical wavelength multi/demultiplexer of the first embodiment. The solid line shows the transmission characteristics of this embodiment, and the marks "o" show the transmission characteristics of the first embodiment.

The charts can confirm that the fifth embodiment can provide a flat transmission spectrum similar to the first embodiment and the chromatic dispersion characteristics of the fifth and first embodiments are opposite to each other.

Furthermore, in the configuration view of the embodiment of FIG. 31, the cross waveguide 2913 is used. Needless to say, using a directional coupler with a coupling efficiency of 100% instead can provide the equivalent effects.

Figure 34:
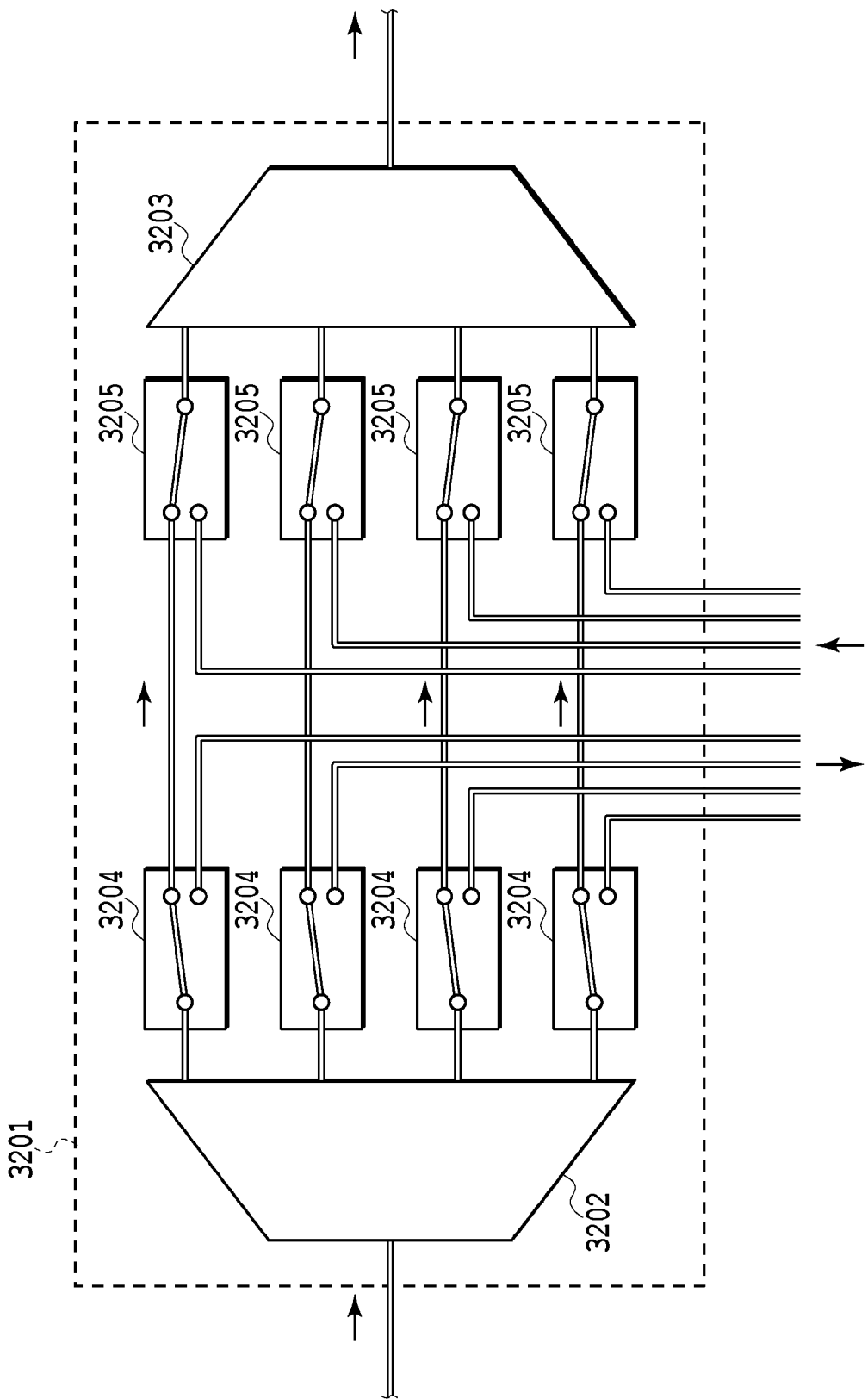
FIG. 34 is a configuration view of an optical module which is fabricated using optical wavelength multi/demultiplexers according to the fifth embodiment which have inverted chromatic dispersion characteristics to cancel the chromatic dispersion.

FIG. 34 is a configuration view of an optical module fabricated using the optical wavelength multi/demultiplexers according to the fifth embodiment which have the opposite chromatic dispersion characteristics. In the optical module, the chromatic dispersion properties are canceled with each other. For the purposes of device miniaturization and cost reduction, a plurality of optical devices are integrated into a single optical module. One of the examples thereof is an optical module called ROADM (reconfigurable optical add drop module). In the ROADM module, a WDM-multiplexed input signal is demultiplexed by an optical wavelength multi/demultiplexer for demultiplexing, and then the signals having different wavelengths are individually subjected to signal processing such as add/drop processing and are multiplexed again by the optical wavelength multi/demultiplexer to be output from the optical module. In such a manner, many optical modules integrally processing WDM signals include optical wavelength multi/demultiplexers for demultiplexing and optical wavelength multi/demultiplexers for multiplexing in pairs. Moreover, the ROADM modules are used in a ring network and are required to avoid degradation of the quality of transmission signals even if optical signal travels through more than ten ROADM modules connected in series. Accordingly, individual ROADM modules are required to have a wider and flatter passband and lower chromatic dispersion.

An optical module 3201 shown in FIG. 34, which is a ROADM module including the optical multi/demultiplexers of the invention, includes a first optical multi/demultiplexer 3202 for demultiplexing and a second optical multi/demultiplexer 3203 for multiplexing. Accordingly, the optical module 3201 has a wider and flatter passband than the conventional ROADM module, and moreover, the chromatic dispersion characteristics of the first multi/demultiplexer 3202 and the second optical multi/demultiplexer 3203 are canceled with each other to realize low chromatic dispersion characteristics as a whole of the optical module.

Figure 35:
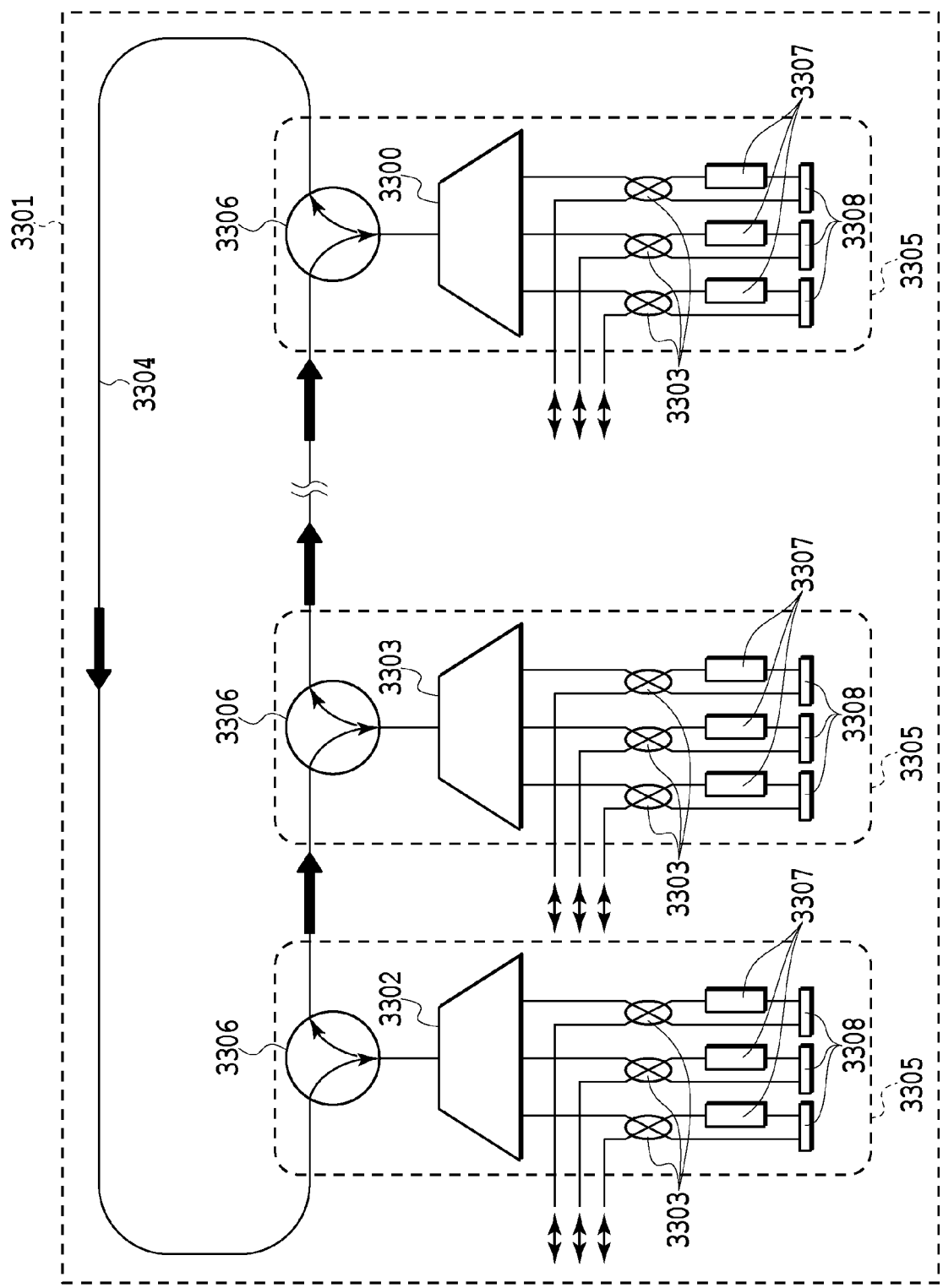
FIG. 35 is a configuration view of an optical communication system according to the fifth embodiment.

FIG. 35 is a configuration view of an optical communication system according to the fifth embodiment. The optical communication system employs optical wavelength multi/demultiplexer having chromatic dispersion characteristics opposite to each other to reduce the degradation of transmission quality. In an optical communication system 3301 shown in FIG. 35, each node 3305 is provided with only one optical wavelength multi/demultiplexer 3300. However, if the nodes 3305 arranged on a ring network 3304 alternately use the first or second optical multi/demultiplexers 3302 or 3303, it is possible to implement a wider and flatter passband without accumulating chromatic dispersion at each section of a transmission path. Since the passband of each node is widened and the transmission amplitude characteristics and group delay characteristics are both flattened, it is possible to suppress degradation in transmission quality even if signals pass through a number of nodes.

Sixth Embodiment

A description is given of an optical wavelength multi/demultiplexer according to a sixth embodiment of the invention. In the fifth embodiment, the opposite chromatic dispersion characteristics are obtained by changing, to the opposite sign, the plus or minus sign of the optical path length difference between the arm waveguides and using the cross waveguide. In the sixth embodiment, the opposite chromatic dispersion characteristics can be obtained with the transmission spectrum kept broad similar to the optical wavelength multi/demultiplexer according to the first embodiment in the following manner: an input port of the third optical coupler connected to the input waveguide is changed to the other one of the two input ports of the third optical coupler, and the phase difference between the first and second arm waveguides is adjusted so that the optical frequency channels of the arrayed waveguide grating correspond to those of the two-stage lattice circuit.

In an optical module including equal numbers of the optical wavelength multi/demultiplexers of the sixth embodiment having opposite chromatic dispersion characteristics and optical wavelength multi/demultiplexer of the first embodiment, the chromatic dispersion characteristics can be cancelled with each other, thus reducing the degradation in transmission quality due to the chromatic dispersion characteristics of the optical wavelength multi/demultiplexers.

Figure 36:
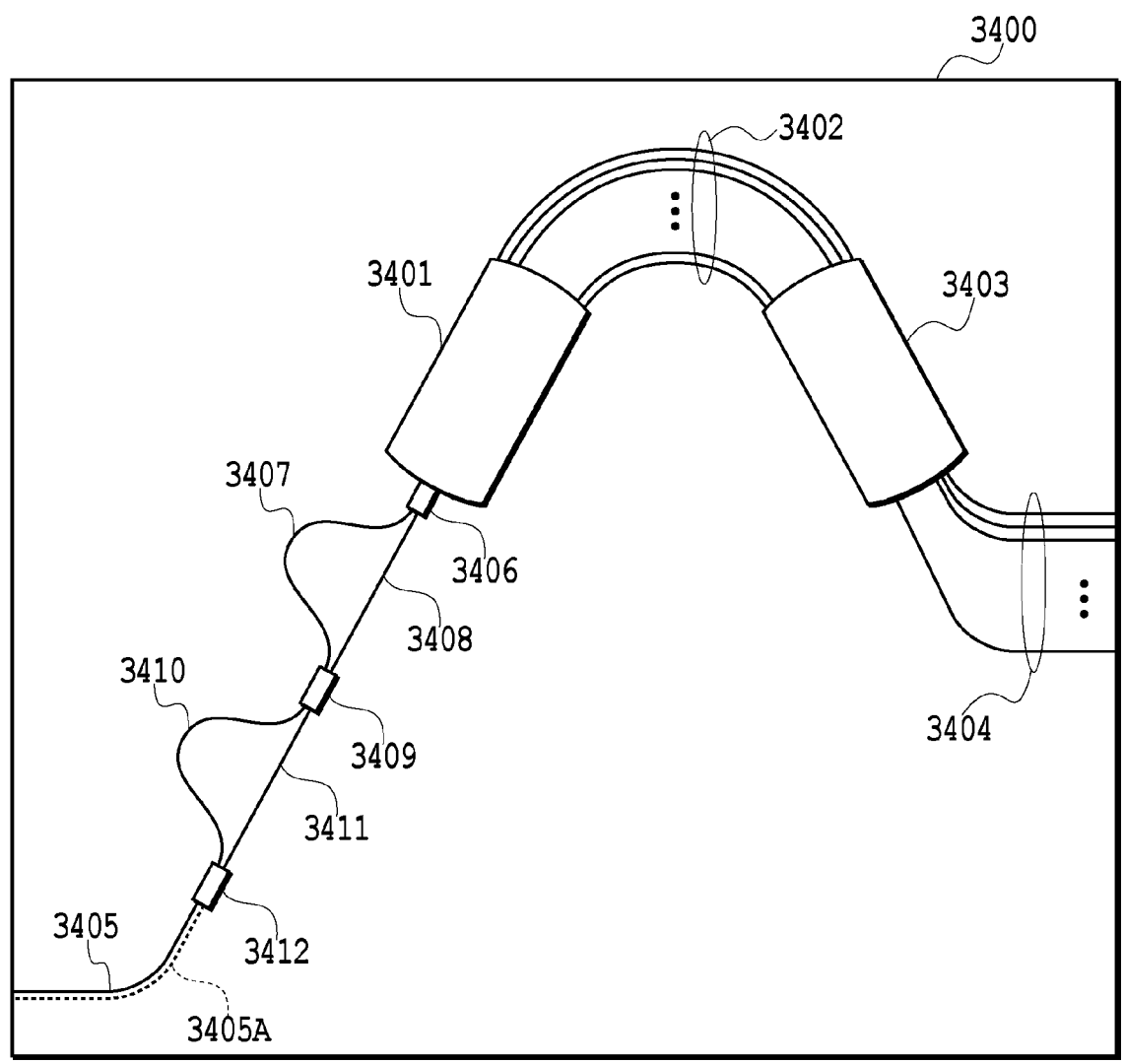
FIG. 36 is a plan view illustrating the configuration of a synchronized AWG-type optical wavelength multi/demultiplexer according to a sixth embodiment.

FIG. 36 is a plan view illustrating the configuration of the synchronized AWG-type optical multi/demultiplexer of this embodiment. A synchronized AWG-type optical multi/demultiplexer 3400 includes a first slab waveguide 3401, arrayed-waveguides 3402, a second slab waveguide 3403, output waveguides 3404, a first optical coupler 3406, a first arm waveguide 3407, a second arm waveguide 3408, a second optical coupler 3409, a third arm waveguide 3410, a fourth arm waveguide 3411, a third optical coupler 3412, and an input waveguide 3405. The dashed line indicates an input waveguide 3405A included in the first embodiment.

The optical wavelength multi/demultiplexer 3400 has a relative refractive index difference Δ of 1.5% and a core thickness of 4.5 μm. The core widths of the input waveguide 3405, output waveguides 3404, arrayed-waveguides 3402, first arm waveguide 3407, second arm waveguide 3408, third arm waveguide 3410, and fourth arm waveguide are 4.5 μm. The portions of the arrayed-waveguides 3402 which are connected to the first and second slab waveguides 3401 and 3403 are positioned with a pitch of 10 μm. The number of output waveguides 3404 is the same as the number of wavelength channels, and the portions of the output waveguides 3404 which are connected to the second slab waveguide are arranged with a pitch of 17 μm. At the terminal end of each output waveguide 3404, a linear tapered waveguide is provided so as to have an opening width of 12.5 μm. Moreover, the optical multi/demultiplexer 3400 is designed so that: the number of wavelength channels is 40; the optical frequency channel spacing, 100 GHz; the lengths of the first and second slab waveguides 3401 and 2903, 9566.85 μm; the number of arrayed-waveguides 3402, 187; and the optical path length difference between the arrayed-waveguides adjacent to each other, 33.98 μm.

Figure 37:
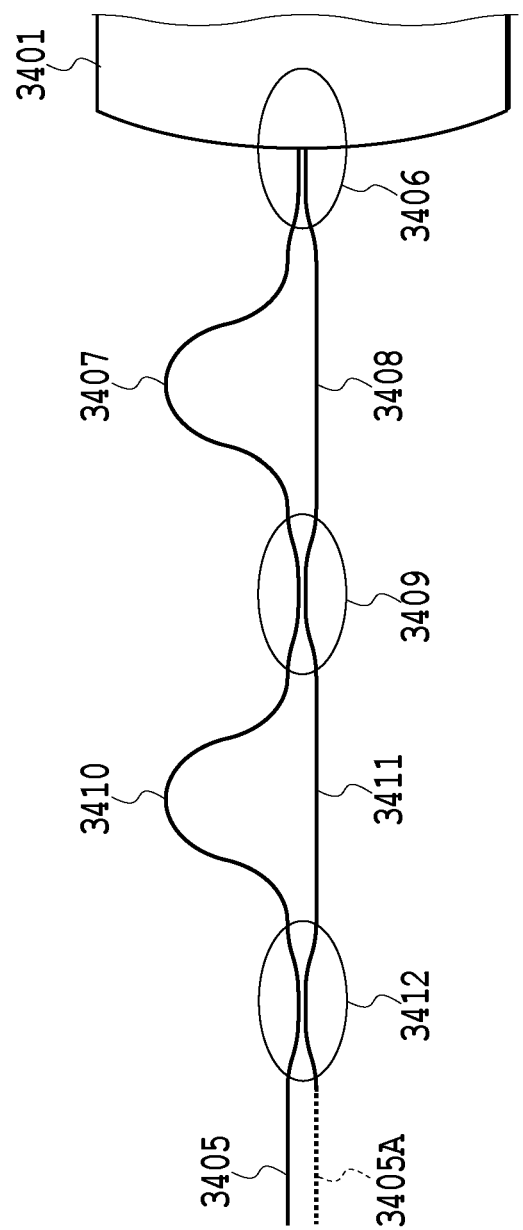
FIG. 37 is an enlarged view of a part from an input waveguide 3405 to a first slab waveguide 3401 of FIG. 36.

FIG. 37 is an enlarged view of a part from the input waveguide 3405 to the first slab waveguide 3401. The first to third optical couplers 3406, 3409, and 3412 are composed of directional couplers. The waveguide width and pitch of the directional couplers are 4.5 μm and 6.5 μm, respectively. The coupling efficiencies of the first and second optical couplers 3406, 3409, and 3412 are designed to be 50%, 50%, and 8%, respectively. The optical path length differences between the first and second arm waveguides 3407 and 3408 and between the third and fourth arm waveguides 3410 and 3411 are designed to be 2023 μm.

Figure 38A:
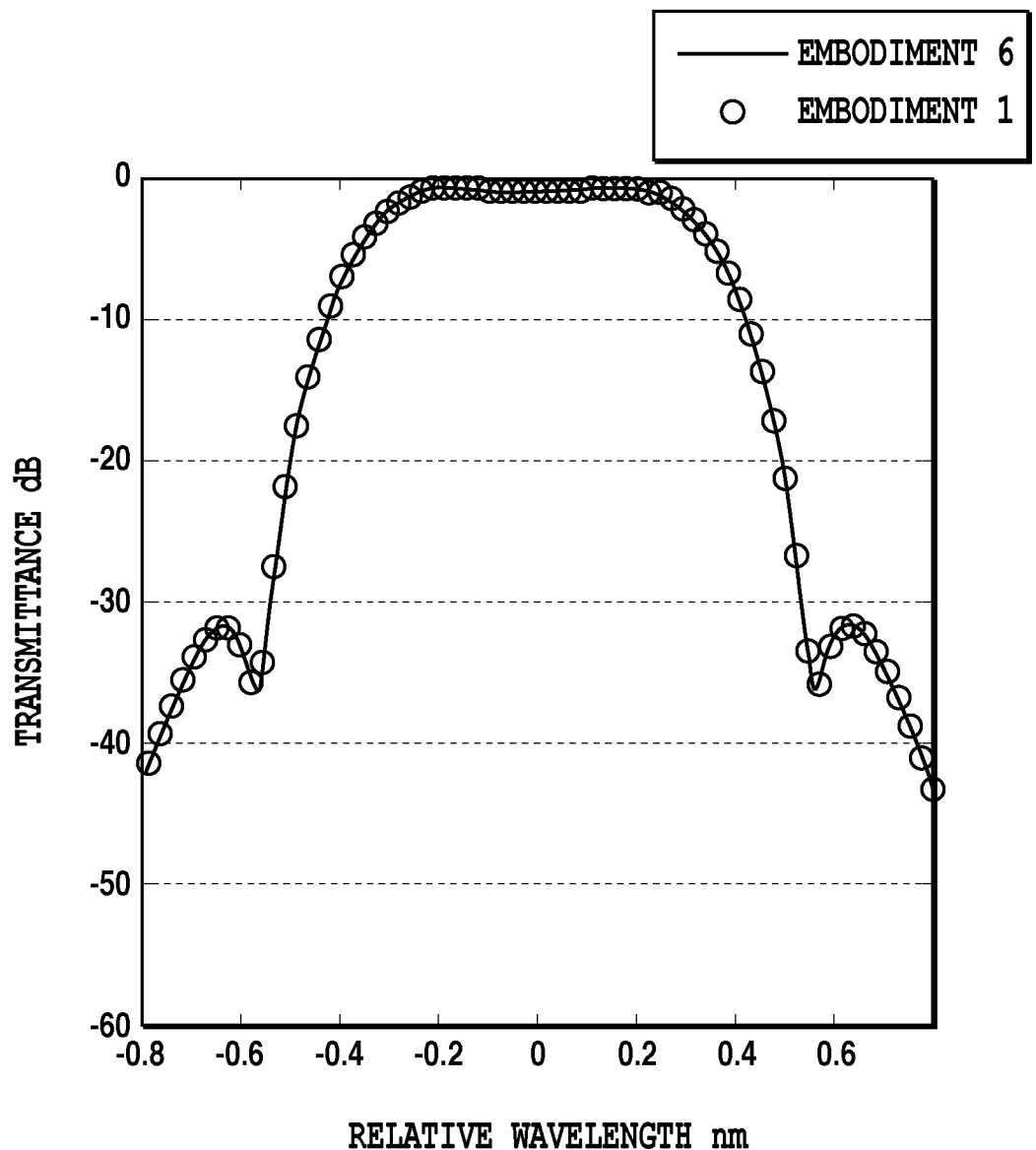
FIG. 38A is a chart showing transmission spectra of the optical multi/demultiplexers of the sixth and second embodiments.
Figure 38B:
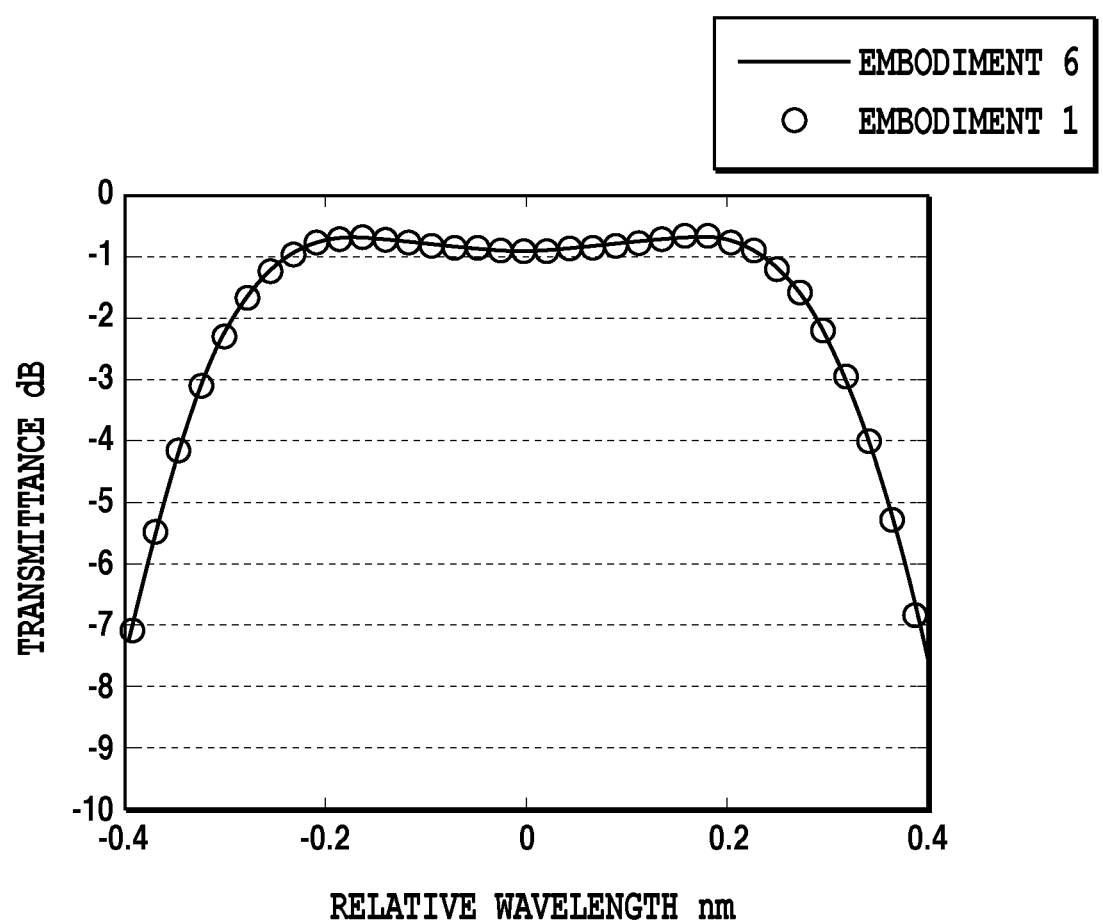
FIG. 38B is a chart showing transmission spectra of the optical multi/demultiplexers of the sixth and second embodiments.
Figure 38C:
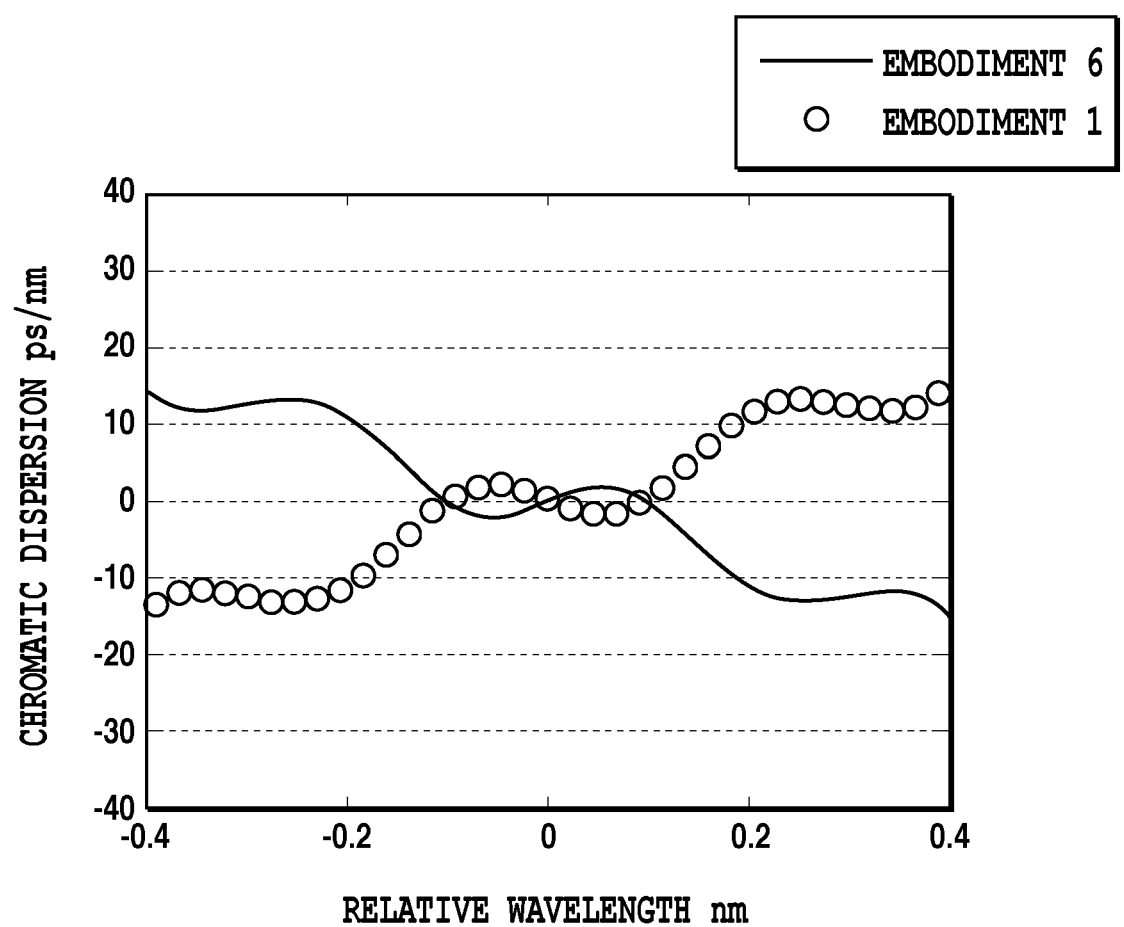
FIG. 38C is a chart showing chromatic dispersion characteristics of the optical multi/demultiplexers of the sixth and second embodiment.

FIGS. 38A and 38B are charts showing transmission spectra of the optical multi/demultiplexer of this embodiment and the optical wavelength multi/demultiplexer of the second embodiment. FIG. 38C is a chart showing chromatic dispersion characteristics of the optical multi/demultiplexer of this embodiment and the optical wavelength multi/demultiplexer of the second embodiment. The solid line shows the transmission characteristics of this embodiment, and marks "o" show the transmission characteristics of the first embodiment.

The charts confirm that the sixth embodiment can provide a flat transmission spectrum similar to the first embodiment and the chromatic dispersion characteristics of the sixth and first embodiments are opposite to each other.

In the configuration view of the embodiment of FIG. 37, the third optical coupler 3412 includes two input ports 3405 and 3405A located at upper and lower positions, respectively. Herein, if a cross waveguide or a directional coupler with a coupling efficiency of 100% is inserted between the input waveguide 3405 and optical coupler 3412, the upper and lower positions of the two input ports 3405 and 3405A can be reversed.

Furthermore, in the configuration view of this embodiment of FIG. 37, if the coupling efficiency of the optical coupler 3412 is set to 92% (=100−8) %, the input waveguide can be placed below the axis of incidence.

Seventh Embodiment

A description is given of an optical wavelength multi/demultiplexer according to the seventh embodiment of the invention. In the seventh embodiment, two optical wavelength multi/demultiplexers having opposite chromatic dispersion characteristics are arranged with slab waveguides thereof crossing each other and are integrated in one chip. Moreover, a first delay circuit including the first and second arm waveguides and a second delay circuit including the third and fourth arm waveguides each include folded portions to minimize the area occupied by the two-stage lattice circuit. This can increase the yields of chips per wafer.

Figure 39:
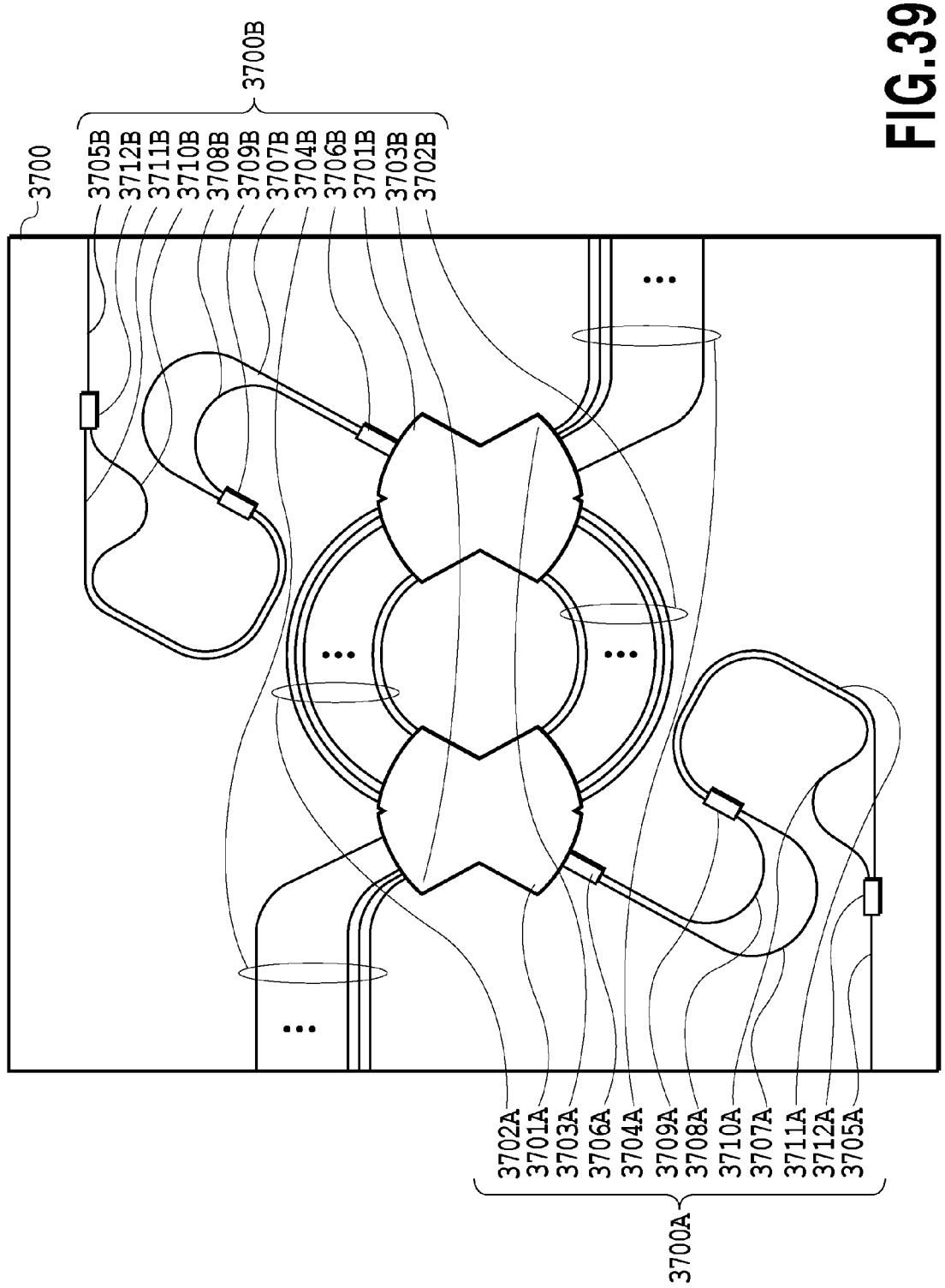
FIG. 39 is a plan view of a chip of a seventh embodiment including two synchronized AWG-type optical wavelength multi/demultiplexers integrated.

FIG. 39 is a plan view of a chip of this embodiment including two synchronized AWG-type optical multi/demultiplexers integrated. A first optical multi/demultiplexer 3700A includes a first slab waveguide 3701A, arrayed-waveguides 3702A, a second slab waveguide 3703A, output waveguides 3704A, a first optical coupler 3706A, a first arm waveguide 3707A, a second arm waveguide 3708A, a second optical coupler 3709A, a third arm waveguide 3710A, a fourth arm waveguide 3711A, a third optical coupler 3712A, and an input waveguide 3705A. A second optical multi/demultiplexer 3700B includes a first slab waveguide 3701B, arrayed-waveguides 3702B, a second slab waveguide 3703B, output waveguides 3704B, a first optical coupler 3706B, a first arm waveguide 3707B, a second arm waveguide 3708B, a second optical coupler 3709B, a third arm waveguide 3710B, a fourth arm waveguide 3711B, a third optical coupler 3712B, and an input waveguide 3705B. The first and second slab waveguides 3701A and 3703A of the first optical multi/demultiplexer 3700A intersect with the second and first slab waveguides 3703B and 3701B of the second optical multi/demultiplexer 3700B, respectively.

The first and second optical wavelength multi/demultiplexers 3700A and 3700B have relative refractive index differences Δ of 1.5% and core thicknesses of 4.5 μm. The core widths of the input waveguides 3705A and 3705B, output waveguides 3704A and 3704B, arrayed-waveguides 3702A and 3702B, first arm waveguides 3707A and 3707B, second arm waveguides 3708A and 3708B, third arm waveguides 3710A and 3710B, and fourth arm waveguides 3711A and 3711B are 4.5 μm. The portions of the arrayed-waveguides 3702A which are connected to the first and second slab waveguides 3701A and 3703A are positioned with a pitch of 10 μm. The portions of the arrayed-waveguides 3702B which are connected to the first and second slab waveguides 3701B and 3703B are positioned with a pitch of 10 μm. The numbers of output waveguides 3704A and 3704B are the same as the number of wavelength channels. The portions of the output waveguides 3704A which are connected to the second slab waveguide are arranged with a pitch of 17 μm. The portions of the output waveguides 3704B which are connected to the second slab waveguide are arranged with a pitch of 17 μm. At the terminal end of each of the output waveguides 3704A and 3704B, a linear tapered waveguide is provided so as to have an opening width of 12.5 μm. Moreover, the optical multi/demultiplexer 3700 is designed so that: the numbers of wavelength channels are 40; the optical frequency channel spacings, 100 GHz; the lengths of the first slab waveguides 3701A and 3701B and the second slab waveguides 3703A and 3703B, 9566.85 μm; the numbers of arrayed-waveguides 3702A and 3702B, 187; and the optical path length difference between the arrayed-waveguides adjacent to each other, 33.98 μm.

FIG. 40A is an enlarged view of a part of the first optical wavelength multi/demultiplexer 3700A from the input waveguide 3705A to the first slab waveguide 3701A. FIG. 40B is an enlarged view of a part of the second optical wavelength multi/demultiplexer 3700B from the input waveguide 3705B to the first slab waveguide 3701B. The first optical couplers 3706A and 3706B, second optical couplers 3709A and 3709B, and third optical couplers 3712A and 3712B include directional couplers. The waveguide width and pitch of the directional couplers are 4.5 μm and 6.5 μm, respectively. The coupling efficiencies of the first optical couplers 3706A and 3706B, second optical couplers 3709A and 3709B, and third optical couplers 3712A and 3712B are designed to be 50%, 50%, and 8%, respectively.

In the first embodiment, the two-stage lattice circuit includes the couplers arranged on a straight line as shown in FIG. 13. Accordingly, the distance that light incoming through the input waveguide 1205 travels to the first slab waveguide 1201 depends on the lengths of the arm waveguides 1210 and 1207, and the two-stage lattice circuit of the first embodiment occupies a large area. Accordingly, the yield of chips per wafer cannot be expected to increase. On the other hand, as shown in FIG. 40A of this embodiment, each two-stage lattice circuit is provided with the folded portions and thus is formed with a folded structure. This can reduce the occupied area and increase the yield of chips per wafer.

Moreover, the input waveguides 3705A and 3705B are respectively connected to the input ports of the third optical couplers 3712A and 3712B which are provided in the opposite sides to each other. Accordingly, as described in the sixth embodiment, the first and second wavelength multi/demultiplexers 3700A and 3700B have chromatic dispersion characteristics opposite to each other while keeping broad transmission spectra.

Eighth Embodiment

A description is given of an optical wavelength multi/demultiplexer according to an eighth embodiment of the invention. In the fifth embodiment, the plus/minus sign of the optical path length difference between the first and second arm waveguides is equal to the plus/minus sign of the optical path length difference between the third and fourth arm waveguides. In this configuration, the plus/minus sign of the optical path length difference between the first and second arm waveguides is set different from the plus/minus sign of the optical path length difference between the third and fourth arm waveguides. Such a configuration allows for a design facilitating the arrangement of the delay circuits having folded shapes.

Figure 41:
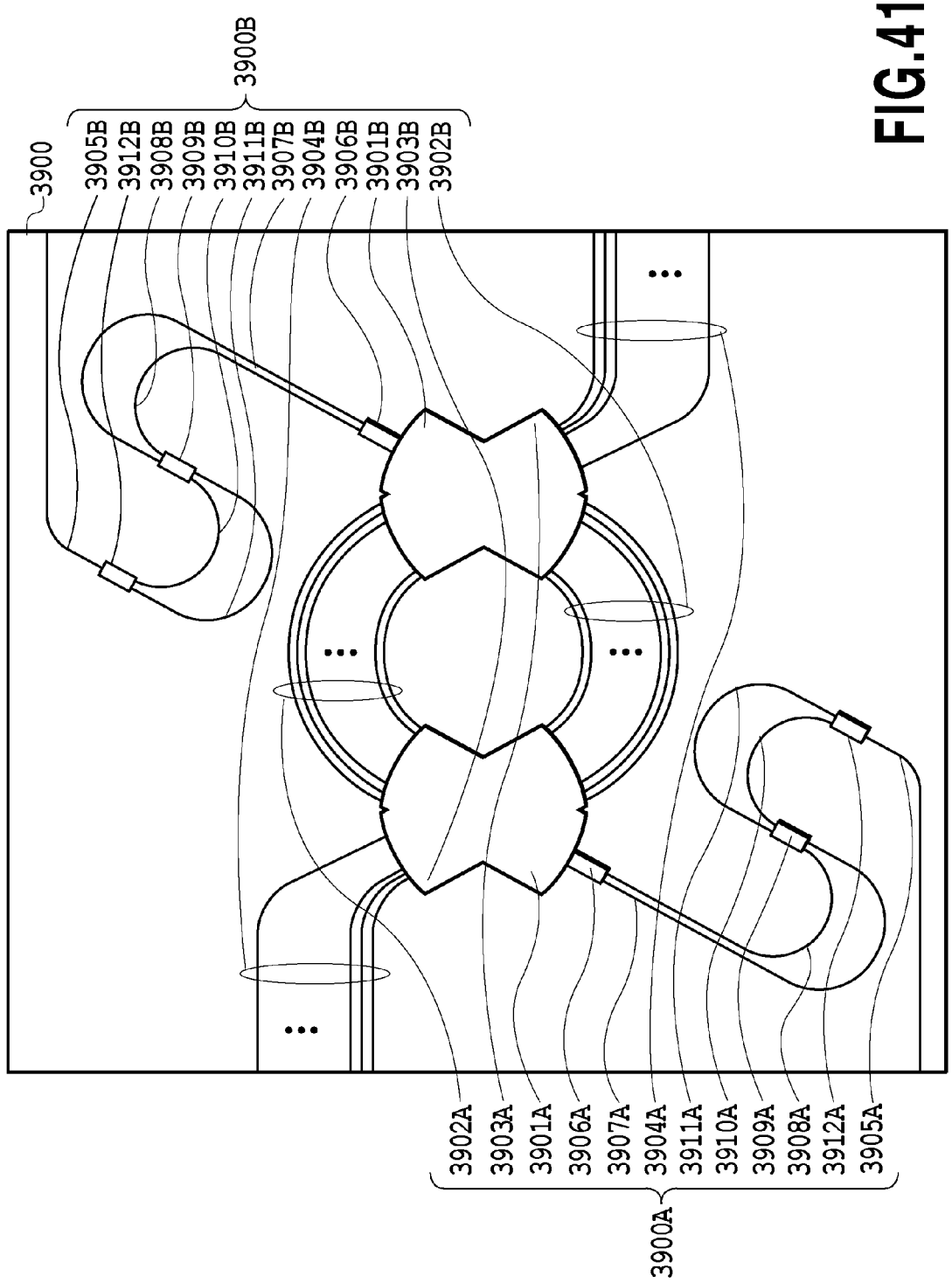
FIG. 41 is a plan view of a chip of an eighth embodiment including two synchronized AWG-type optical wavelength multi/demultiplexers integrated.

FIG. 41 is a plan view of a chip of the eighth embodiment including two synchronized AWG-type optical multi/demultiplexers integrated. A first optical multi/demultiplexer 3900A includes a first slab waveguide 3901A, arrayed-waveguides 3902A, a second slab waveguide 3903A, output waveguides 3904A, a first optical coupler 3906A, a first arm waveguide 3907A, a second arm waveguide 3908A, a second optical coupler 3909A, a third arm waveguide 3910A, a fourth arm waveguide 3911A, a third optical coupler 3912A, and an input waveguide 3905A. A second optical multi/demultiplexer 3900B includes a first slab waveguide 3901B, arrayed-waveguides 3902B, a second slab waveguide 3903B, output waveguides 3904B, a first optical coupler 3906B, a first arm waveguide 3907B, a second arm waveguide 3908B, a second optical coupler 3909B, a third arm waveguide 3910B, a fourth arm waveguide 3911B, a third optical coupler 3912B, and an input waveguide 3905B. The first and second slab waveguides 3901A and 3903A of the first optical multi/demultiplexer 3900A intersect with the second and first slab waveguides 3903B and 3901B of the second optical multi/demultiplexer 3900B, respectively.

The first and second optical wavelength multi/demultiplexers 3900A and 3900B have relative refractive index differences Δ of 1.5% and core thicknesses of 4.5 μm. The core widths of the input waveguides 3905A and 3905B, output waveguides 3904A and 3904B, arrayed-waveguides 3902A and 3902B, first arm waveguides 3907A and 3907B, second arm waveguides 3908A and 3908B, third arm waveguides 3910A and 3910B, and fourth arm waveguides 3911A and 3911B are 4.5 μm. The portions of the arrayed-waveguides 3902A which are connected to the first and second slab waveguides 3901A and 3903A are positioned with a pitch of 10 μm. The portions of the arrayed-waveguides 3902B which are connected to the first and second slab waveguides 3901B and 3903B are positioned with a pitch of 10 μm. The numbers of output waveguides 3904A and 3904B are the same as the number of wavelength channels. The portions of the output waveguides 3904A which are connected to the second slab waveguide are arranged with a pitch of 17 μm. The portions of the output waveguides 3904B which are connected to the second slab waveguide are arranged with a pitch of 17 μm. At the terminal end of each of the output waveguides 3904A and 3904B, a linear tapered waveguide is provided so as to have an opening width of 12.5 μm. Moreover, the optical multi/demultiplexers 3900A and 3900B are designed so that: the numbers of wavelength channels are 40; the optical frequency channel spacings, 100 GHz; the lengths of the first slab waveguides 3901A and 3901B and the second slab waveguides 3903A and 3903B, 9566.85 μm; the numbers of arrayed-waveguides 3902A and 3902B, 187; and the optical path length difference between the arrayed-waveguides adjacent to each other, 33.98 μm.

FIG. 42A is an enlarged view of a part of the first optical wavelength multi/demultiplexer 3900A from the input waveguide 3905A to the first slab waveguide 3901A. FIG. 42B is an enlarged view of a part of the second optical wavelength multi/demultiplexer 3900B from the input waveguide 3905B to the first slab waveguide 3901B. The first optical couplers 3906A and 3906B, second optical couplers 3909A and 3909B, and third optical couplers 3912A and 3912B are composed of directional couplers. The waveguide width and pitch of the directional couplers are 4.5 μm and 6.5 μm, respectively. The coupling efficiencies of the first optical couplers 3906A and 3906B, second optical couplers 3009A and 3909B, and third optical couplers 3912A and 3912B are designed to be 50%, 150%, and 8%, respectively.

Figure 43:
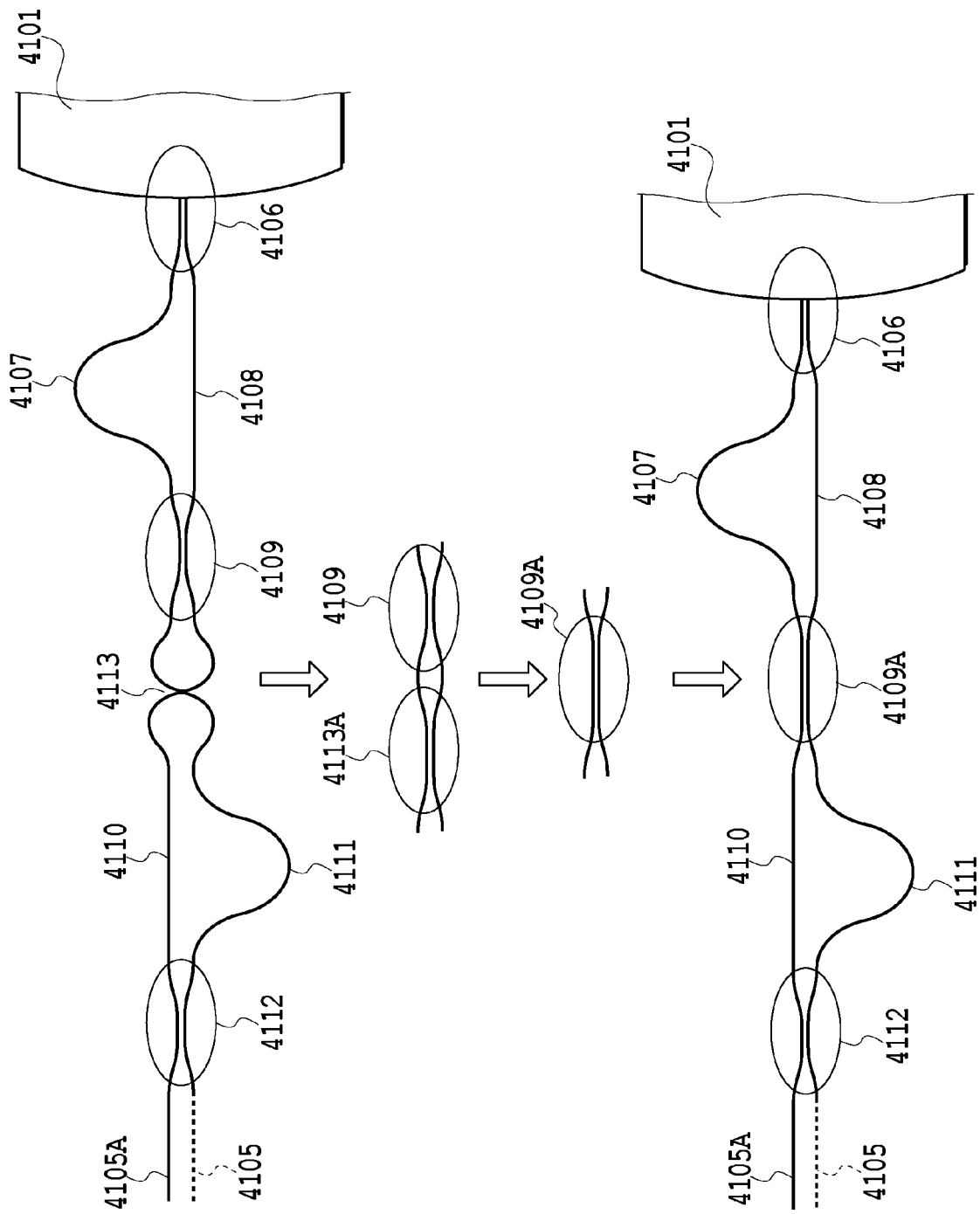
FIG. 43 is a view for explaining the circuit configurations of FIGS. 42A and 42B.

FIG. 43 is a view for explaining the circuit configuration of FIG. 42. Herein, 4101 indicates a first slab waveguide; 4105 and 4105A, input waveguides; 4106, a first optical coupler; 4107, a first arm waveguide; 4108, a second arm waveguide; 4109, a second optical coupler; 4110, a third arm waveguide; 4111, a fourth arm waveguide; 4112, a third optical coupler; and 4113, a cross waveguide. Use of the cross waveguide 4113 and input waveguide 4105A allows for implementation of the same configuration as that of the circuit of FIG. 13. Use the cross waveguide 4113 and input waveguide 4105 allows for implementation of the same configuration as that of the circuit of FIG. 37.

Actually, the cross waveguide 4113 can be replaced with a coupler 4113A with a coupling efficiency of 100%. Accordingly, both of the optical coupler 4113A with a coupling efficiency of 100% and the optical coupler 4109 with a coupling efficiency of 50% are joined into one optical coupler 4109A. The optical coupler 4109A therefore needs to be designed to have a coupling efficiency of 150%.

On the other hand, the input waveguides 3905A and 3905B of FIG. 42 are respectively connected to the input ports of the third optical couplers 3912A and 3912B which are provided in opposite sides to each other. Accordingly, as described in the sixth embodiment, the first and second optical wavelength multi/demultiplexers 3900A and 3900B can implement chromatic dispersion characteristics opposite to each other while keeping the broadband transmission spectrum.

The invention claimed is:

1. An optical wavelength multi/demultiplexer, comprising:
an arrayed waveguide grating, and
a two-stage lattice circuit connected to the arrayed waveguide grating, wherein
the arrayed waveguide grating includes: an arrayed waveguide; first and second slab waveguides connected to both ends of the arrayed waveguide; and an output waveguide connected to the second slab waveguide, and
the two-stage lattice circuit includes: a first optical coupler directly connected to another end of the first slab waveguide which is not connected to the arrayed-waveguide; first and second arm waveguides directly connected to the first optical coupler; a second optical coupler directly connected to other ends of the first and second arm waveguides which are not connected to the first optical coupler; third and fourth arm waveguides directly connected to the second optical coupler; a third optical coupler directly connected to other ends of the third and fourth arm waveguides which are not connected to the second optical coupler; and an input waveguide connected to the third optical coupler, and
an optical frequency period of the two-stage lattice circuit includes an optical frequency channel spacing of the arrayed waveguide grating and a period half the optical frequency channel spacing.

2. The optical wavelength multi/demultiplexer according to claim 1, wherein the first optical coupler has a coupling efficiency of 50%.

3. The optical wavelength multi/demultiplexer according to claim 2, wherein the second optical coupler has a coupling efficiency of 50%.

4. The optical wavelength multi/demultiplexer according to claim 3, wherein the third optical coupler has a coupling efficiency of not more than 20%.

5. The optical wavelength multi/demultiplexer according to claim 1, wherein the optical frequency period defined by an optical path length difference between the first and second arm waveguides and an optical path length difference between the third and fourth arm waveguides is equal to the optical frequency channel spacing of the arrayed waveguide grating.

6. The optical wavelength multi/demultiplexer according to claim 1, wherein
the optical frequency period defined by an optical path length difference between the first and second arm waveguides is equal to the optical frequency channel spacing of the arrayed waveguide grating, and
the optical frequency period defined by an optical path length difference between the third and fourth arm waveguides is half the optical frequency period of the arrayed waveguide grating.

7. An optical module, comprising:
first optical multi/demultiplexer each being the optical wavelength multi/demultiplexer according to claim 1; and
second optical multi/demultiplexer each being the optical wavelength multi/demultiplexer according to claim 1, the second optical wavelength multi/demultiplexer having a same transmission waveform as that of the first optical multi/demultiplexer and having chromatic dispersion opposite to that of the first optical multi/demultiplexer by changing, to the opposite signs, both the plus or minus sign of a value of the optical path length difference between the first and second arm waveguides and the plus or minus sign of a value of the optical path length difference between the third and fourth arm waveguides; and by providing a cross waveguide between the first optical coupler and the first and second arm waveguides, wherein
the number of the first optical multi/demultiplexer is equal to the number of the second optical multi/demultiplexer in the same optical module.

8. An optical communication system, comprising:
first optical multi/demultiplexer each being the optical wavelength multi/demultiplexer according to claim 1; and
second optical multi/demultiplexer each being the optical wavelength multi/demultiplexer according to claim 1, the second optical wavelength multi/demultiplexer having a same transmission waveform as that of the first optical multi/demultiplexer and having chromatic dispersion opposite to that of the first optical multi/demultiplexer by changing, to the opposite signs, both the plus or minus sign of a value of the optical path length difference between the first and second arm waveguides and the plus or minus sign of a value of the optical path length difference between the third and fourth arm waveguides; and by providing a cross waveguide between the first optical coupler and the first and second arm waveguides, wherein
the number of the first optical multi/demultiplexer is equal to the number of the second optical multi/demultiplexer in a same transmission section.

9. An optical module, comprising:
first optical multi/demultiplexer each being the optical wavelength multi/demultiplexer according to claim 1; and
second optical multi/demultiplexer each being the optical wavelength multi/demultiplexer according to claim 1, the second optical wavelength multi/demultiplexer having a same transmission waveform as that of the first optical multi/demultiplexer and having chromatic dispersion opposite to that of the first optical multi/demultiplexer by connecting the input waveguide to the other one of two input ports of the third optical coupler which are located at positions axisymmetric with respect to an axis of incidence, and by setting the phase difference between the first and second arm waveguides to 180 degrees to make the optical frequency channels of the arrayed waveguide grating correspond to those of the two-stage lattice circuit, wherein
the number of the first optical multi/demultiplexer is equal to the number of the second optical multi/demultiplexer in the same optical module.

10. An optical communication system, comprising:
first optical multi/demultiplexer each being the optical wavelength multi/demultiplexer according to claim 1; and
second optical multi/demultiplexer each being the optical wavelength multi/demultiplexer according to claim 1, the second optical wavelength multi/demultiplexer having a same transmission waveform as that of the first optical multi/demultiplexer and having chromatic dispersion opposite to that of the first optical multi/demultiplexer by connecting the input waveguide to the other one of two input ports of the third optical coupler which are located at positions axisymmetric with respect to an axis of incidence, and by setting the phase difference between the first and second arm waveguides to 180 degrees to make the optical frequency channels of the arrayed waveguide grating correspond to those of the two-stage lattice circuit, wherein
the number of the first optical multi/demultiplexer is equal to the number of the second optical multi/demultiplexer in a same transmission section.

11. The optical wavelength multi/demultiplexer according to claim 1, wherein each of a first delay circuit composed of the first and second arm waveguides and a second delay circuit composed of the third and fourth arm waveguides includes a folding portion in which the two-stage lattice circuit is arranged in a folded manner.

12. An optical wavelength multi/demultiplexer, comprising:
an arrayed waveguide grating comprising:
a first slab waveguide having a first end and an opposite second end;
a second slab waveguide having a first end and an opposite second end;
an arrayed waveguide extending from the second end of the first slab waveguide to the first end of the second slab waveguide; and
an output waveguide extending from the second end of the second slab waveguide, and
a two-stage lattice circuit connected to the arrayed waveguide grating, the two-stage lattice circuit comprising:
a first optical coupler directly connected to the first end of the first slab waveguide;
a second optical coupler;
first and second arm waveguides extending from the first optical coupler to the second optical coupler;
a third optical coupler;
third and fourth arm waveguides extending from the second optical coupler to the third optical coupler; and
an input waveguide extending from the third optical coupler,
wherein an optical frequency period of the two-stage lattice circuit includes an optical frequency channel spacing of the arrayed waveguide grating and a period that is half the optical frequency channel spacing.

13. The optical wavelength multi/demultiplexer according to claim 12, wherein the first optical coupler has a coupling efficiency of 50%.

14. The optical wavelength multi/demultiplexer according to claim 13, wherein the second optical coupler has a coupling efficiency of 50%.

15. The optical wavelength multi/demultiplexer according to claim 14, wherein the third optical coupler has a coupling efficiency of not more than 20%.

16. The optical wavelength multi/demultiplexer according to claim 12, wherein the optical frequency period defined by an optical path length difference between the first and second arm waveguides and an optical path length difference between the third and fourth arm waveguides is equal to the optical frequency channel spacing of the arrayed waveguide grating.

17. The optical wavelength multi/demultiplexer according to claim 12, wherein
the optical frequency period defined by an optical path length difference between the first and second arm waveguides is equal to the optical frequency channel spacing of the arrayed waveguide grating, and
the optical frequency period defined by an optical path length difference between the third and fourth arm waveguides is equal to half the optical frequency period of the arrayed waveguide grating.

18. An optical module, comprising:
one or more pairs of first and second optical wavelength multi/demultiplexers according to claim 12, wherein, for each pair of optical wavelength multi/demultiplexers:
the value of the optical path length difference between the first and second arm waveguides of the second optical wavelength multi/demultiplexer is equivalent to but has an opposite sign as the value of the optical path length difference between the first and second arm waveguides of the first optical wavelength multi/demultiplexer;
the value of the optical path length difference between the third and fourth arm waveguides of the second optical wavelength multi/demultiplexer is equivalent to but has an opposite sign as the value of the optical path length difference between the third and fourth arm waveguides of the first optical wavelength multi/demultiplexer; and
a cross waveguide is connected between the first optical coupler of the second optical wavelength multi/demultiplexer and the first and second arm waveguides of the second optical wavelength multi/demultiplexer, such that the first and second optical wavelength multi/demultiplexers have a same transmission waveform and opposite chromatic dispersions.

19. An optical communication system, comprising:
a network; and
one or more transmission sections communicatively coupled with the network, each transmission section comprising the optical module according to claim 18.

20. An optical module, comprising:
one or more pairs of first and second optical wavelength multi/demultiplexers according to claim 12, wherein, for each pair of optical wavelength multi/demultiplexers:
the third optical coupler of each of the optical wavelength multi/demultiplexers has first and second inputs located at positions axisymmetric with respect to an axis of incidence;
the input waveguide of the first optical wavelength multi/demultiplexer is connected to one of the inputs of the third optical coupler of the first optical wavelength multi/demultiplexer;
the input waveguide of the second optical wavelength multi/demultiplexer is connected to the input of the third optical coupler of the second optical wavelength multi/demultiplexer corresponding to the input of the third optical coupler of the first optical wavelength multi/demultiplexer to which the input waveguide of the first optical wavelength multi/demultiplexer is not connected; and
the phase difference between the first and second arm waveguides of the second optical wavelength multi/demultiplexer is 180 degrees, such that the optical frequency channels of the arrayed waveguide grating of the second optical wavelength multi/demultiplexer correspond to the optical frequency channels of the two-stage lattice circuit of the second optical wavelength multi/demultiplexer, such that the first and second optical wavelength multi/demultiplexers have a same transmission waveform and opposite chromatic dispersions.

21. An optical communication system, comprising:
a network; and
one or more transmission sections communicatively coupled with the network, each transmission section comprising the optical module according to claim 20.

22. The optical wavelength multi/demultiplexer according to claim 12, wherein the first and second arm waveguides form a first delay circuit and the third and fourth arm waveguides form a second delay circuit, and wherein each of the first and second delay circuits includes a folded portion such that the two-stage lattice circuit is arranged in a folded manner.

* * * * *